(12) United States Patent
Ishiga et al.

(10) Patent No.: US 10,412,358 B2
(45) Date of Patent: Sep. 10, 2019

(54) IMAGE SENSOR, IMAGE-CAPTURING APPARATUS AND IMAGE-CAPTURING SYSTEM

(71) Applicant: NIKON CORPORATION, Tokyo (JP)

(72) Inventors: Kenichi Ishiga, Yokohama (JP); Kiyoshige Shibazaki, Higashimurayama (JP); Muneki Hamashima, Fukaya (JP); Susumu Mori, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 46 days.

(21) Appl. No.: 15/872,343

(22) Filed: Jan. 16, 2018

(65) Prior Publication Data

US 2018/0139435 A1 May 17, 2018

Related U.S. Application Data

(60) Division of application No. 14/487,554, filed on Sep. 16, 2014, now Pat. No. 9,906,770, which is a
(Continued)

(30) Foreign Application Priority Data

Mar. 16, 2012 (JP) .................. 2012-060737
Mar. 16, 2012 (JP) .................. 2012-060738
(Continued)

(51) Int. Cl.
*H04N 13/00* (2018.01)
*H04N 13/207* (2018.01)
(Continued)

(52) U.S. Cl.
CPC .......... *H04N 13/00* (2013.01); *H04N 13/218* (2018.05); *H04N 13/257* (2018.05); *H04N 13/207* (2018.05)

(58) Field of Classification Search
CPC .... H04N 13/00; H04N 13/218; H04N 13/257; H04N 13/207
(Continued)

(56) References Cited

U.S. PATENT DOCUMENTS

2010/0165176 A1 7/2010 Taniguchi
2010/0201853 A1 8/2010 Ishiga
(Continued)

FOREIGN PATENT DOCUMENTS

CN 103597811 A 2/2014
JP H0847001 A 2/1996
(Continued)

OTHER PUBLICATIONS

Dec. 23, 2015 Office Action issued in Chinese Patent Application No. 201380014390.1.
(Continued)

*Primary Examiner* — Jared Walker
(74) *Attorney, Agent, or Firm* — Oliff PLC

(57) ABSTRACT

To produce both 2D image data and color parallax image data from image data output from a single-plate image sensor, the resolutions of the 2D image data and parallax image data may be both degraded. The image sensor has a primitive lattice that is a group of pixels including (i) at least four types of parallax pixels formed by photoelectric converter elements each of which is associated with one of combinations of two different types of aperture masks and two different types of color filters and (ii) no-parallax pixels configured to guide an incident luminous flux to photoelectric converter elements without limitation. In the group of pixels, the no-parallax pixels are more than the parallax pixels.

10 Claims, 58 Drawing Sheets

Related U.S. Application Data continuation of application No. PCT/JP2013/001811, filed on Mar. 15, 2013.

(30) Foreign Application Priority Data

Aug. 21, 2012 (JP) .................. 2012-182417
Aug. 21, 2012 (JP) .................. 2012-182420

(51) Int. Cl.
*H04N 13/218* (2018.01)
*H04N 13/257* (2018.01)

(58) Field of Classification Search
USPC .......................................................... 348/47
See application file for complete search history.

(56) References Cited

U.S. PATENT DOCUMENTS

| | | |
|---|---|---|
| 2010/0302433 A1 | 12/2010 | Egawa |
| 2011/0076001 A1 | 3/2011 | Iwasaki |
| 2012/0140100 A1 | 6/2012 | Shibazaki et al. |
| 2012/0193515 A1 | 8/2012 | Agranov et al. |
| 2013/0038691 A1 | 2/2013 | Agranov et al. |
| 2014/0092220 A1 | 4/2014 | Kawamura et al. |

FOREIGN PATENT DOCUMENTS

| | | |
|---|---|---|
| JP | 2003-007994 A | 1/2003 |
| JP | 2004-228629 A | 8/2004 |
| JP | 2006-105771 A | 4/2006 |
| JP | 2011-077829 A | 4/2011 |
| JP | 2011-199755 A | 10/2011 |
| WO | 2012/073491 A1 | 6/2012 |
| WO | 2012/169301 A1 | 12/2012 |
| WO | 2012169318 A1 | 12/2012 |

OTHER PUBLICATIONS

Jan. 17, 2017 Office Action issued in Japanese Patent Application No. 2013-053769.
Dec. 6, 2016 Office Action issued in Japanese Patent Application No. 2013-053770.
Jul. 11, 2017 Office Action issued in U.S. Appl. No. 14/487,554.
May 28, 2013 International Search Report issued in International Patent Application No. PCT/JP2013/001811.
Sep. 16, 2014 International Preliminary Report on Patentability issued in International Patent Application No. PCT/JP2013/001811.
Nov. 24, 2017 Notice of Allowance issued in U.S. Appl. No. 14/487,554.
Mar. 10, 2017 Requirement for Restriction/Election of Species issued in U.S. Appl. No. 14/487,554.

2D-RGB PLANE DATA

GLt PLANE DATA

GRt PLANE DATA

BLt PLANE DATA

BRt PLANE DATA

RLt PLANE DATA

RRt PLANE DATA $N:L_t:R_t=14:1:1$
$R_N:G_N:B_N=2:3:2$
$R_{Lt}:G_{Lt}:B_{Lt}=0:1:0$
$R_{Rt}:G_{Rt}:B_{Rt}=0:1:0$ $W_N:W_{Lt}:W_{Rt}=14:1:1$

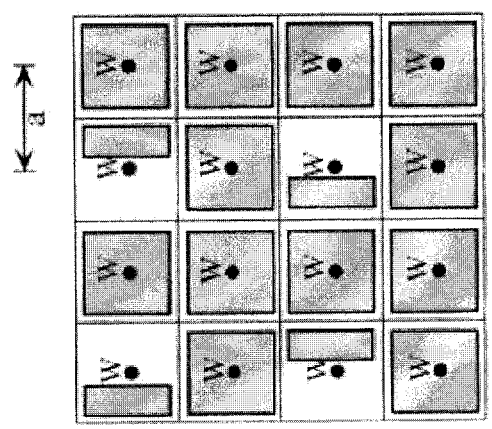
FIG.28A $W_N:W_{Lt}:W_{Rt}=6:1:1$

N:Lt:Rt=14:1:1
GN:GLt:GRt=2:1:1
GN:CN:MN:YN=1:2:2:2

FULL-OPEN
NO-PARALLAX
PIXEL

HALF-OPEN
NO-PARALLAX
PIXEL

ND IMAGE-CAPTURING
IMAGE SENSOR, IMAGE-CAPTURING APPARATUS AND IMAGE-CAPTURING SYSTEM

This application is a divisional application of U.S. patent application Ser. No. 14/487,554 filed on Sep. 16, 2014, which in turn claims priority to the following Japanese patent applications:

No. 2012-060737 filed on Mar. 16, 2012,
No. 2012-060738 filed on Mar. 16, 2012,
No. 2012-182417 filed on Aug. 21, 2012,
No. 2012-182420 filed on Aug. 21, 2012, and
PCT/JP2013/001811 filed on Mar. 15, 2013.

The contents of all applications are incorporated herein by reference in their entirety.

BACKGROUND

1. Technical Field

The present invention relates to an image sensor, an image-capturing apparatus and an image-capturing system.

2. Related Art

A known stereo image-capturing apparatus uses two image-capturing optical systems to capture a stereo image consisting of a left-eye image and a right-eye image. Such a stereo image-capturing apparatus has the two image-capturing optical systems arranged with a predetermined distance provided therebetween so as to generate parallax between the two images obtained by imaging the same subject.

Prior Art Document

Patent Document 1: Japanese Patent Application Publication No. 8-47001

When image data output from a single-chip image sensor is used to simultaneously produce 2D image data and color parallax image data, the resolutions of the 2D image data and the parallax image data may be both adversely affected.

SUMMARY

A first aspect of the innovations may include an image sensor having a primitive lattice formed by a group of pixels including at least four types of parallax pixels having photoelectric converter elements each of which is associated with (i) one of a first aperture mask and a second aperture mask that respectively have openings positioned to transmit different partial luminous fluxes of an incident luminous flux from each other and (ii) one of a first color filter and a second color filter that respectively transmit different wavelength ranges from each other, and no-parallax pixels configured to guide the incident luminous flux to photoelectric converter elements without limitation by openings. Here, in the group of pixels, the no-parallax pixels are more than the parallax pixels.

A second aspect of the innovations may include an image-capturing apparatus including the above-described image sensor, and an image processor configured to produce a plurality of pieces of parallax image data having parallax therebetween and 2D image data without parallax based on the outputs from the image sensor.

A third aspect of the innovations may include an image sensor including parallax pixels having photoelectric converter elements each of which is associated with one of a plurality of types of aperture masks that respectively have openings positioned to transmit different partial luminous fluxes of an incident luminous flux from each other, and no-parallax pixels configured to guide the incident luminous flux to photoelectric converter elements without limitation of openings. Here, the parallax pixels are arranged at equal intervals in both of two dimensional directions in such a manner that a parallax pixel associated with an aperture mask of one of the types is sandwiched between a no-parallax pixel and a parallax pixel associated with an aperture mask of a different one of the types, and parallax pixels associated with aperture masks of different ones of the types are arranged as distant as possible.

A fourth aspect of the innovations may include an image-capturing apparatus including the above-described image sensor, and an image processor configured to produce a plurality of pieces of parallax image data having parallax therebetween and 2D image data without parallax based on the outputs from the image sensor.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIGS. 28A and 28B illustrate, as an example, an arrangement in the real space and a corresponding k-space.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

A digital camera relating to the present embodiment, which is a form of an image processing apparatus and an image-capturing apparatus, is configured to be capable of producing for a single scene a plurality of images from a plurality of viewpoints with a single image-capturing operation. Here, the images from different viewpoints are referred to as parallax images.

Figure 1:
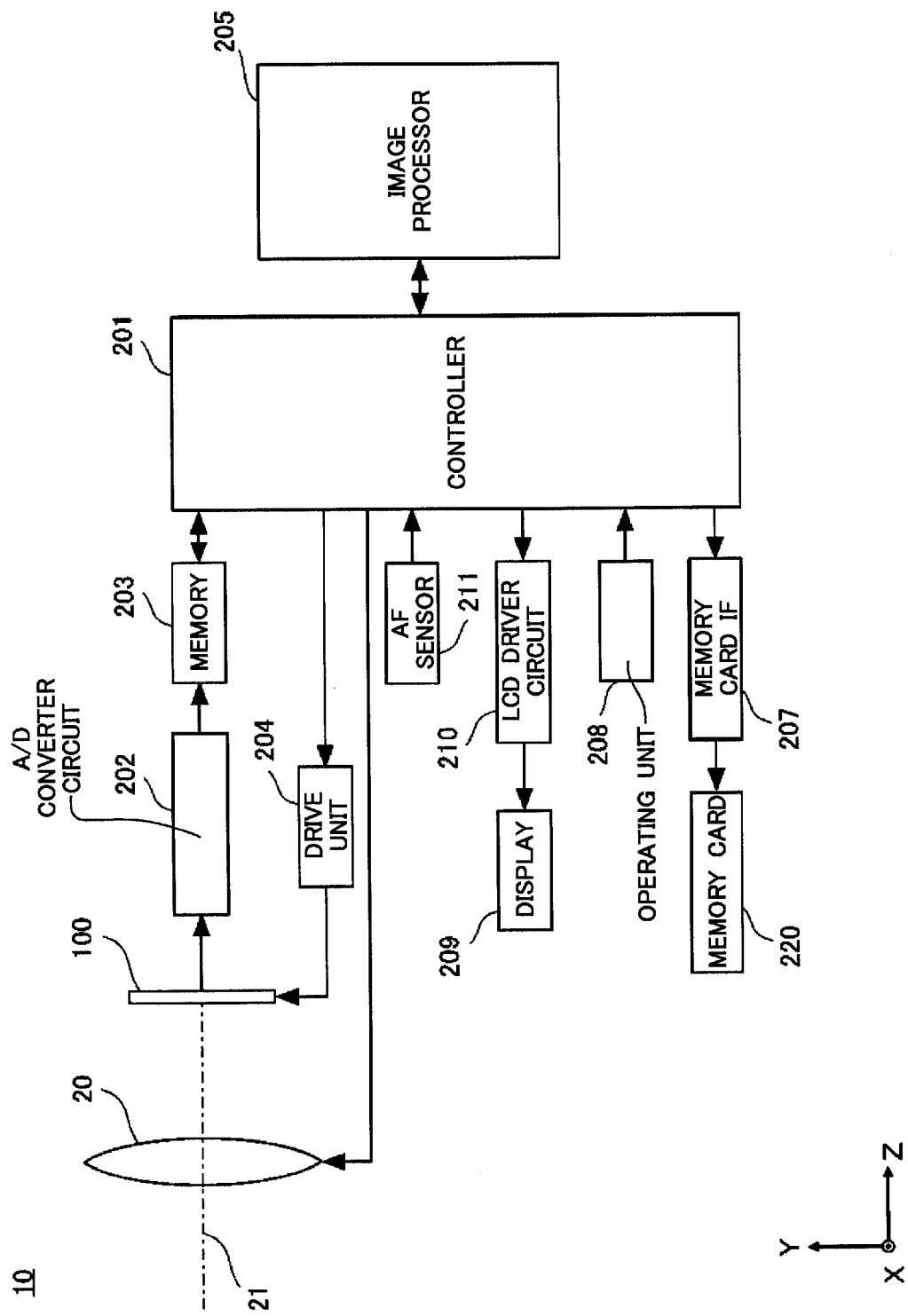
FIG. 1 illustrates the structure of a digital camera relating to an embodiment of the present invention.

FIG. 1 illustrates the structure of a digital camera 10. The digital camera 10 includes an image-capturing lens 20, which is an image-capturing optical system, and guides incoming subject luminous flux along an optical axis 21 to an image sensor 100. The image-capturing lens 20 may be a replaceable lens that is attachable and detachable to/from the digital camera 10. The digital camera 10 includes the image sensor 100, a controller 201, an A/D converter circuit 202, a memory 203, a drive unit 204, an image processor 205, a memory card IF 207, an operating unit 208, a display 209, an LCD driver circuit 210, and an AF sensor 211.

As shown in FIG. 1, a z-axis positive direction is defined as the direction parallel to the optical axis 21 toward the image sensor 100, an x-axis positive direction is defined as the direction toward the viewer of the sheet of FIG. 1 in the plane orthogonal to the z axis, and a y-axis positive direction is defined as the upward direction in the sheet of FIG. 1. In some of the following drawings, their coordinate axes are shown how the respective drawings are arranged relative to the coordinate axes of FIG. 1.

The image-capturing lens 20 is constituted by a group of optical lenses and configured to form an image from the subject luminous flux from a scene in the vicinity of its focal plane. For the convenience of description, the image-capturing lens 20 is hypothetically represented by a single lens positioned in the vicinity of the pupil in FIG. 1. The image sensor 100 is positioned in the vicinity of the focal plane of the image-capturing lens 20. The image sensor 100 is an image sensor having a two-dimensionally arranged photoelectric converter elements, for example, a CCD or CMOS sensor. The timing of the image sensor 100 is controlled by the driver unit 204 so that the image sensor 100 can convert a subject image formed on the light receiving surface into an image signal and outputs the image signal to the A/D converter circuit 202.

The A/D converter circuit 202 converts the image signal output from the image sensor 100 into a digital image signal and outputs the digital image signal to the memory 203. The image processor 205 uses the memory 203 as its workspace to perform a various image processing operations and thus generates image data.

The image processor 205 additionally performs general image processing operations such as adjusting image data in accordance with a selected image format. The produced image data is converted by the LCD drive circuit 210 into a display signal and displayed on the display 209. In addition, the produced image data is stored in the memory card 220 attached to the memory card IF 207.

The AF sensor 211 is a phase detection sensor having a plurality of ranging points set in a subject space and configured to detect a defocus amount of a subject image for each ranging point. A series of image-capturing sequences is initiated when the operating unit 208 receives a user operation and outputs an operating signal to the controller 201. The various operations such as AF and AE associated with the image-capturing sequences are performed under the control of the controller 201. For example, the controller 201 analyzes the detection signal from the AF sensor 211 to perform focus control to move a focus lens that constitutes a part of the image-capturing lens 20.

Figure 2:
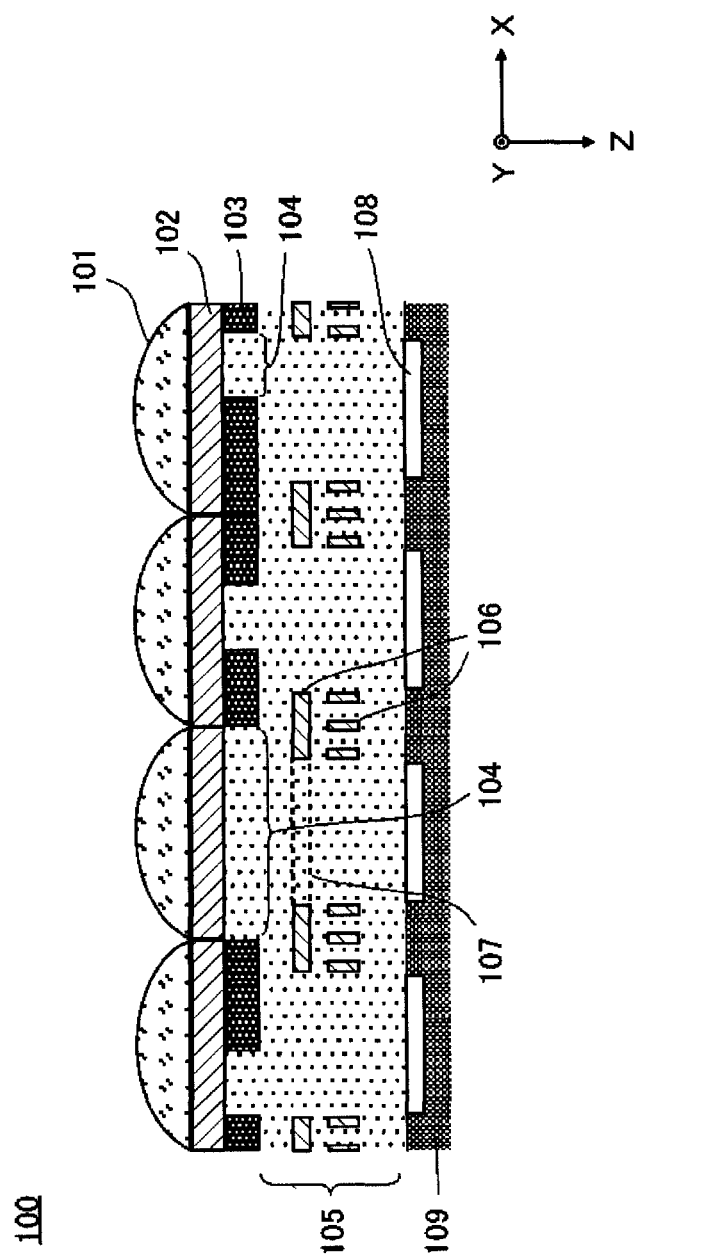
FIG. 2 is a cross-sectional view illustrating the structure of an image sensor relating to an embodiment of the present invention.

The following describes the structure of the image sensor 100 in detail. FIG. 2 schematically illustrates the cross-section of the image sensor 100 relating to an embodiment of the present invention.

The image sensor 100 is structured in such a manner that microlenses 101, color filters 102, aperture masks 103, an interconnection layer 105 and photoelectric converter elements 108 are arranged in the stated order when seen from the side facing a subject. The photoelectric converter elements 108 are formed by photodiodes that may convert incoming light into an electrical signal. The photoelectric converter elements 108 are arranged two-dimensionally on the surface of a substrate 109.

The image signals produced by the conversion performed by the photoelectric converter elements 108, control signals to control the photoelectric converter elements 108 and the like are transmitted and received via interconnections 106 provided in the interconnection layer 105. The aperture masks 103 having openings 104, which are provided in a one-to-one correspondence with the photoelectric converter elements 108, are provided in contact with the interconnection layer 105. Each of the openings 104 is shifted in accordance with a corresponding one of the photoelectric converter elements 108 and strictly positioned relative to the corresponding photoelectric converter element 108 as described later. As described later in more details, the aperture masks 103 having the openings 104 effectively cause parallax in the subject luminous flux received by the photoelectric converter elements 108.

On the other hand, no aperture masks 103 are provided on some of the photoelectric converter elements 108 that do not cause parallax. In other words, such photoelectric converter elements 108 are provided with the aperture masks 103 having such openings 104 that do not limit the subject luminous flux incident on the corresponding photoelectric converter elements 108 or allow the entire incident luminous flux to transmit through the aperture masks 103. Although these photoelectric converter elements 108 do not cause parallax, the incoming subject luminous flux is substantially defined by an opening 107 formed by the interconnections 106. Therefore, the interconnections 106 can be viewed as an aperture mask that does not cause parallax and allows the entire incoming luminous flux to pass. The aperture masks 103 may be arranged independently and separately from the photoelectric converter elements 108 and in correspondence with the photoelectric converter elements 108, or may be formed jointly with the photoelectric converter elements 108, like the way how the color filters 102 are manufactured.

The color filters 102 are provided on the aperture masks 103. Each of the color filters 102 is colored so as to transmit a particular wavelength range to a corresponding one of the photoelectric converter elements 108, and the color filters 102 are arranged in a one-to-one correspondence with the photoelectric converter elements 108. To output a color image, at least two different types of color filters that are different from each other need to be arranged. However, three or more different types of color filters may need to be arranged to produce a color image with higher quality. For example, red filters (R filters) to transmit the red wavelength range, green filters (G filters) to transmit the green wavelength range, and blue filters (B filters) to transmit the blue wavelength range may be arranged in a lattice pattern. The way how the filters are specifically arranged will be described later.

The microlenses 101 are provided on the color filters 102. The microlenses 101 are each a light collecting lens to guide more of the incident subject luminous flux to the corresponding photoelectric converter element 108. The microlenses 101 are provided in a one-to-one correspondence with the photoelectric converter elements 108. The optical axis of each microlens 101 is preferably shifted so that more of the subject luminous flux is guided to the corresponding photoelectric converter element 108 taking into consideration the relative positions between the pupil center of the image-capturing lens 20 and the corresponding photoelectric converter element 108. Furthermore, the position of each of the microlenses 101 as well as the position of the opening 104 of the corresponding aperture mask 103 may be adjusted to allow more of the particular subject luminous flux to be incident, which will be described later.

Here, a pixel is defined as a single set constituted by one of the aperture masks 103, one of the color filters 102, and one of the microlenses 101, which are provided in a one-to-one correspondence with the photoelectric converter elements 108 as described above. To be more specific, a pixel with an aperture mask 103 that causes parallax is referred to as a parallax pixel, and a pixel without an aperture mask 103 that causes parallax is referred to as a no-parallax pixel. For example, when the image sensor 100 has an effective pixel region of approximately 24 mm×16 mm, the number of pixels reaches as many as approximately 12 million.

When image sensors have high light collection efficiency and photoelectric conversion efficiency, the microlenses 101 may be omitted. Furthermore, in the case of back side illumination image sensors, the interconnection layer 105 is provided on the opposite side of the photoelectric converter elements 108. In addition, the color filters 102 and the aperture masks 103 can be integrally formed by allowing the openings 104 of the aperture masks 103 to have color components.

In the present embodiment, the aperture masks 103 are separately formed from the interconnections 106, but the function of the aperture masks 103 in the parallax pixels may be alternatively performed by the interconnections 106. In other words, defined opening shapes are formed by the interconnections 106 and limit the incident luminous flux to allow only particular partial luminous flux to pass to reach the photoelectric converter elements 108. In this case, the interconnections 106 forming the opening shapes are preferably positioned closest to the photoelectric converter elements 108 in the interconnection layer 105.

The aperture masks 103 may be formed by a transmission preventing film that is overlaid on the photoelectric converter elements 108. In this case, the aperture masks 103 are formed in such a manner that, for example, a SiN film and a $SiO_2$ film are sequentially stacked to form a transmission preventing film and regions corresponding to the openings 104 are removed by etching.

Figure 3:
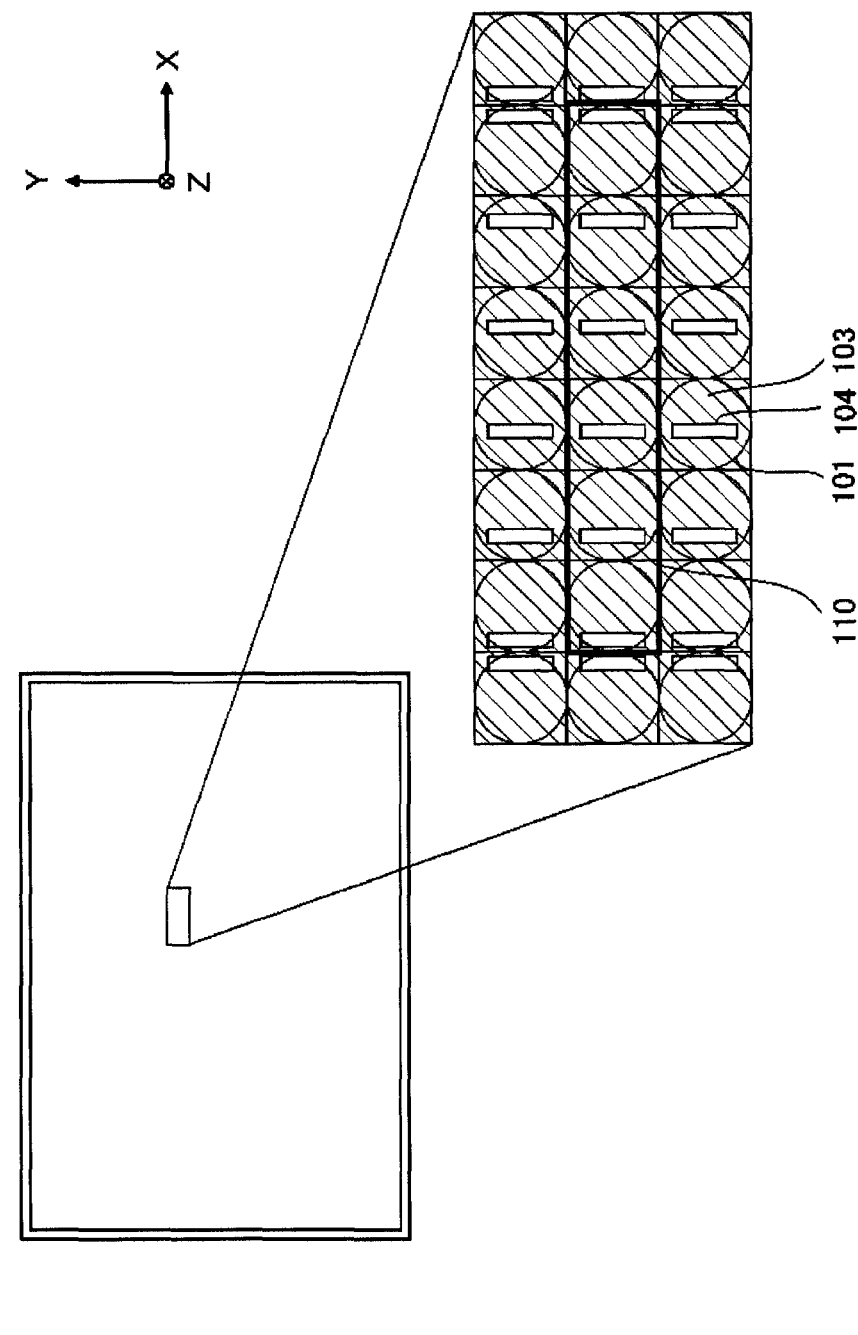
FIG. 3 schematically illustrates an enlarged portion of the image sensor.

The following describes the relation between the openings 104 of the aperture masks 103 and parallax caused. FIG. 3 schematically illustrates an enlarged portion of the image sensor 100. To simplify the description, the arrangement of the colors of the color filters 102 is not considered here, which will be mentioned later. In the following description where the arrangement of the colors of the color filters 102 is ignored, the image sensor 100 may be viewed as an image sensor that is constituted only by parallax pixels having the color filters 102 of the same color. Accordingly, the repeating pattern described in the following may be viewed as applied to the adjacent pixels among the color filters 102 of the same color.

As shown in FIG. 3, the openings 104 of the aperture masks 103 are shifted relative to the corresponding pixels. Furthermore, the openings 104 of the adjacent pixels are positioned differently from each other.

In the example shown in FIG. 3, six different types of aperture masks 103 are provided, in which the openings 104 are shifted in the left and right directions relative to the corresponding pixels. When the image sensor 100 as a whole is considered, photoelectric converter element groups, each of which has six parallax pixels having the aperture masks 103, are two-dimensionally and periodically arranged such that the openings 104 are shifted from left to right on the sheet of FIG. 3.

Figure 4A:
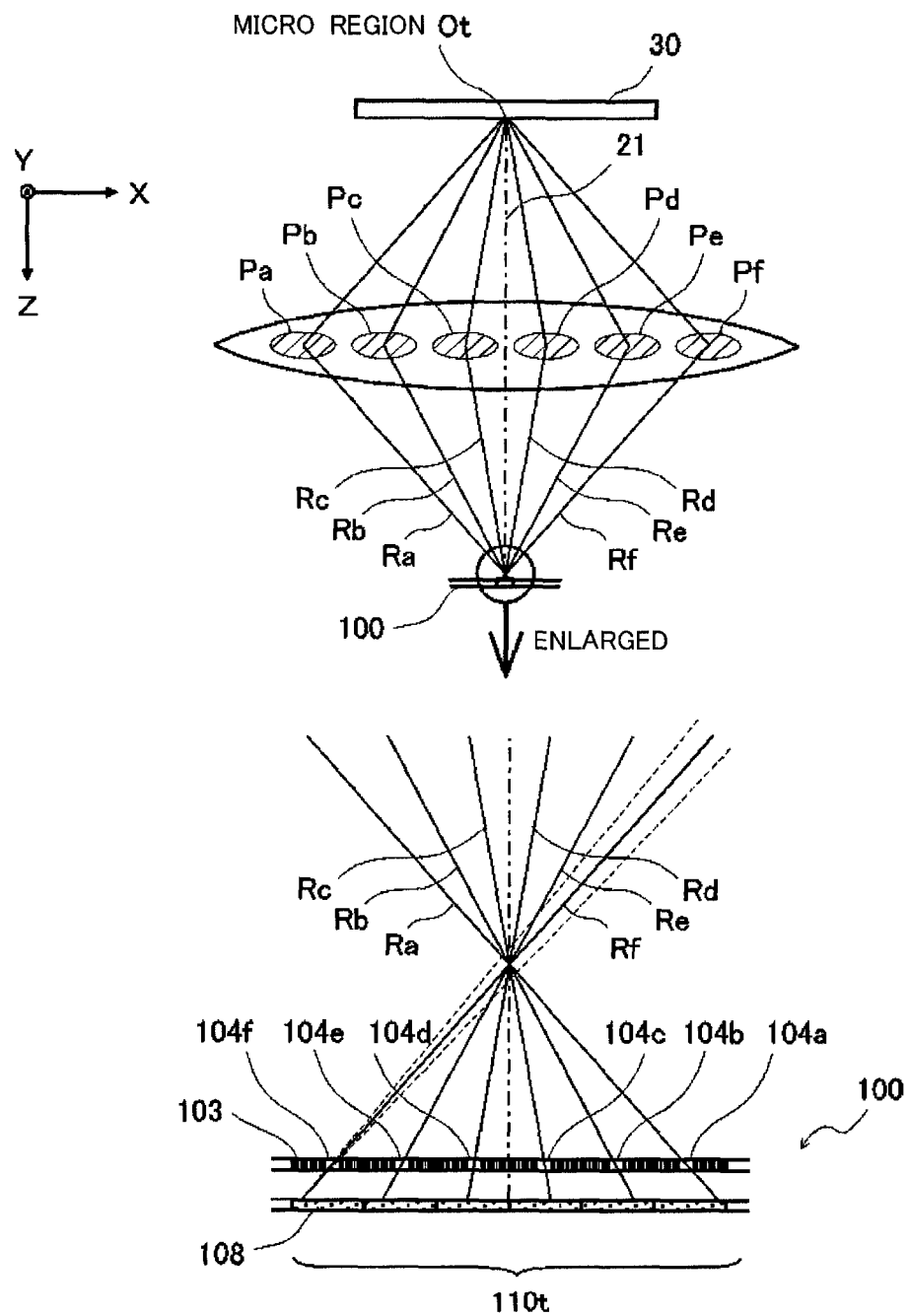
FIGS. 4A, 4B and 4C are conceptual views to illustrate the relation between a parallax pixel and a subject.
Figure 4B:
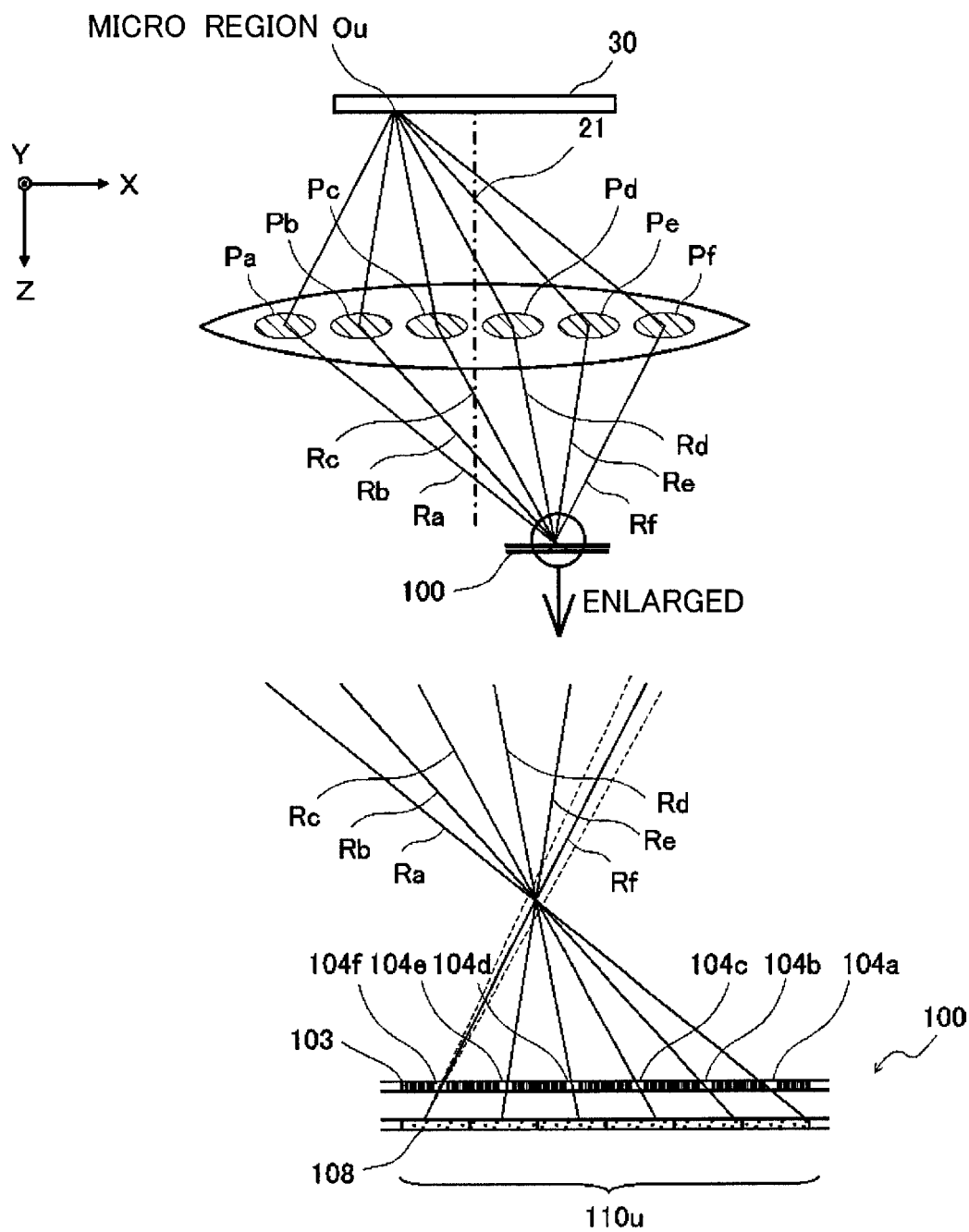
Figure 4C:
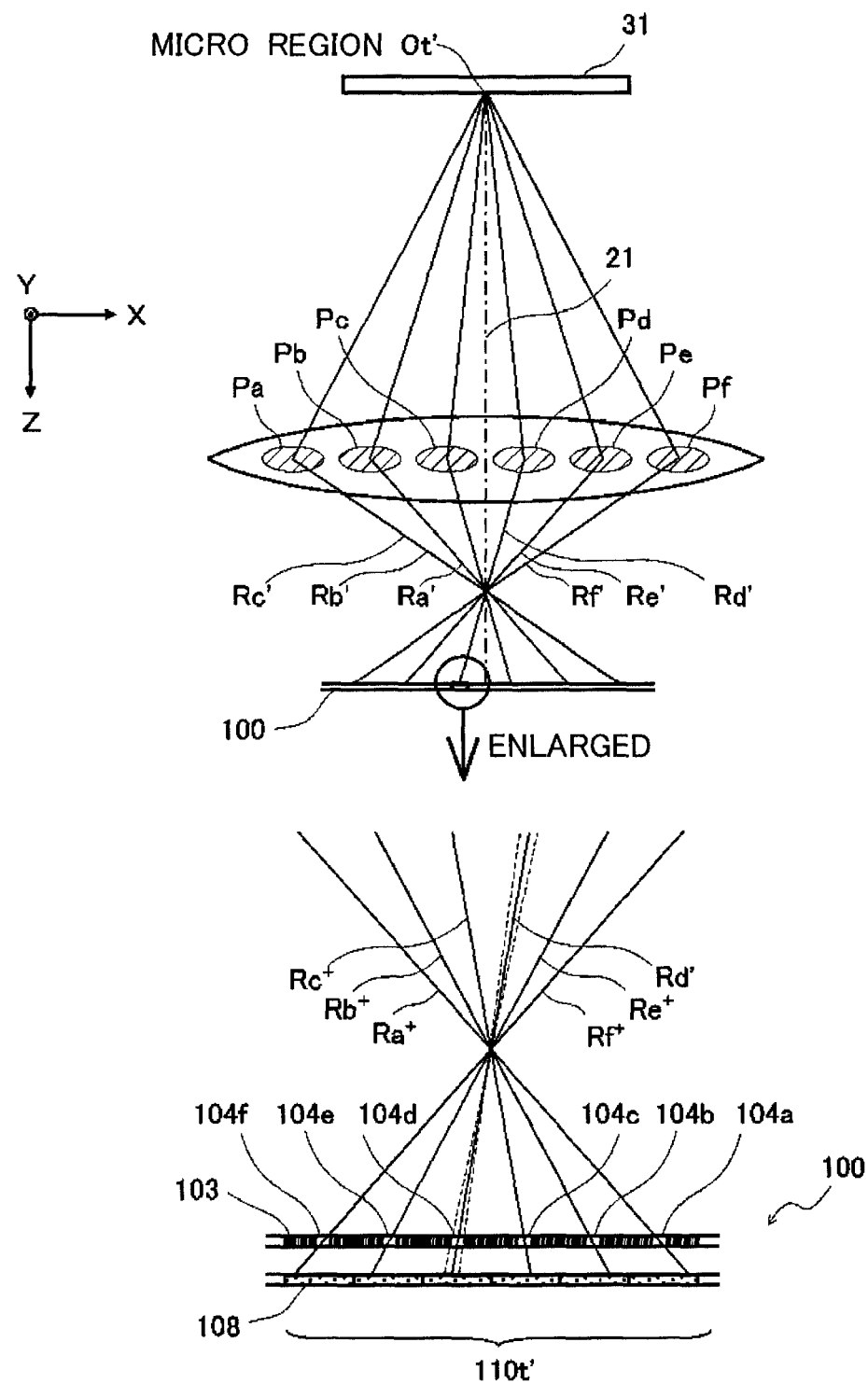

FIGS. 4A, 4B and 4C are each a conceptual diagram illustrating the relation between parallax pixels and a subject. To be specific, FIG. 4A illustrates a photoelectric converter element group having a repeating pattern 110$t$ arranged at the center of the image sensor 100 through which the image-capturing optical axis 21 extends. FIG. 4B schematically illustrates a photoelectric converter element group having a repeating pattern 110$u$ of the parallax pixels arranged in the peripheral portion of the image sensor 100. In FIGS. 4A and 4B, a subject 30 is positioned at a focus position relative to the image-capturing lens 20. FIG. 4C schematically illustrates the relation between the parallax pixels and the subject when a subject 31 at a non-focus position relative to the image-capturing lens 20 is captured, correspondingly to the relation shown in FIG. 4A.

The following first describes the relation between the parallax pixels and the subject when the image-capturing lens 20 captures the subject 30 at the focus position. The subject luminous flux is guided through the pupil of the image-capturing lens 20 to the image sensor 100. Here, six partial regions Pa to Pf are defined in the entire cross-sectional region through which the subject luminous flux transmits. For example, see the pixel, on the extreme left in the sheet of FIGS. 4A to 4C, of the photoelectric converter element groups having the repeating patterns 110$t$ and 110$u$. The position of the opening 104$f$ of the aperture mask 103 is defined so that only the subject luminous flux emitted from the partial region Pf reaches the photoelectric converter element 108 as seen from the enlarged view. Likewise, towards the pixel on the far right, the position of the opening 104$e$ is defined so as to correspond to the partial region Pe, the position of the opening 104$d$ is defined so as to correspond to the partial region Pd, the position of the openings 104$c$ is defined so as to correspond to the partial region Pc, the position of the openings 104$b$ is defined so as to correspond to the partial region Pb, and the position of the opening 104$a$ is defined so as to correspond to the partial region Pa.

Stated differently, for example, the gradient of the main light ray Rf of the subject luminous flux (partial luminous flux) emitted from the partial region Pf, which is defined by the relative positions of the partial region Pf and the leftmost pixel, may determine the position of the opening 104$f$. When the photoelectric converter element 108 receives the subject luminous flux through the opening 104$f$ from the subject 30 at the focus position, the subject luminous flux forms an image on the photoelectric converter element 108 as indicated by the dotted line. Likewise, toward the rightmost pixel, the gradient of the main light ray Re determines the position of the opening 104$e$, the gradient of the main light ray Rd determines the position of the opening 104$d$, the gradient of the main light ray Rc determines the position of the opening 104$c$, the gradient of the main light ray Rb determines the position of the opening 104$b$, and the gradient of the main light ray Ra determines the position of the opening 104$a$.

As shown in FIG. 4A, the luminous flux emitted from a micro region Ot of the subject 30 at the focus position, which coincides with the optical axis 21 on the subject 30, passes through the pupil of the image-capturing lens 20 and reaches the respective pixels of the photoelectric converter element group having the repeating pattern 110$t$. In other words, the pixels of the photoelectric converter element group having the repeating pattern 110$t$ respectively receive the luminous flux emitted from the single micro region Ot through the six partial regions Pa to Pf. The micro region Ot has a certain spread that can accommodate the different positions of the respective pixels of the photoelectric converter element group having the repeating pattern 110$t$, but can be substantially approximated by substantially the same object point. Likewise, as shown in FIG. 4B, the luminous flux emitted from a micro region Ou of the subject 30 at the focus position, which is spaced away from the optical axis 21 on the subject 30, passes through the pupil of the image-capturing lens 20 to reach the respective pixels of the photoelectric converter element group having the repeating pattern 110$u$. In other words, the respective pixels of the photoelectric converter element group having the repeating pattern 110$u$ respectively receive the luminous flux emitted from the single micro region Ou through the six partial regions Pa to Pf. Like the micro region Ot, the micro region Ou has a certain spread that can accommodate the different positions of the respective pixels of the photoelectric converter element group having the repeating pattern 110$u$, but can be substantially approximated by substantially the same object point.

That is to say, as long as the subject 30 is at the focus position, the photoelectric converter element groups capture different micro regions depending on the positions of the repeating patterns 110 on the image sensor 100, and the respective pixels of each photoelectric converter element group capture the same micro region through the different partial regions. In the respective repeating patterns 110, the corresponding pixels receive subject luminous flux from the same partial region. To be specific, in FIGS. 4A and 4B, for example, the leftmost pixels of the repeating patterns 110$t$ and 110$u$ receive the partial luminous flux from the same partial region Pf.

Strictly speaking, the position of the opening 104$f$ of the leftmost pixel that receives the subject luminous flux from the partial region Pf in the repeating pattern 110$t$ at the center through which the image-capturing optical axis 21 extends is different from the position of the opening 104$f$ of the leftmost pixel that receives the subject luminous flux from the partial region Pf in the repeating pattern 110$u$ at the peripheral portion. From the perspective of the functions, however, these openings can be treated as the same type of aperture masks in that they are both aperture masks to receive the subject luminous flux from the partial region Pf. Accordingly, in the example shown in FIGS. 4A to 4C, it can be said that each of the parallax pixels arranged on the image sensor 100 has one of the six types of aperture masks.

The following describes the relation between the parallax pixels and the subject when the image-capturing lens 20 captures the subject 31 at the non-focus position. In this case, the subject luminous flux from the subject 31 at the non-focus position also passes through the six partial regions Pa to Pf of the pupil of the image-capturing lens 20 to reach the image sensor 100. However, the subject luminous flux from the subject 31 at the non-focus position forms an image not on the photoelectric converter elements 108 but at a different position. For example, as shown in FIG. 4C, when the subject 31 is at a more distant position from the image sensor 100 than the subject 30 is, the subject luminous flux forms an image at a position closer to the subject 31 with respect to the photoelectric converter elements 108. On the other hand, when the subject 31 is at a position closer to the image sensor 100 than the subject 30 is, the subject luminous flux forms an image at a position on the opposite side of the subject 31 with respect to the photoelectric converter elements 108.

Accordingly, the subject luminous flux emitted from a micro region Ot' of the subject 31 at the non-focus position reaches the corresponding pixels of different repeating patterns 110 depending on which of the six partial regions Pa to Pf the subject luminous flux passes through. For example, the subject luminous flux that has passed through the partial region Pd enters the photoelectric converter element 108 having the opening 104$d$ included in the repeating pattern 110$t'$ as a main light ray Rd' as shown in the enlarged view of FIG. 4C. The subject luminous flux that has passed through the other partial regions may be emitted from the micro region Ot', but does not enter the photoelectric converter elements 108 included in the repeating pattern 110$t'$ and enters the photoelectric converter elements 108 having the corresponding openings in different repeating patterns. In other words, the subject luminous fluxes that reach the respective photoelectric converter elements 108 constituting the repeating pattern 110t' are subject luminous fluxes emitted from different micro regions of the subject 31. To be specific, the subject luminous flux having the main light ray Rd' enters the photoelectric converter element 108 corresponding to the opening 104d, and the subject luminous fluxes having the main light rays $Ra^+$, $Rb^+$, $Rc^+$, $Re^+$, $Rf^+$, which are emitted from different micro regions of the subject 31, enter the photoelectric converter elements 108 corresponding to the other openings 104. The same relation is also seen in the repeating pattern 110u arranged in the peripheral portion shown in FIG. 4B.

Here, when the image sensor 100 is seen as a whole, for example, a subject image A captured by the photoelectric converter element 108 corresponding to the opening 104a and a subject image D captured by the photoelectric converter element 108 corresponding to the opening 104d match with each other if they are images of the subject at the focus position, and do not match with each other if they are images of the subject at the non-focus position. The direction and amount of the non-match are determined by on which side the subject at the non-focus position is positioned with respect to the focus position, how much the subject at the non-focus position is shifted from the focus position, and the distance between the partial region Pa and the partial region Pd. Stated differently, the subject images A and D are parallax images causing parallax therebetween. This relation also applies to the other openings, and six parallax images are formed corresponding to the openings 104a to 104f.

Accordingly, a collection of outputs from the corresponding pixels in different ones of the repeating patterns 110 configured as described above produces a parallax image. To be more specific, the outputs from the pixels that have received the subject luminous flux emitted from a particular partial region of the six partial regions Pa to Pf form a parallax image.

Figure 5:
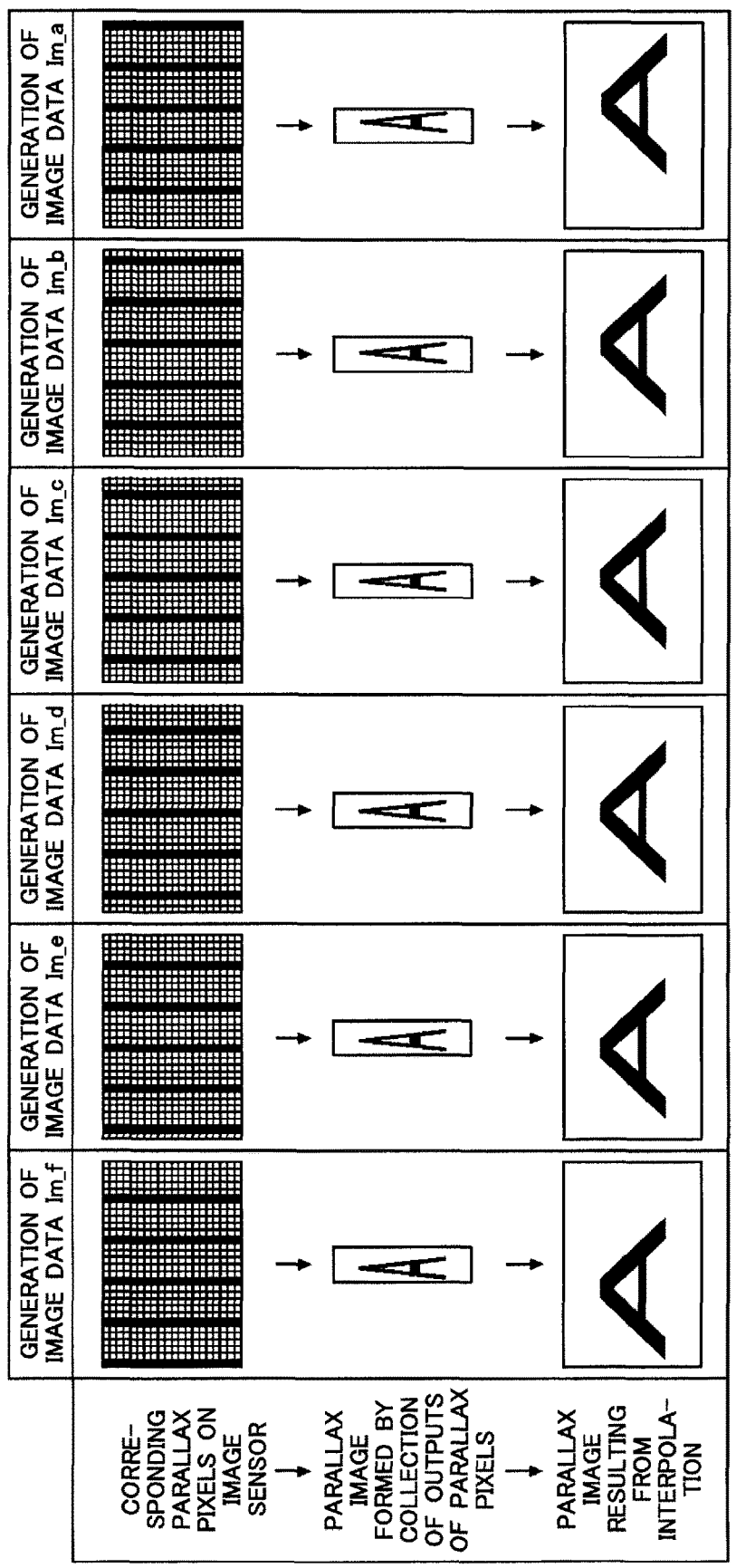
FIG. 5 is a conceptual view to illustrate how to produce a parallax image.

FIG. 5 is a conceptual diagram to illustrate an operation to produce a parallax image. FIG. 5 shows, from left to right, how parallax image data Im_f is produced by collecting the outputs from the parallax pixels corresponding to the openings 104f, how parallax image data Im_e is produced from the outputs of the parallax pixels corresponding to the openings 104e, how parallax image data Im_d is produced from the outputs of the parallax pixels corresponding to the openings 104d, how parallax image data Im_c is produced from the outputs of the parallax pixels corresponding to the openings 104c, how parallax image data Im_b is produced from the outputs of the parallax pixels corresponding to the openings 104b, and how parallax pixel data Im_a is produced from the outputs from the parallax pixels corresponding to the openings 104a. The following first describes how parallax image data Im_f is produced by collecting the outputs from the parallax pixels corresponding to the openings 104f.

The repeating patterns 110 each of which has a photoelectric converter element group constituted by a group of six parallax pixels are arranged side-by-side. Accordingly, on the hypothetical image sensor 100 excluding no-parallax pixels, the parallax pixels having the openings 104f are found every six pixels in the horizontal direction and consecutively arranged in the vertical direction. These pixels receive subject luminous fluxes from different micro regions as described above. Therefore, parallax images can be obtained by collecting and arranging the outputs from theses parallax pixels.

However, the pixels of the image sensor 100 of the present embodiment are square pixels. Therefore, if the outputs are simply collected, the number of pixels in the horizontal direction is reduced to one-sixth and vertically long image data is produced. To address this issue, interpolation is performed to increase the number of pixels in the horizontal direction six times. In this manner, the parallax image data Im_f is produced as an image having the original aspect ratio. Note that, however, the horizontal resolution is lower than the vertical resolution since the parallax image data before the interpolation represents an image whose number of pixels in the horizontal direction is reduced to one-sixth. In other words, the number of pieces of parallax image data produced is inversely related to the improvement of the resolution. The interpolation applied in the present embodiment will be specifically described later.

In the similar manner, parallax image data Im_e to parallax image data Im_a are obtained. Stated differently, the digital camera 10 can produce parallax images from six different viewpoints with horizontal parallax.

The above has described an exemplary case where the openings of the parallax pixels have six different types of position shifts with respect to the center of the pixels and the different types of parallax pixels function as a pupil-division optical system to provide for parallax pixels of six viewpoints. The above mainly describes that the respective types of parallax pixels form subject images of different viewpoints and the different types of parallax pixels cause parallax between images taken from different viewpoints.

A pupil-division optical system using parallax pixels not only causes parallax but also, more importantly, causes parallax only between blur images of a subject at a non-focus position that is off the focus position according to the degree of the non-focus.

This fact is described for a normal no-parallax pixel and two pixels (left and right pixels) with reference to FIGS. 17A and 17B and FIGS. 18A and 18B. Light, which has passed through a single optical system, forms an optical image as if the hypothetical pupil is provided on the left side of the optical system in the case of a right parallax pixel and forms an optical image as if the hypothetical pupil is provided on the right-hand side of the optical system in the case of a left parallax pixel. Accordingly, the point spread function of the image of a subject at the focus position is sharp, and the light from the subject at the focus position forms a no-parallax subject image having a sharp point spread irrespective of whether the light passes through either of the hypothetical pupils. On the other hand, the point spread function of a subject at a position that is off the focus position toward or away from the optical system is broad. Furthermore, as the subject is moved away from the focus position, the blur width of the subject image increases and the centers of the respective formed images are further spaced away from each other in the left-and-right direction, which causes parallax. When these two separate point spread functions are added and combined together, the resulting single point spread function matches with the point spread function of the image formed by the no-parallax pixel, and the peak of the resulting single point spread function is positioned between and equally distant from the point spread functions of the two separate optical images formed by the hypothetical pupils.

The present embodiment takes advantage of the important fact that parallax only exists in the blur and the disparity increases as the blur increases. The present embodiment proposes a color and parallax arrangement that is designed to simultaneously obtain high-definition 2D and 3D images.

Figure 6:
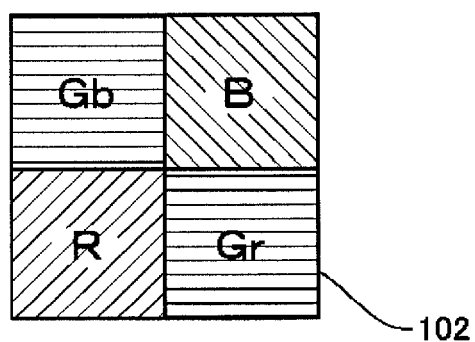
FIG. 6 illustrates a Bayer arrangement.

The following describes the color filters 102 and the parallax images. FIG. 6 illustrates a Bayer arrangement. As shown in FIG. 6, G filters are assigned to the two pixels, i.e., the upper-left (Gb) and lower right (Gr) pixels, an R filter is assigned to one pixel, i.e., the lower left pixel, and a B filter is assigned to one pixel, i.e., an upper right pixel in the Bayer arrangement.

Based on such an arrangement of the color filters 102, an enormous number of different repeating patterns 110 can be defined depending on to what colors the parallax and no-parallax pixels are allocated and how frequently parallax and no-parallax pixels are allocated. Collecting the outputs of the no-parallax pixels can produce no-parallax captured image data like an ordinary captured image. Accordingly, a high-resolution 2D image can be output by increasing the ratio of the no-parallax pixels relative to the parallax pixels. In this case, the ratio of the parallax pixels decreases relative to the no-parallax pixels and a 3D image formed by a plurality of parallax images exhibits lower image quality. On the other hand, if the ratio of the parallax pixels increases, the 3D image exhibits improved image quality. However, since the ratio of the no-parallax pixels decreases relative to the parallax pixels, a low-resolution 2D image is output. If the parallax pixels are allocated to all of the R, G and B pixels, the resulting color image data represents a 3D image having excellent color reproducibility and high quality.

Irrespective of whether the color image data represents a 2D or 3D image, the color image data ideally has high resolution and quality. Here, the region of a 3D image for which an observer senses parallax when observing the 3D image is the non-focus region in which the identical subject images do not match, as understood from the cause of the parallax, which is described with reference to FIGS. 4A to 4C, 17A and 17B, and 18A and 18B. This means that, in the region of the image in which the observer senses parallax, fewer high-frequency components are present than in the focused image of the main subject. Considering this, the image data required to produce a 3D image does not need to have very high resolution in the region in which parallax is generated.

Regarding the focused region of the image, the corresponding image data is extracted from 2D image data. Regarding the non-focused region of the image, the corresponding image data is extracted from 3D image data. In this way, parallax image data can be produced by combining these pieces of image data for the focused and non-focused regions. Alternatively, high-resolution 2D image data is used as basic data and multiplied by the relative ratios of the 3D image data on the pixel-by-pixel basis. In this way, high-resolution parallax image data can be produced. When such image processing is employed, the number of the parallax pixels may be allowed to be smaller than the number of the no-parallax pixels in the image sensor 100. In other words, a 3D image having a relatively high resolution can be produced even if the number of the parallax pixels is relatively small.

In this case, to produce the 3D image in color, at least two different types of color filters may need to be arranged. In the present embodiment, however, three types of, i.e., R, G and B color filters are employed as in the Bayer arrangement described with reference to FIG. 6 in order to further improve the image quality. To be specific, in the present embodiment where the number of parallax pixels is relatively small, the parallax pixels have all of the combinations of the different types of openings 104 and the three types of, i.e., R, G and B color filters. Parallax Lt pixels having an opening 104 shifted to the left from the center and parallax Rt pixels having an opening 104 shifted to the right from the center are taken as an example. The parallax Lt pixels include a pixel having an R filter, a pixel having a G filter, and a pixel having a B filter, and the parallax Rt pixels include a pixel having an R filter, a pixel having a G filter, and a pixel having a B filter. Thus, the image sensor 100 has six different types of parallax pixels. Such an image sensor 100 outputs image data, which is used to form clear color parallax image data to realize a stereoscopic view. Note that, when two types of openings are combined with two types of color filters, the image sensor 100 has four types of parallax pixels.

Figure 7:
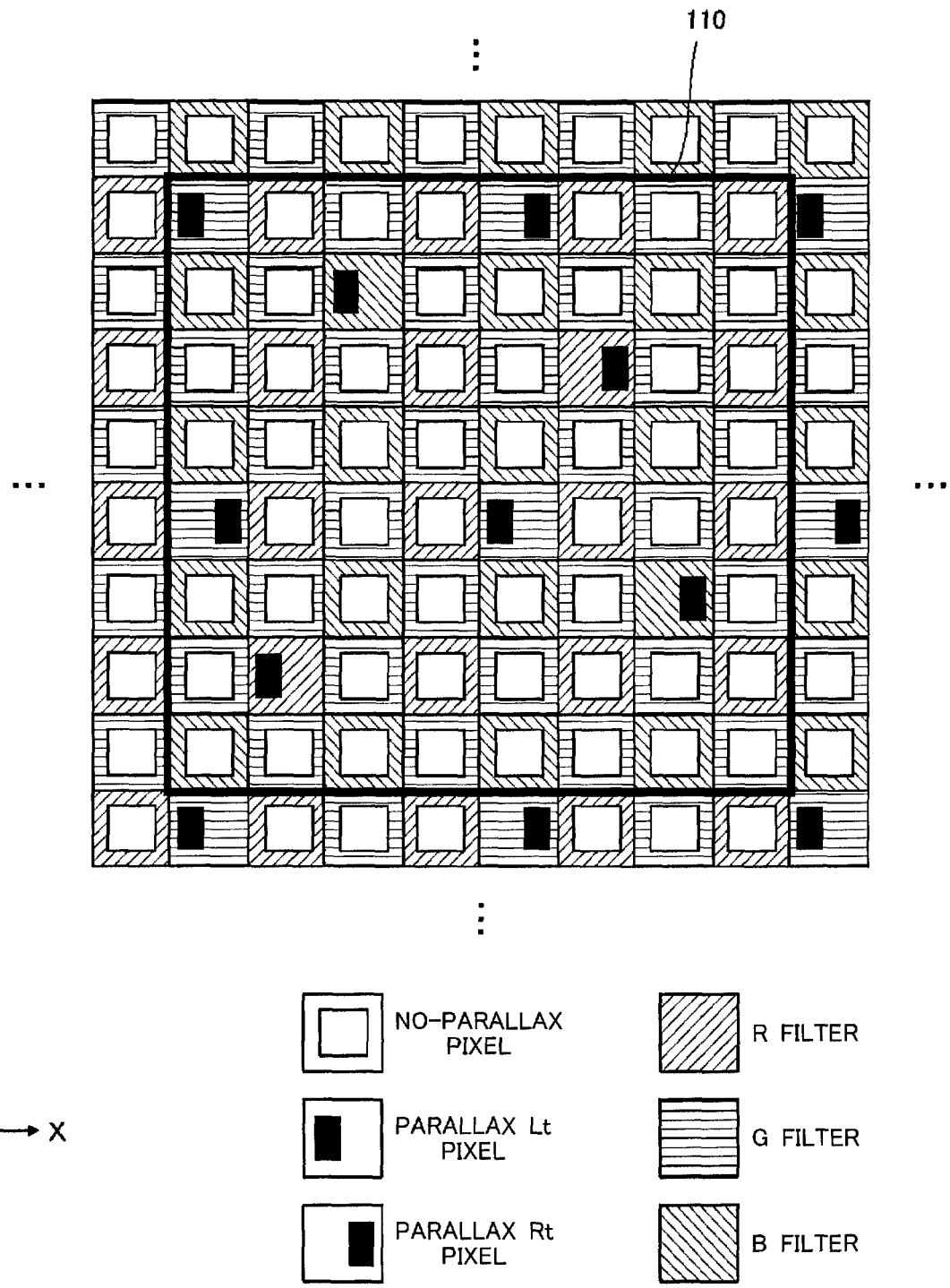
FIG. 7 illustrates how pixels are arranged in a repeating pattern 110 in a first implementation.

The following describes a variation of the pixel arrangement. FIG. 7 illustrates the arrangement of pixels in a repeating pattern 110 relating to a first implementation. The repeating pattern 110 relating to the first implementation includes four Bayer arrangements, each of which is formed by four pixels, arranged both in the vertical direction, which is the Y-axis direction, and in the horizontal direction, which is the X-axis direction, and is thus constituted by sixty-four pixels. This repeating pattern 110 has a group of 64 pixels as a single unit, and a plurality of repeating patterns 110 are periodically arranged horizontally and vertically within the effective pixel region of the image sensor 100. Thus, the repeating pattern 110 bounded by the thick bold line in FIG. 7 is the primitive lattice in the image sensor 100. Here, the pixels within the repeating pattern 110 are represented as $P_{IJ}$. For example, the leftmost and uppermost pixel is represented as $P_{11}$ and the rightmost and uppermost pixel is represented as $P_{81}$.

Each of the parallax pixels relating to the first implementation has one of the two types of aperture masks 103, so that the parallax pixels are divided into the parallax Lt pixels having the openings 104 shifted to the left from the center of the pixels and the parallax Rt pixels having the openings 104 shifted to the right from the center of the pixels. As shown in FIG. 7, the parallax pixels are arranged in the following manner.

$P_{11}$ . . . parallax Lt pixel+G filter (=G(Lt))
$P_{51}$ . . . parallax Rt pixel+G filter (=G(Rt))
$P_{32}$ . . . parallax Lt pixel+B filter (=B(Lt))
$P_{63}$ . . . parallax Rt pixel+R filter (=R(Rt))
$P_{15}$ . . . parallax Rt pixel+G filter (=G(Rt))
$P_{55}$ . . . parallax Lt pixel+G filter (=G(Lt))
$P_{76}$ . . . parallax Rt pixel+B filter (=B(Rt))
$P_{27}$ . . . parallax Lt pixel+R filter (=R(Lt))

The other pixels are no-parallax pixels and include no-parallax pixels+R filter (=R(N)), no-parallax pixels+G filter (=G(N)), and no-parallax pixels+B filter (=B(N)).

As described above, the pixel arrangement preferably includes the parallax pixels having all of the combinations of the different types of openings and the different types of color filters within the primitive lattice of the pixel arrangement and has the parallax pixels randomly arranged together with the no-parallax pixels that are more than the parallax pixels. To be more specific, it is preferable, when the parallax and no-parallax pixels are counted according to each type of color filters, that the no-parallax pixels are still more than the parallax pixels. In the case of the first implementation, while G(N)=28, G(Lt)+G(Rt)=2+2=4, while R(N)=14, R(Lt)+R(Rt)=2, and while B(N)=14, B(Lt)+B(Rt)=2. In addition, as described above, considering the human spectral sensitivity characteristics, more parallax and no-parallax pixels having the G filter are arranged than the parallax and no-parallax pixels having the other types of color filters.

Stated differently, it is attempted to obtain a higher-quality and more accurate color distribution structure for a stereoscopic view by acquiring information corresponding to all of the R, G and B colors also for the parallax pixels.

For the right parallax pixels, the left parallax pixels and the no-parallax pixels, the RGB ratio is commonly R:G:B=1:2:1, which is the same as in the Bayer arrangement. The parallax pixels have a low density and arranged away from each other as much as possible in order to allow the no-parallax pixels can keep the spatial resolution at the same level as the normal Bayer arrangement. In other words, the right parallax pixels of a particular color component are isotropically arranged at equal intervals and the left parallax pixels of a particular color component are also isotropically arranged at equal intervals, and, at the same time, the right parallax pixels of a particular color component are arranged as distant as possible from the left parallax pixels of the particular color component and the parallax pixels of the same color component are arranged at equal intervals whether they are right or left parallax pixels. In this way, when their color components are ignored, the right parallax pixels are arranged as distant as possible from each other and the left parallax pixels are arranged as distant as possible from each other, so that parallax information can be uniformly obtained.

In the first implementation, the ratio between the number of no-parallax pixels, the number of left parallax pixels and the number of right parallax pixels is N:Lt:Rt=14:1:1 and the spatial resolution of the no-parallax pixels is kept at a very similar level to the spatial resolution of the Bayer arrangement. Furthermore, since the parallax pixels are arranged as distant as possible, every parallax pixel is adjacent to a no-parallax pixel and there is no such risk that the resolutions achieved by adjacent pixels drop together. Accordingly, the first implementation maintains a high resolving power equivalent to high frequency components including the Nyquist frequency components.

Figure 8:
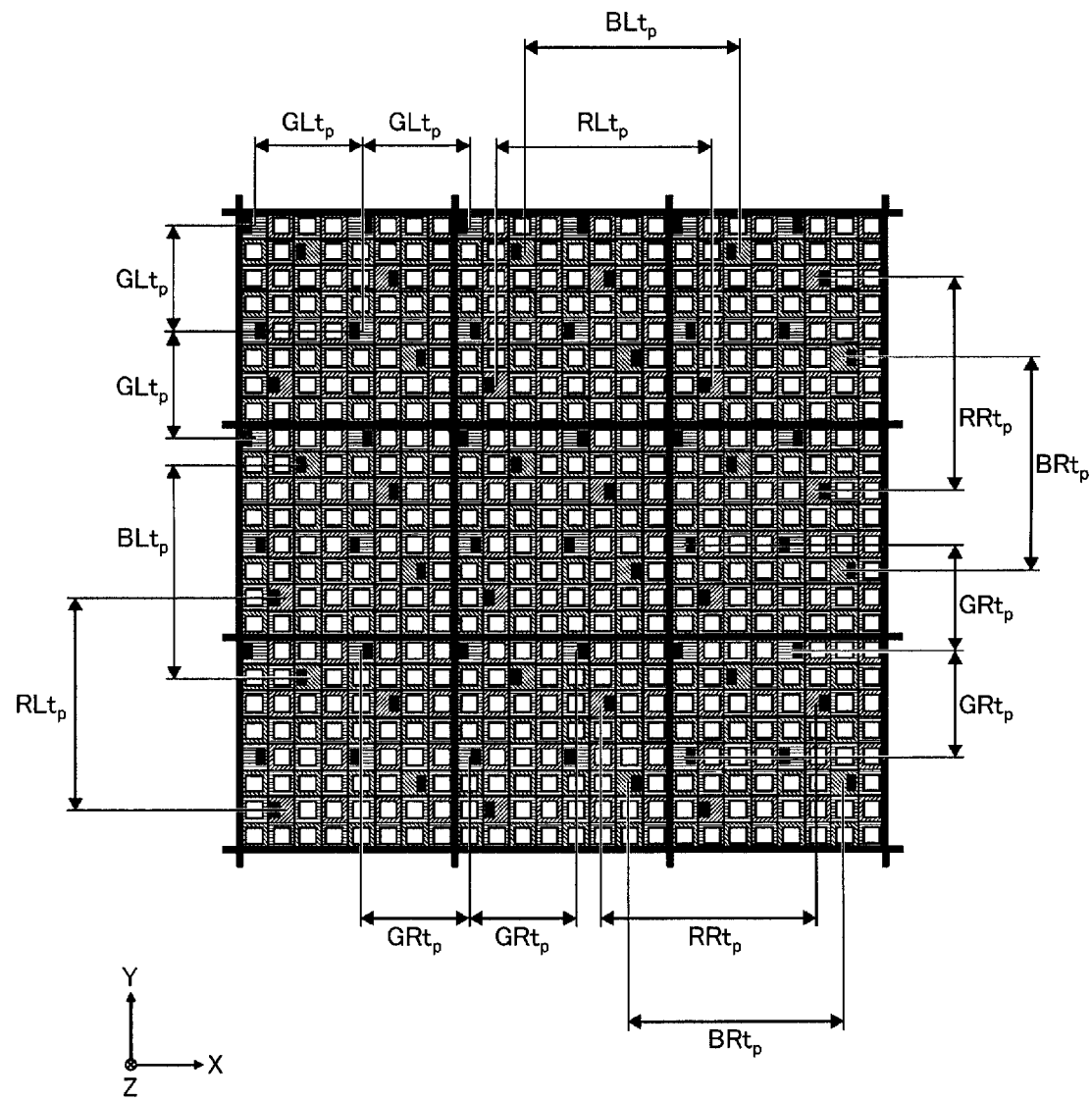
FIG. 8 illustrates how the pixel pitches of the various types of parallax pixels are related to each other in the first implementation.

FIG. 8 illustrates how the pixel pitches of the various types of parallax pixels are related to each other in the first implementation. In FIG. 8, nine repeating patterns 110, shown in FIG. 7, are arranged in 3×3.

As seen from FIG. 8, the intervals between the G(Lt) pixels, which is represented as $GLt_p$, are equal in the X direction and also equal in the Y direction. Likewise, the intervals between the corresponding G(Rt) pixels, which is represented as $GRt_p$, are equal in the X direction and also equal in the Y direction. In addition, $GRt_p$ is equal to $GLt_p$. Furthermore, each G(Rt) pixel is positioned at a distance of $GLt_p$ away from a G(Lt) pixel only in one of the X and Y directions.

Likewise, the intervals between the R(Lt) pixels, which is represented as $RLt_p$, are equal in the X direction and also equal in the Y direction. Likewise, the intervals between the corresponding R(Rt) pixels, which is represented as $RRt_p$, are equal in the X direction and also equal in the Y direction. In addition, $RRt_p$ is equal to $RLt_p$. Furthermore, each R(Rt) pixel is positioned at a distance of half of $RLt_p$ away from a R(Lt) pixel in both of the X and Y directions.

Furthermore, the intervals between the B(Lt) pixels, which is represented as $BLt_p$, are equal in the X direction and also equal in the Y direction. Likewise, the intervals between the corresponding B(Rt) pixels, which is represented as $BRt_p$, are equal in the X direction and also equal in the Y direction. In addition, $BRt_p$ is equal to $BLt_p$. Furthermore, each B(Rt) pixel is positioned at a distance of half of $BLt_p$ away from a B(Lt) pixel in both of the X and Y directions.

Thus, when the pixels are grouped according to each type of the color filters, the pixels having one of the types of aperture masks are arranged at equal intervals in both of the two-dimensional directions and sandwiched between the parallax and no-parallax pixels associated with the other types of aperture masks. Stated differently, the pixels associated with each of the types of the color filters are arranged isotropically and equally in the two-dimensional directions. By arranging the parallax pixels in the above-described manner, parallax images have the same resolution in both of the vertical and horizontal directions when output and the adverse effects made by the parallax pixels on the resolution of 2D images can be also reduced.

Figure 19A:
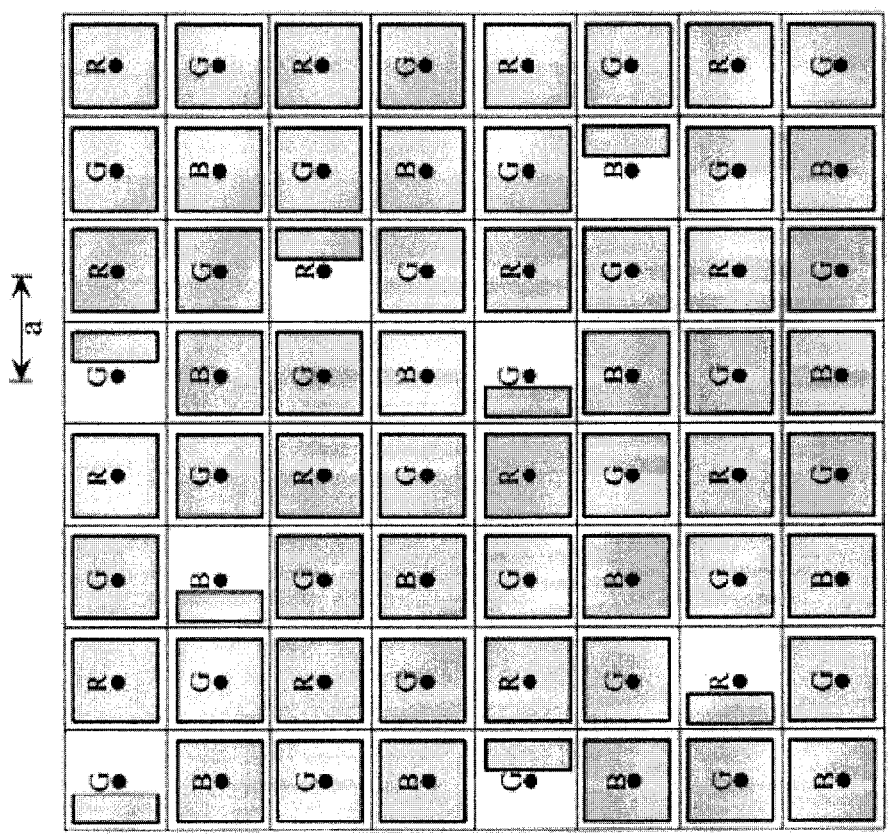
FIGS. 19A and 19B illustrate, as an example, an arrangement in the real space and a corresponding k-space.
Figure 19B:
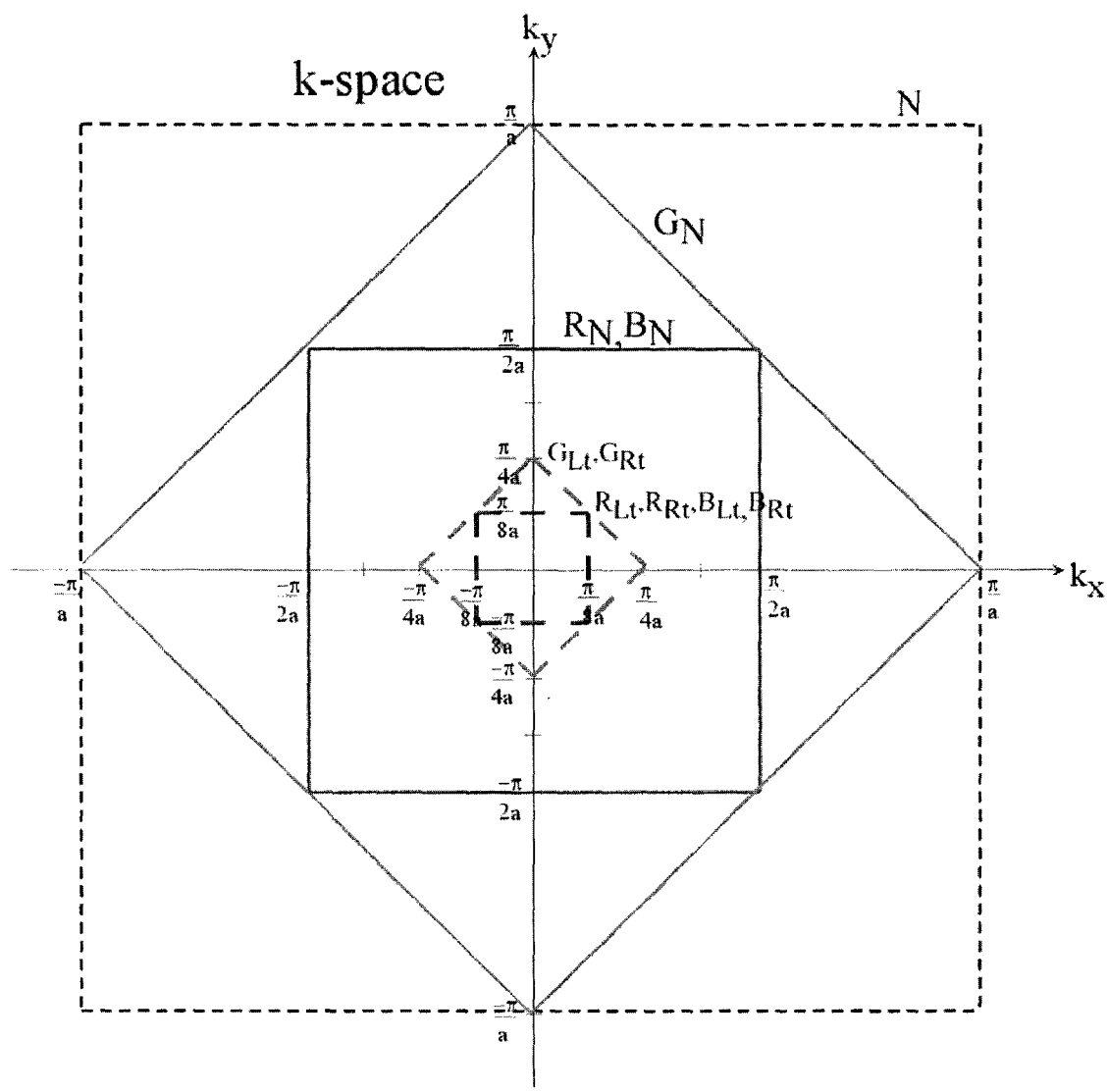

The above-described color-and-parallax multiplexed pixel arrangement is shown in FIG. 19A, and FIG. 19B shows a k-space to illustrate the resolving region or resolution in the frequency space corresponding to the pixel arrangement in the real space. When k denotes the wave number and f denotes the frequency, k=2π πf. The lattice pitch in the actual space is denoted by a, and the reciprocal lattice space of the actual space is represented as a k-space, and the resolving region is represented by a first Brillouin zone of the reciprocal lattice space (see, for example, US 2010/0201853 and Japanese Patent No. 4239483 invented by the same inventor as the present application).

FIG. 19B shows that, when it comes to the images as captured, the resolving power of the left and right parallax pixels having a low density is lower than the resolving power of the no-parallax pixels having a high density. To offset this disadvantage, the no-parallax pixels having a high density provide for a resolving power comparable to the resolving power of the Bayer arrangement.

Accordingly, as described later, the no-parallax pixels are first subject to interpolation to produce 2D color images R(N), G(N) and B(N), and low-density left parallax images R(Lt), G(Lt) and B(Lt) and low-density right parallax images R(Rt), G(Rt) and B(Rt) are produced in advance. The no-parallax images are used as intermediate images, so that high-density left parallax images R'(Lt), G'(Lt) and B'(Lt) and high-density right parallax images R'(Rt), G'(Rt) and B'(Rt) can be finally obtained by applying parallax modulation using the low-density parallax images as follows.

$$R'(Lt) = R(N) \sqrt[3]{\frac{2R(Lt)}{R(Lt)+R(Rt)}} \sqrt[3]{\frac{2G(Lt)}{G(Lt)+G(Rt)}} \sqrt[3]{\frac{2B(Lt)}{B(Lt)+B(Rt)}}$$

$$G'(Lt) = G(N) \sqrt[3]{\frac{2R(Lt)}{R(Lt)+R(Rt)}} \sqrt[3]{\frac{2G(Lt)}{G(Lt)+G(Rt)}} \sqrt[3]{\frac{2B(Lt)}{B(Lt)+B(Rt)}}$$

$$B'(Lt) = B(N) \sqrt[3]{\frac{2R(Lt)}{R(Lt)+R(Rt)}} \sqrt[3]{\frac{2G(Lt)}{G(Lt)+G(Rt)}} \sqrt[3]{\frac{2B(Lt)}{B(Lt)+B(Rt)}}$$

$$R'(Rt) = R(N) \sqrt[3]{\frac{2R(Rt)}{R(Lt)+R(Rt)}} \sqrt[3]{\frac{2G(Rt)}{G(Lt)+G(Rt)}} \sqrt[3]{\frac{2B(Rt)}{B(Lt)+B(Rt)}}$$

$$G'(Rt) = G(N) \sqrt[3]{\frac{2R(Rt)}{R(Lt)+R(Rt)}} \sqrt[3]{\frac{2G(Rt)}{G(Lt)+G(Rt)}} \sqrt[3]{\frac{2B(Rt)}{B(Lt)+B(Rt)}}$$

$$B'(Rt) = B(N) \sqrt[3]{\frac{2R(Lt)}{R(Lt)+R(Rt)}} \sqrt[3]{\frac{2G(Lt)}{G(Lt)+G(Rt)}} \sqrt[3]{\frac{2B(Lt)}{B(Lt)+B(Rt)}}$$

Density  High  High  Low  Low  Low

In this way, the high-frequency components of the no-parallax pixels are superimposed to produce new parallax images, so that parallax images or 3D images can achieve as high resolution as 2D images. In other words, in a slightly defocused image region in the vicinity of the focus region, in which slight parallax is generated, the parallax modulation performs position shifting to slightly shift in the left and right directions the high-resolution no-parallax images with reference to the gradual changes in the parallax images.

Furthermore, a subject image in a significantly defocused region or in the non-focus region is significantly shifted horizontally while the resolving power of the no-parallax images is maintained as much as possible and by making the most use of the horizontal spatial resolution of the gradually changing parallax images.

Stated differently, the pixel arrangement is required to produce parallax images having a high horizontal spatial resolution in order to maximize the parallax modulation effects. From this point of view, the pixel arrangement shown at the beginning in relation to the 6-viewpoint example in which the left and right parallax pixels are arranged in the horizontal direction is not desirable due to a lowered horizontal resolution. Alternatively, a parallax pixel arrangement is required that achieves high resolution in the horizontal direction. An isotropic parallax pixel arrangement satisfies this requirement. FIG. 19B shows a k-space representing the resolution achieved by the isotropic parallax pixel arrangement. The following describes other exemplary pixel arrangements having parallax pixels with a low density, in which the parallax pixels are isotropically arranged. The following pixel arrangements are shown together with their k-spaces.

Figure 9:
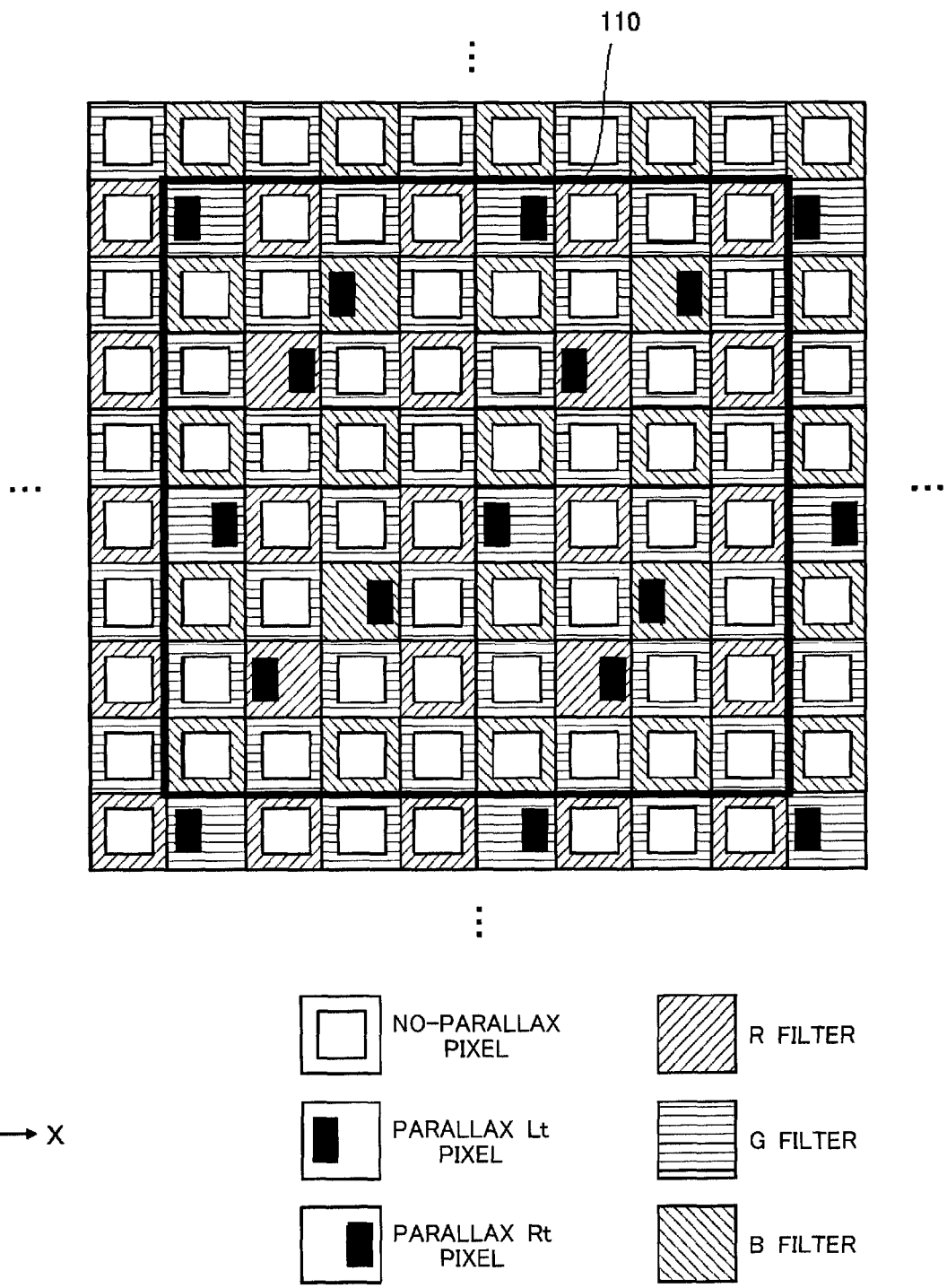
FIG. 9 illustrates how the pixels are arranged in a repeating pattern 110 relating to a second implementation.

FIG. 9 illustrates how the pixels are arranged in a repeating pattern 110 relating to a second implementation. As in the first implementation, the repeating pattern 110 relating to the second implementation includes four Bayer arrangements, each of which is formed by four pixels, both in the vertical direction, which is the Y-axis direction, and in the horizontal direction, which is the X-axis direction, and is thus constituted by sixty-four pixels. The repeating pattern 110 has a group of 64 pixels as a single unit, and a plurality of repeating patterns 110 are periodically arranged horizontally and vertically within the effective pixel region of the image sensor 100. Thus, the repeating pattern 110 bounded by the thick bold line in FIG. 9 is the primitive lattice in the image sensor 100.

In the second implementation, each of the parallax pixels has one of the two types of aperture masks 103, so that the parallax pixels are divided into the parallax Lt pixels having the openings 104 shifted to the left from the center of the pixels and the parallax Rt pixels having the openings 104 shifted to the right from the center of the pixels. As shown in FIG. 9, the parallax pixels are arranged in the following manner.

$P_{11}$ . . . parallax Lt pixel+G filter (=G(Lt))
$P_{51}$ . . . parallax Rt pixel+G filter (=G(Rt))
$P_{32}$ . . . parallax Lt pixel+B filter (=B(Lt))
$P_{72}$ . . . parallax Rt pixel+B filter (=B(Rt))
$P_{23}$ . . . parallax Rt pixel+R filter (=R(Rt))
$P_{63}$ . . . parallax Lt pixel+R filter (=R(Lt))
$P_{15}$ . . . parallax Rt pixel+G filter (=G(Rt))
$P_{55}$ . . . parallax Lt pixel+G filter (=G(Lt))
$P_{36}$ . . . parallax Rt pixel+B filter (=B(Rt))
$P_{76}$ . . . parallax Lt pixel+B filter (=B(Lt))
$P_{27}$ . . . parallax Lt pixel+R filter (=R(Lt))
$P_{67}$ . . . parallax Rt pixel+R filter (=R(Rt))

The other pixels are no-parallax pixels and include no-parallax pixels+R filter (=R(N)), no-parallax pixels+G filter (=G(N)), and no-parallax pixels+B filter (=B(N)).

As described above, the pixel arrangement preferably includes the parallax pixels having all of the combinations of the different types of openings and the different types of color filters within the primitive lattice of the pixel arrangement and has the parallax pixels randomly arranged together with the no-parallax pixels that are more than the parallax pixels. To be more specific, it is preferable, when the parallax and no-parallax pixels are counted according to each type of color filters, that the no-parallax pixels are still more than the parallax pixels. In the case of the second implementation, while G(N)=28, G(Lt)+G(Rt)=2+2=4, while R(N)=12, R(Lt)+R(Rt)=4, and while B(N)=12, B(Lt)+B(Rt)=4.

Figure 20A:
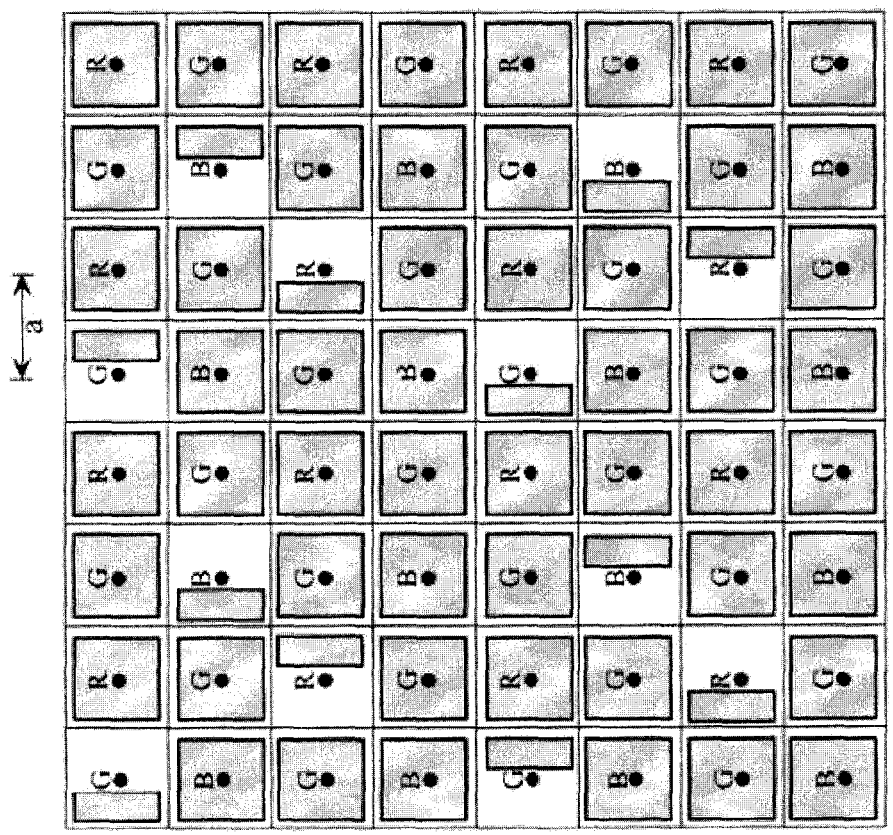
FIGS. 20A and 20B illustrate, as an example, an arrangement in the real space and a corresponding k-space.
Figure 20B:
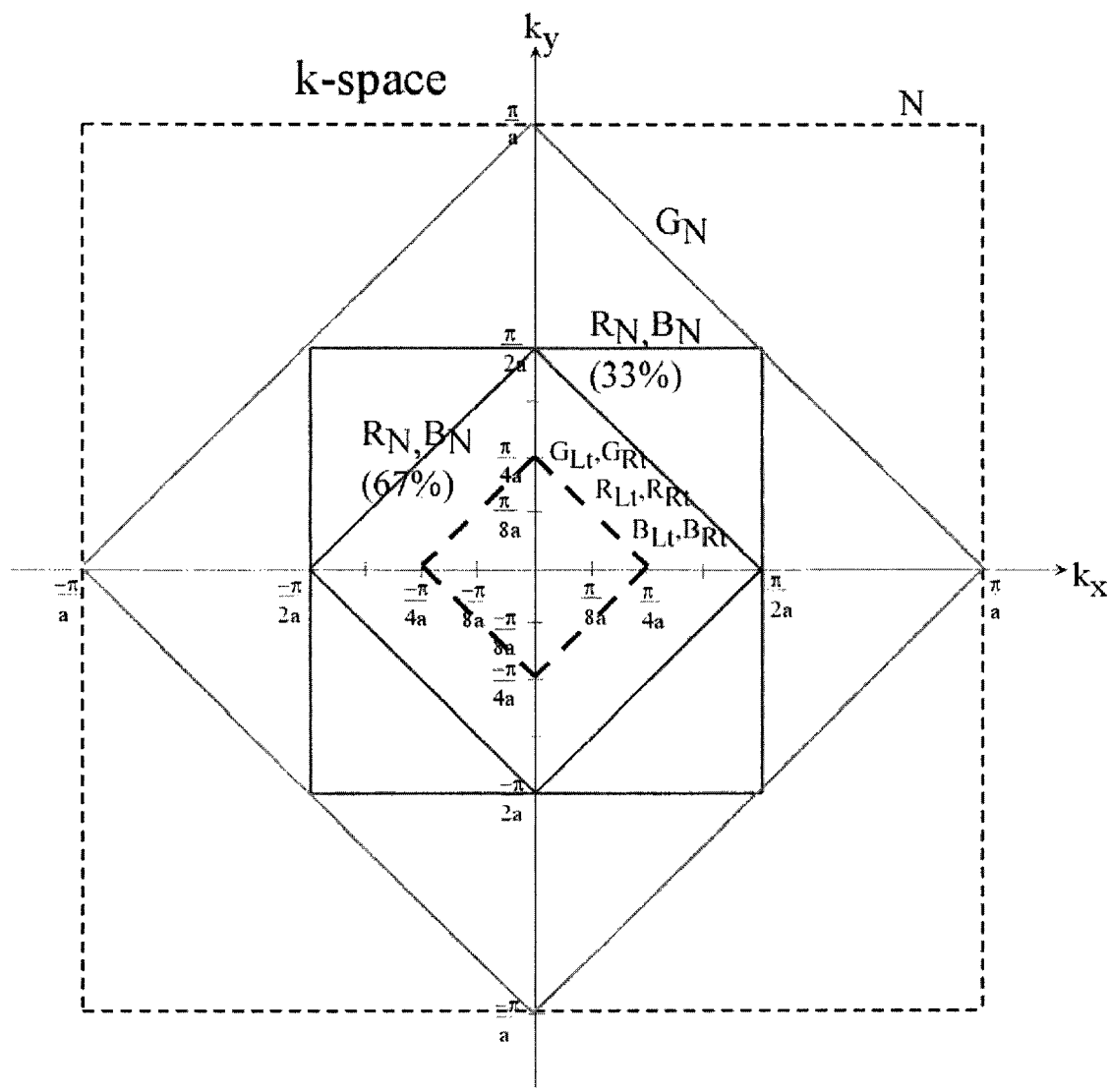

While the RGB ratio in the parallax pixel arrangement in the first implementation is R:G:B=1:2:1, the RGB ratio in the parallax pixel arrangement in the second implementation is R:G:B=1:1:1 by increasing the numbers of the R and B parallax pixels to be equal to the number of G pixels. This arrangement is realized at the sacrifice of the spatial resolution of the no-parallax pixels. FIGS. 20A and 20B show the real space and the k space for the second implementation.

Figure 10:
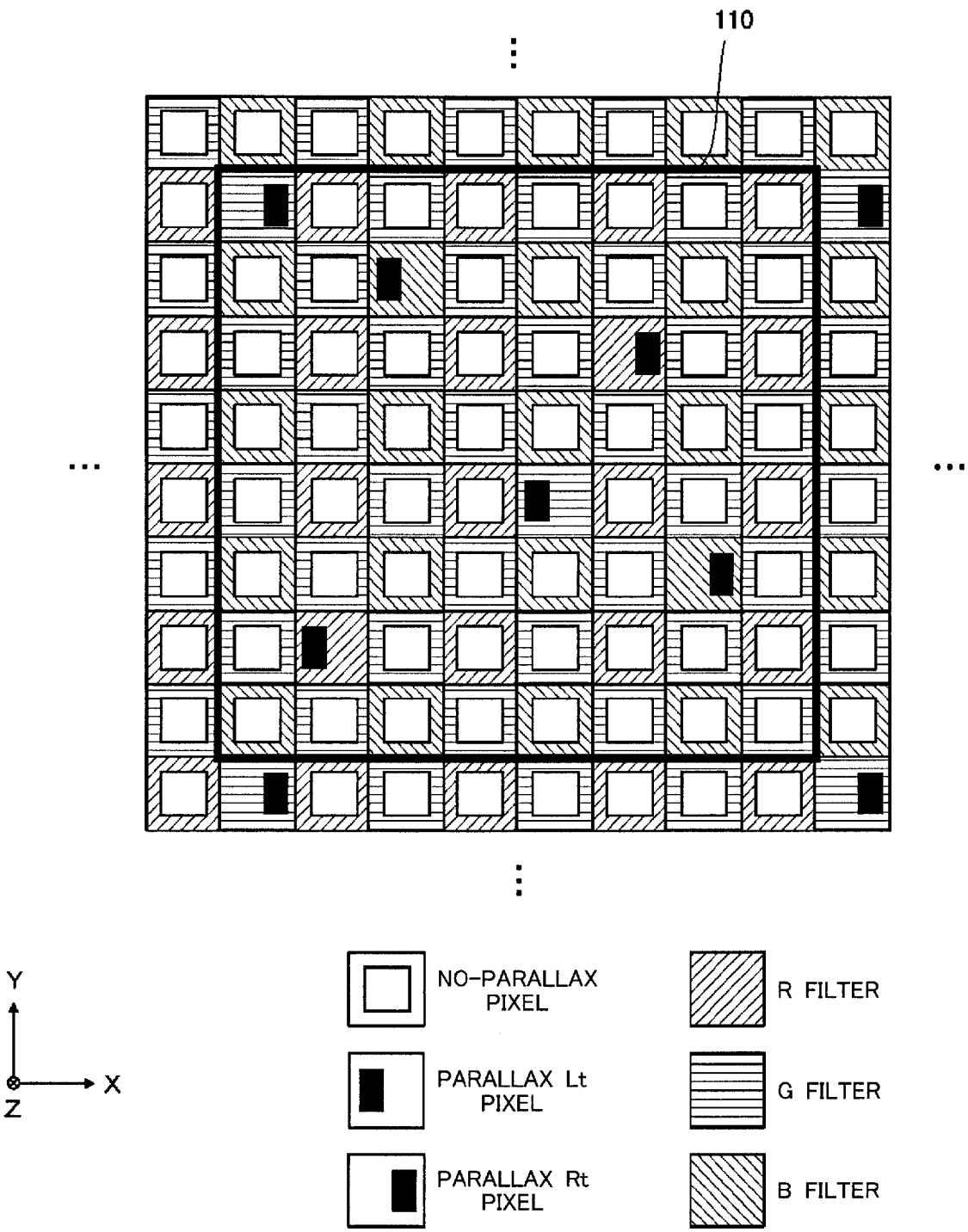
FIG. 10 illustrates how the pixels are arranged in a repeating pattern 110 relating to a third implementation.

FIG. 10 illustrates how the pixels are arranged in a repeating pattern 110 relating to a third implementation. As in the first and second implementations, the repeating pattern 110 relating to the third implementation includes four Bayer arrangements, each of which is formed by four pixels, both in the vertical direction, which is the Y-axis direction, and in the horizontal direction, which is the X-axis direction, and is thus constituted by sixty-four pixels. The repeating pattern 110 has a group of 64 pixels as a single unit, and a plurality of repeating patterns 110 are periodically arranged horizontally and vertically within the effective pixel region of the image sensor 100. Thus, the repeating pattern 110 bounded by the thick bold line in FIG. 10 is the primitive lattice in the image sensor 100.

In the third implementation, each of the parallax pixels has one of the two types of aperture masks 103, so that the parallax pixels are divided into the parallax Lt pixels having the openings 104 shifted to the left from the center of the pixels and the parallax Rt pixels having the openings 104 shifted to the right from the center of the pixels. As shown in FIG. 10, the parallax pixels are arranged in the following manner.

$P_{11}$ . . . parallax Lt pixel+G filter (=G(Lt))
$P_{32}$ . . . parallax Lt pixel+B filter (=B(Lt))
$P_{63}$ . . . parallax Rt pixel+R filter (=R(Rt))
$P_{55}$ . . . parallax Rt pixel+G filter (=G(Rt))
$P_{76}$ . . . parallax Rt pixel+B filter (=B(Rt))
$P_{27}$ . . . parallax Lt pixel+R filter (=R(Lt))

The other pixels are no-parallax pixels and include no-parallax pixels+R filter (=R(N)), no-parallax pixels+G filter (=G(N)), and no-parallax pixels+B filter (=B(N)).

As described above, the pixel arrangement preferably includes the parallax pixels having all of the combinations of the different types of openings and the different types of color filters within the primitive lattice of the pixel arrangement and has the parallax pixels randomly arranged together with the no-parallax pixels that are more than the parallax pixels. To be more specific, it is preferable, when the parallax and no-parallax pixels are counted according to each type of color filters, that the no-parallax pixels are still more than the parallax pixels. In the case of the third implementation, while G(N)=30, G(Lt)+G(Rt)=2, while R(N)=14, R(Lt)+R(Rt)=2, and while B(N)=14, B(Lt)+B(Rt)=2.

Figure 21A:
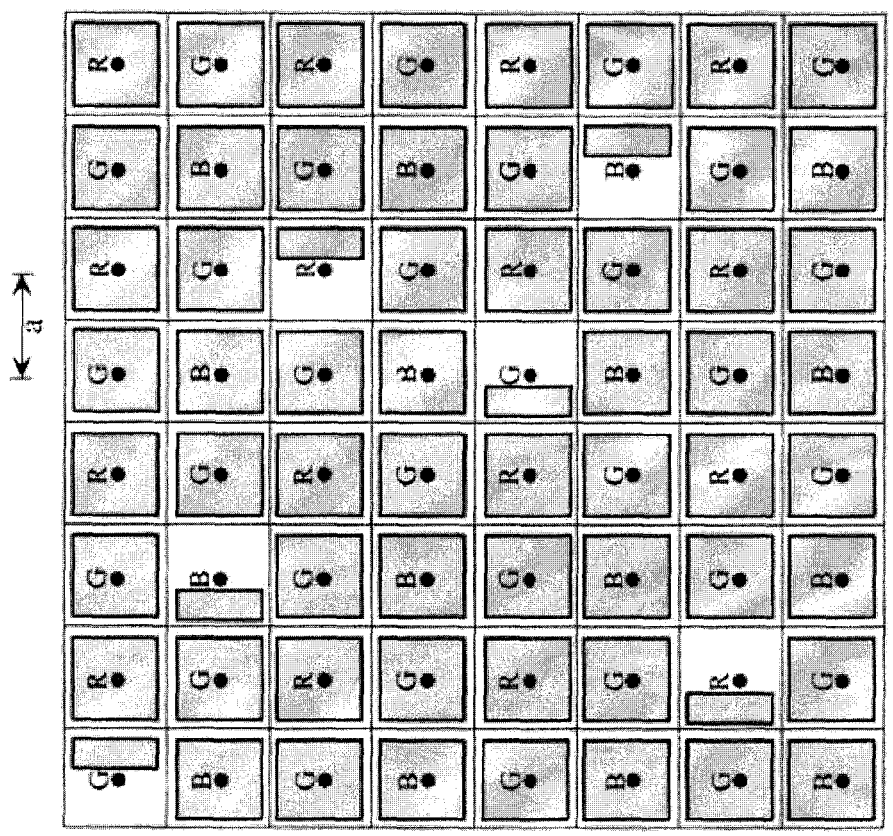
FIGS. 21A and 21B illustrate, as an example, an arrangement in the real space and a corresponding k-space.
Figure 21B:
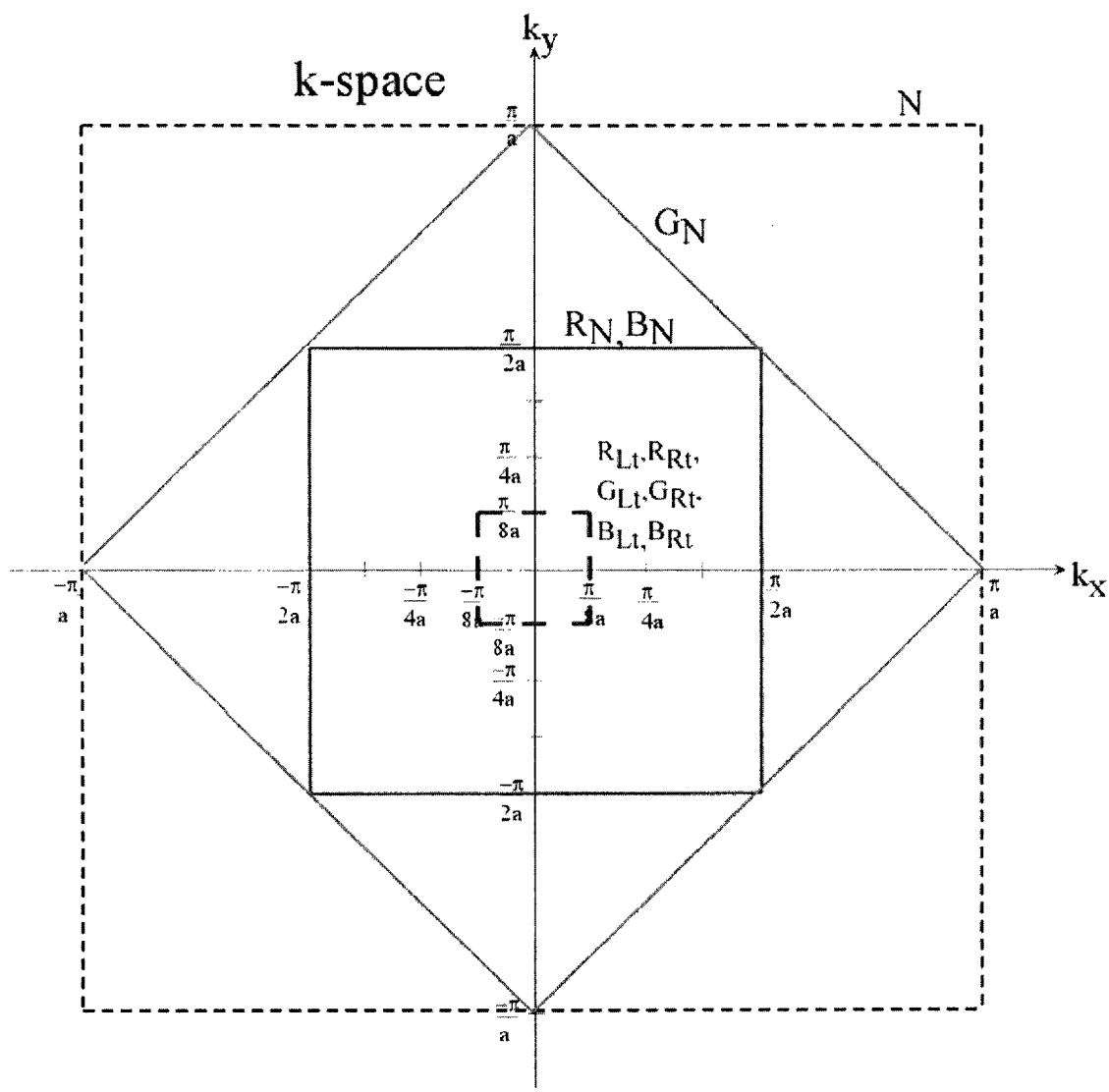

While the RGB ratio in the parallax pixel arrangement in the first implementation is R:G:B=1:2:1, the RGB ratio in the parallax pixel arrangement in the third implementation is R:G:B=1:1:1 by decreasing the number of G parallax pixels to be equal to the numbers of the R and B parallax pixels. This arrangement results in enhancement of the spatial resolution of the no-parallax pixels. FIGS. 21A and 21B show the real space and the k space for the third implementation.

In the third implementation, the parallax pixels having each type of aperture masks are arranged so as not to overlap the other type of aperture masks in both of the column direction (X direction) and the row direction (Y direction) of the two dimensional directions. To be specific, from the perspective of the column direction, while the parallax Lt pixels are arranged in the second, third and fifth columns, the parallax Rt pixels are arranged in the first, sixth and seventh columns. In addition, from the perspective of the row direction, while the parallax Lt pixels are arranged in the second, fifth and seventh rows, and the parallax Rt pixels are arranged in the first, third and sixth rows. Thus, although the different types of the color filters are not taken into consideration, the parallax pixels having each type of aperture masks are arranged at equal intervals in both of the two dimensional directions. In this way, the pixels are arranged more randomly, which enables the pixel arrangement to output high-quality parallax images. In other words, isotropic parallax information can be obtained. This follows the arrangement rules described with reference to the first implementation.

Figure 11:
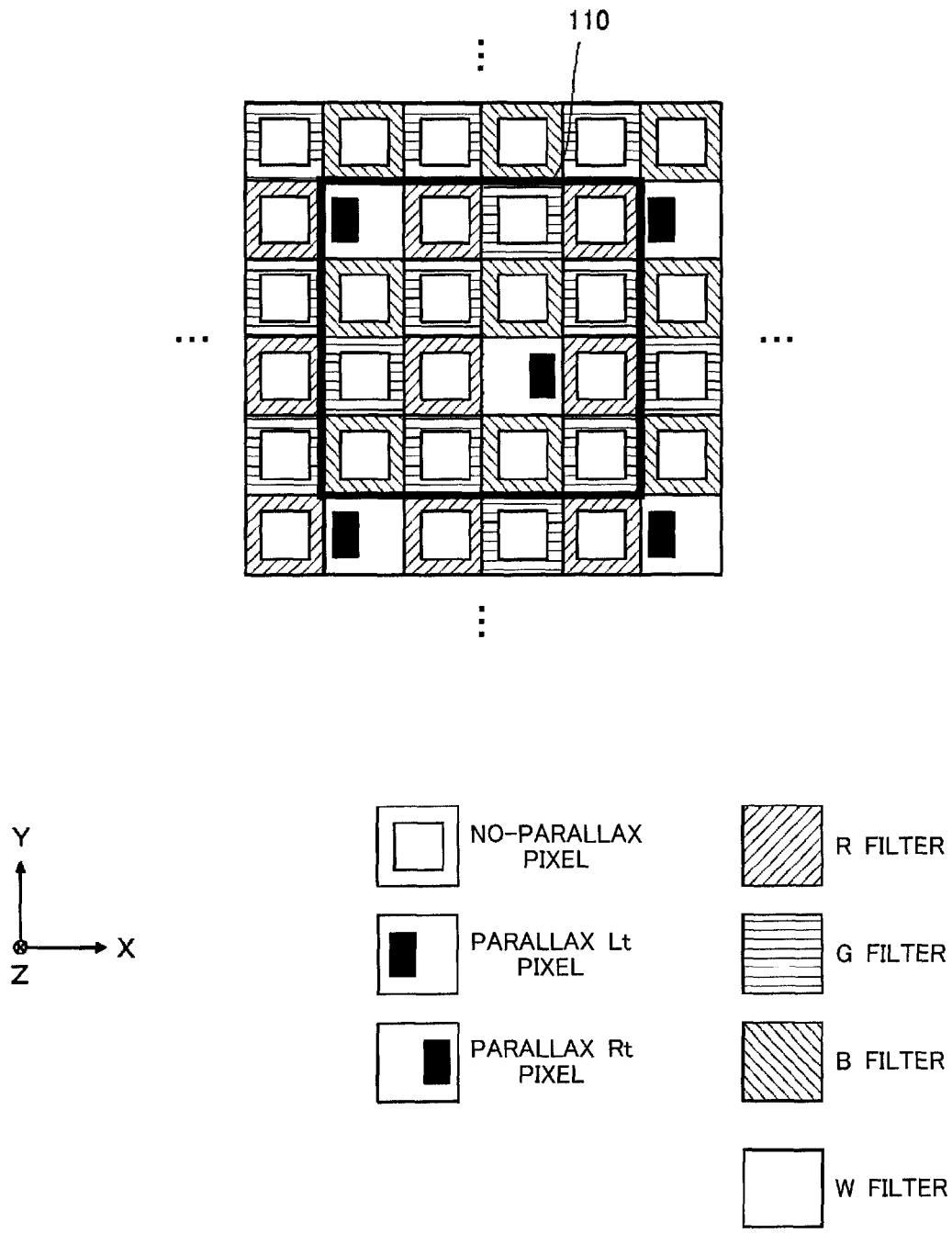
FIG. 11 illustrates how the pixels are arranged in a repeating pattern 110 relating to a fourth implementation.

FIG. 11 illustrates how the pixels are arranged in a repeating pattern 110 relating to a fourth implementation. The repeating pattern 110 relating to the fourth implementation includes two Bayer arrangements, each of which is formed by four pixels, both in the vertical direction, which is the Y-axis direction, and in the horizontal direction, which is the X-axis direction, and is thus constituted by sixteen pixels. In addition, the G filters of the Gb pixels in the upper left and lower right Bayer arrangements are replaced with W filters that are designed to transmit the entire visible light wavelength region. The repeating pattern 110 has a group of 16 pixels as a single unit, and a plurality of repeating patterns 110 are periodically arranged horizontally and vertically within the effective pixel region of the image sensor 100. Thus, the repeating pattern 110 bounded by the thick bold line in FIG. 11 is the primitive lattice in the image sensor 100.

In the fourth implementation, the parallax Lt pixel having the opening 104 shifted to the left from the center of the pixel is at the pixel position $P_{11}$ associated with the W filter, and the parallax Rt pixel having the opening 104 shifted to the right from the center of the pixel is at the pixel position $P_{33}$ associated with the W filter.

The other pixels are no-parallax pixels and include no-parallax pixels+R filter (=R(N)), no-parallax pixels+G filter (=G(N)), and no-parallax pixels+B filter (=B(N)).

In the above-described arrangement, the parallax pixels having each type of aperture masks are also arranged at equal intervals in both of the two dimensional directions and sandwiched between the parallax and no-parallax pixels associated with the other types of aperture masks. In addition, the parallax pixels having each type of aperture masks are arranged so as not to overlap the parallax pixels having the other type of aperture masks in both of the column direction (X direction) and the row direction (Y direction) of the two dimensional directions.

Figure 22A:
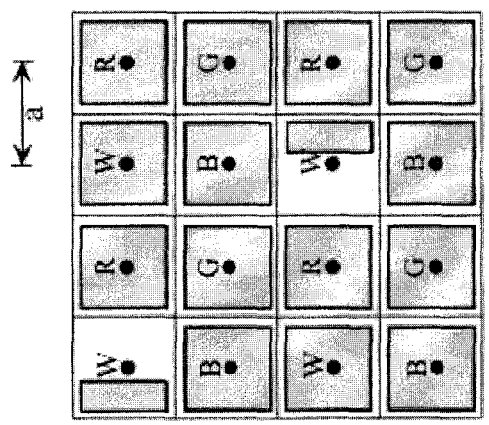
FIGS. 22A and 22B illustrate, as an example, an arrangement in the real space and a corresponding k-space.
Figure 22B:
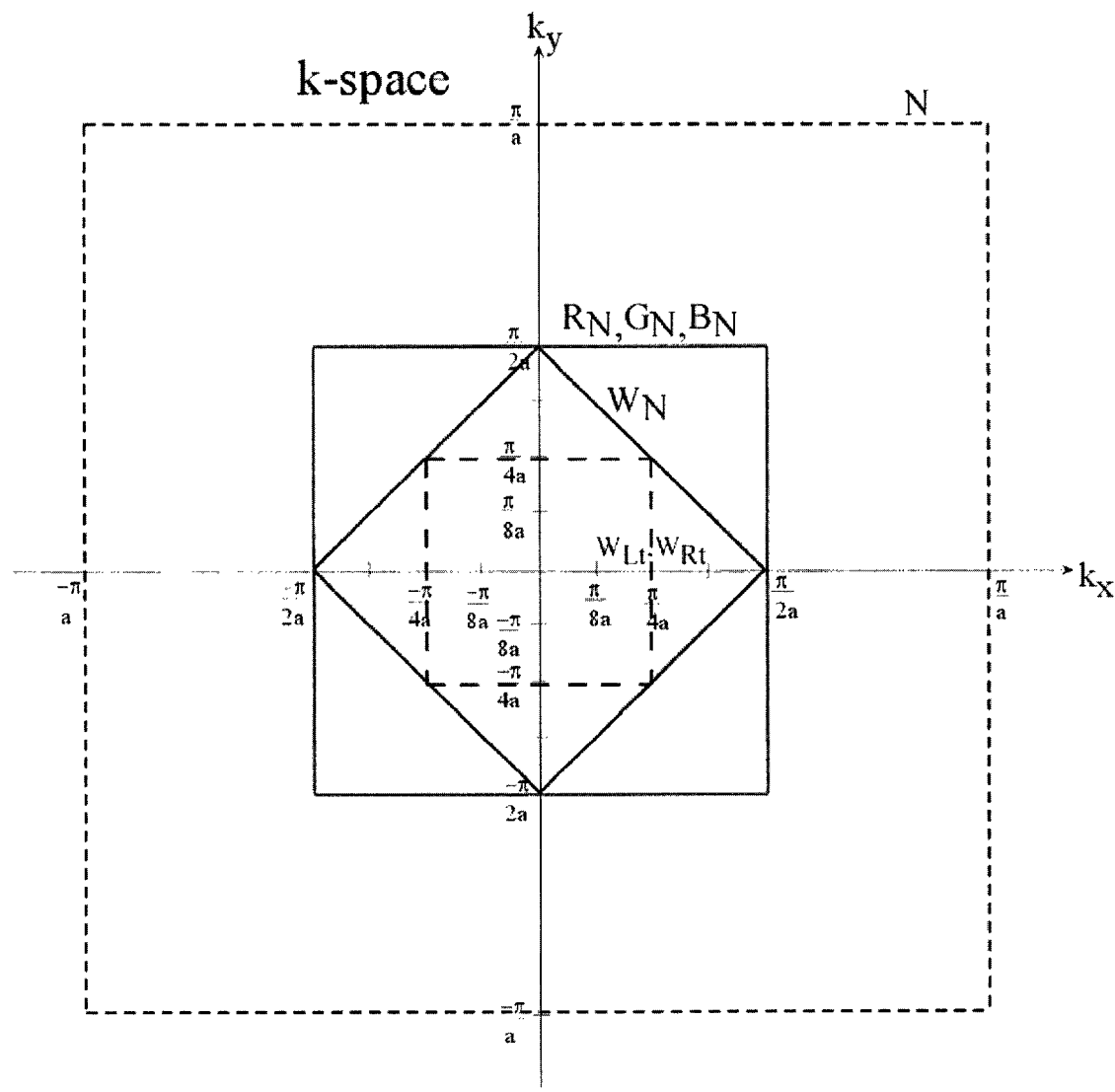
Figure 23A:
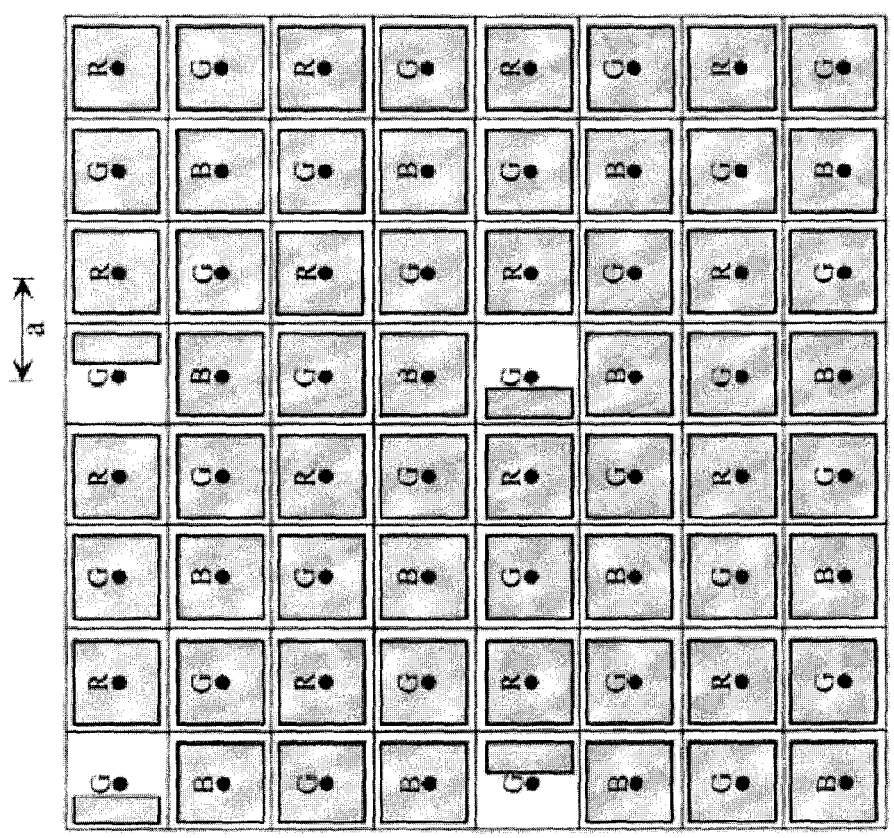
FIGS. 23A and 23B illustrate, as an example, an arrangement in the real space and a corresponding k-space.
Figure 23B:
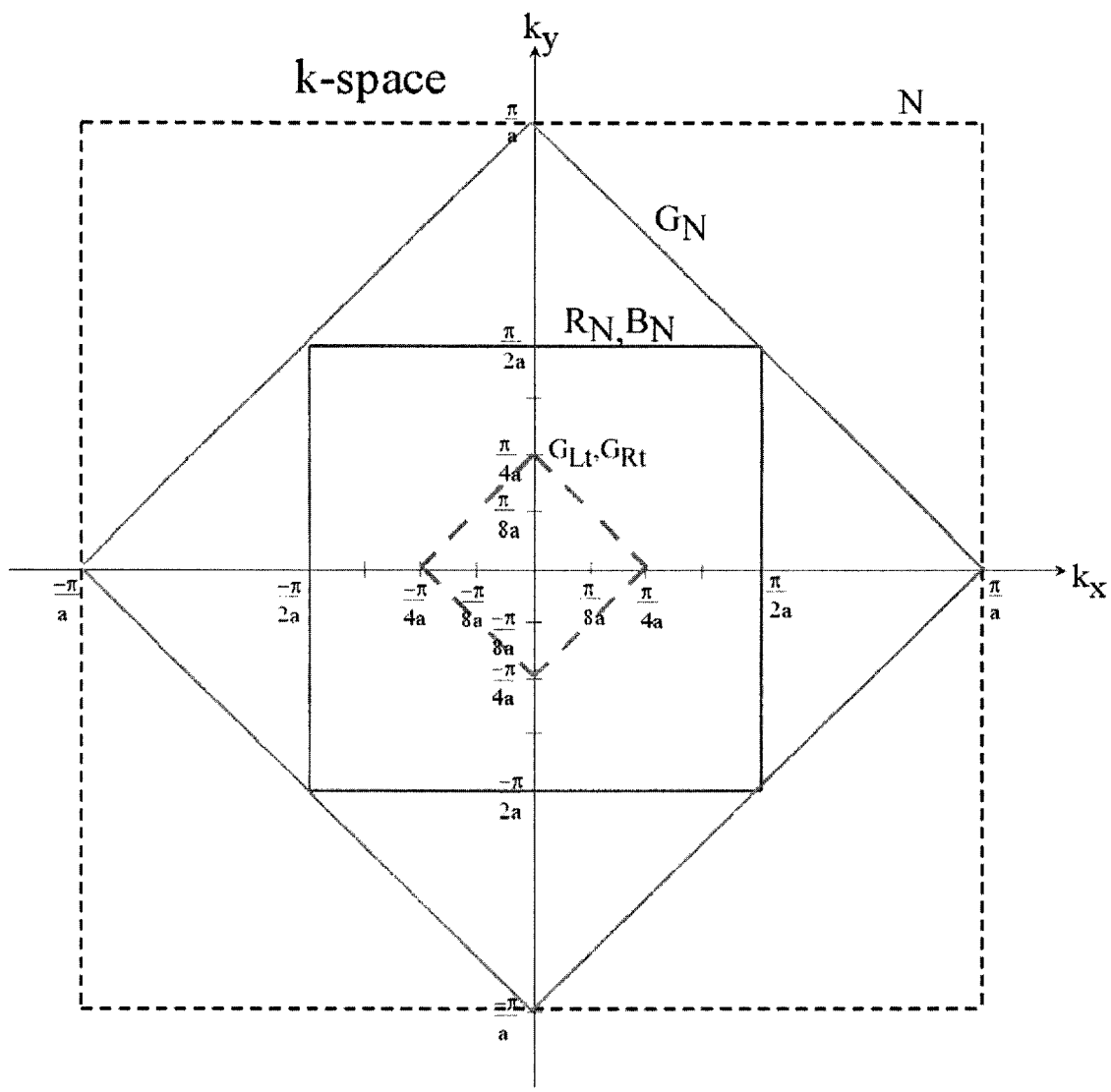
Figure 24A:
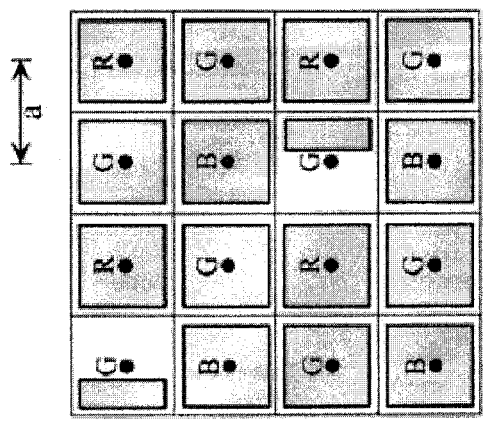
FIGS. 24A and 24B illustrate, as an example, an arrangement in the real space and a corresponding k-space.
Figure 24B:
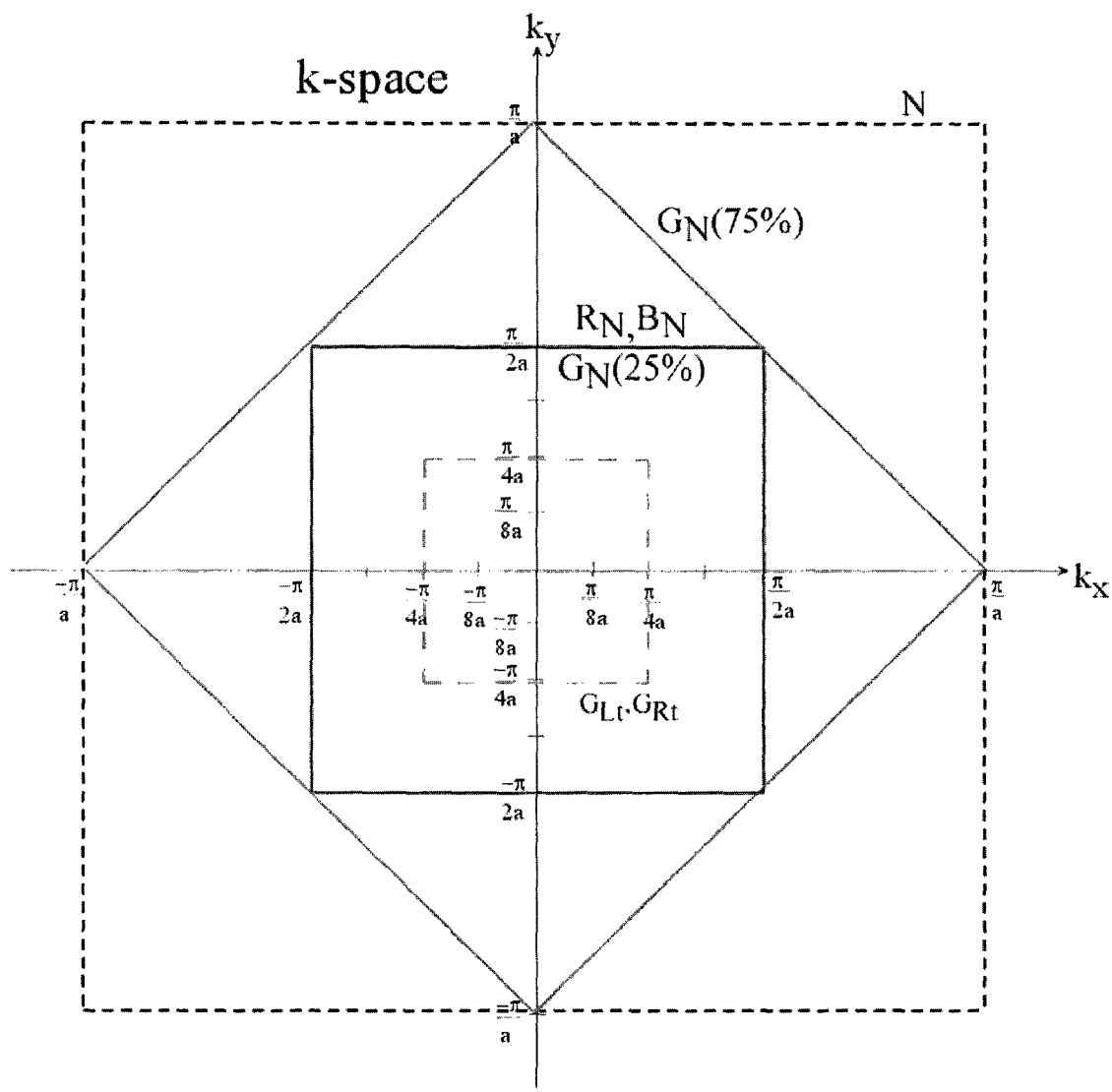
Figure 25A:
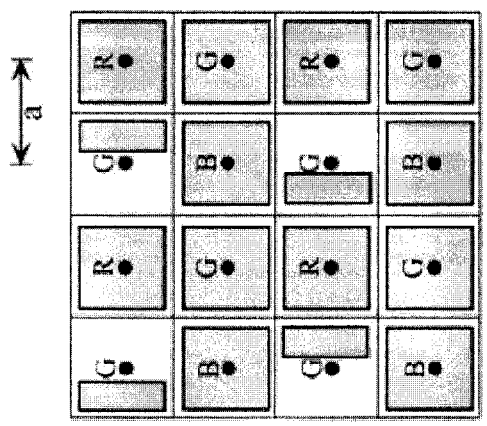
FIGS. 25A and 25B illustrate, as an example, an arrangement in the real space and a corresponding k-space.
Figure 25B:
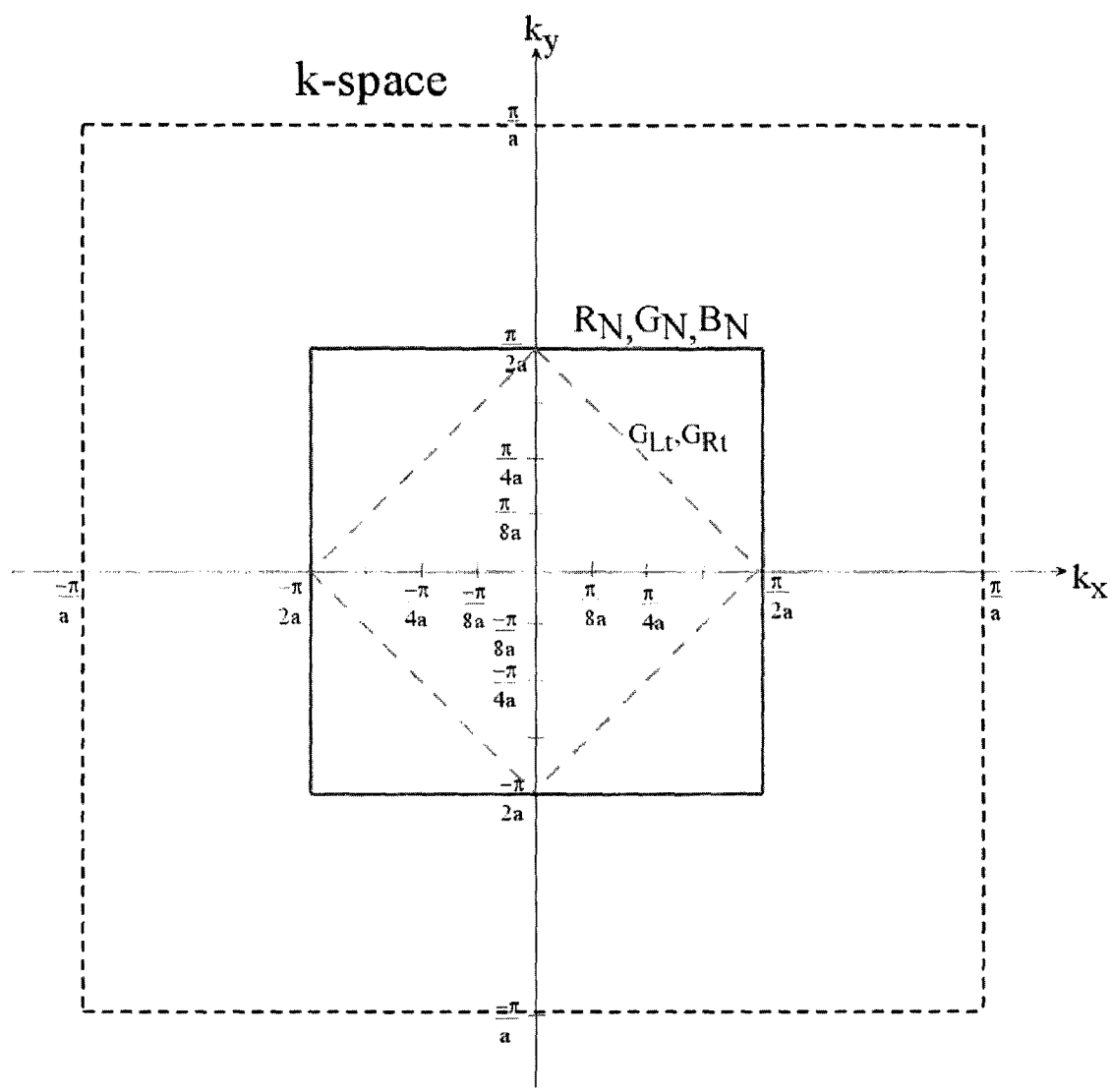
Figure 26A:
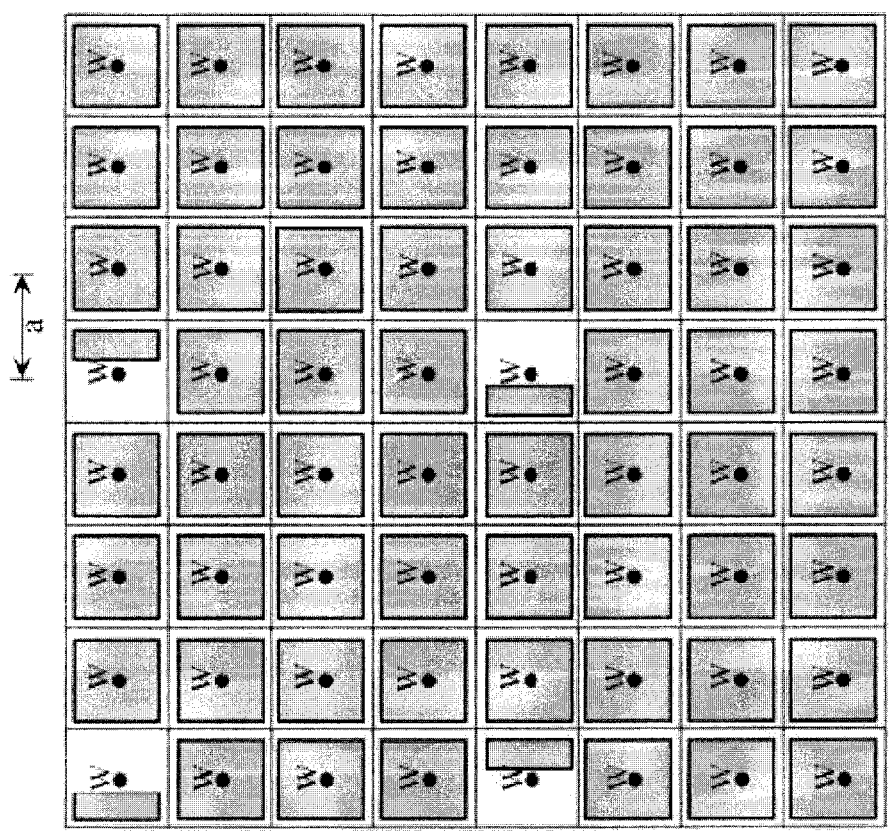
FIGS. 26A and 26B illustrate, as an example, an arrangement in the real space and a corresponding k-space.
Figure 26B:
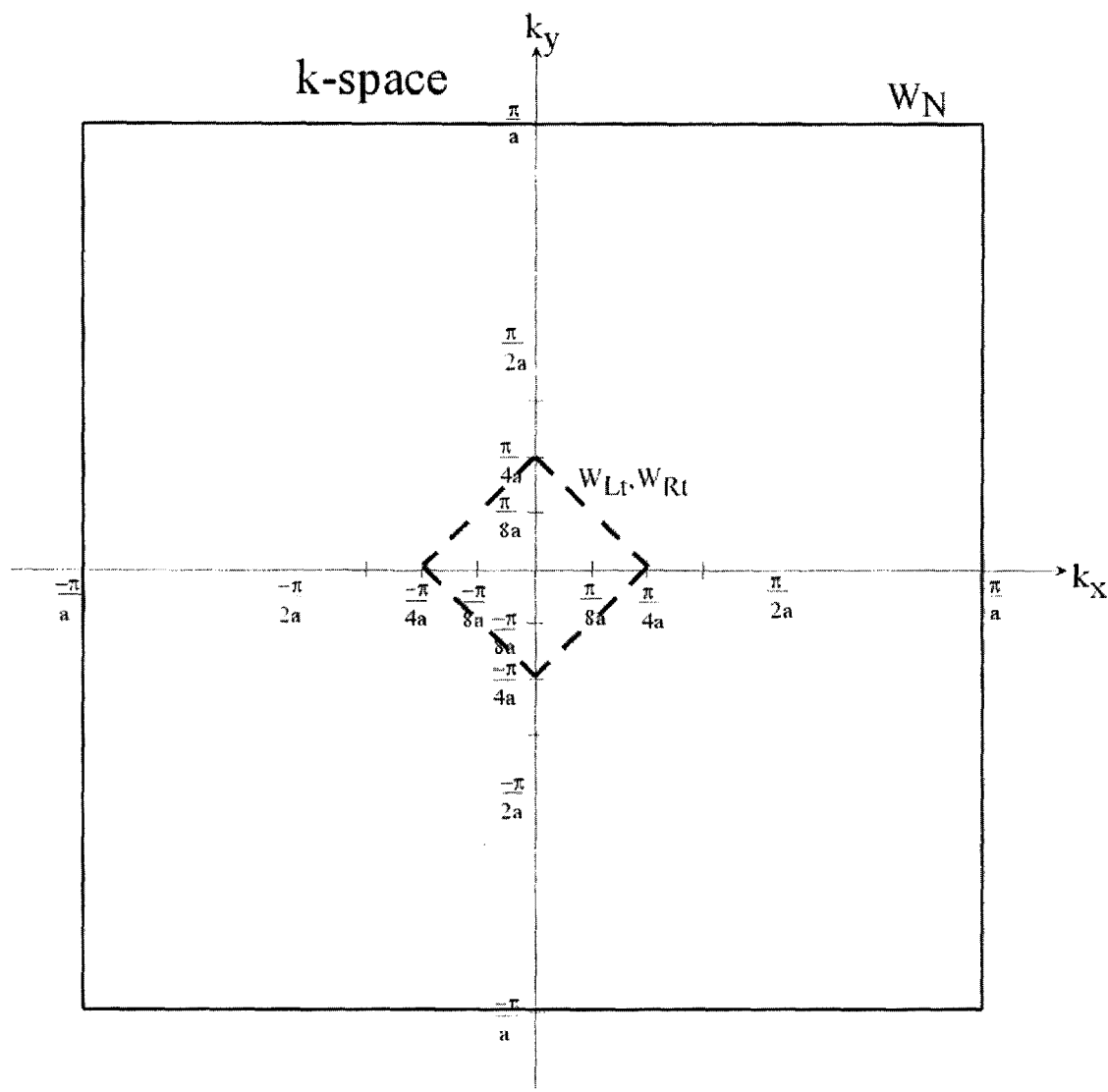
Figure 27A:
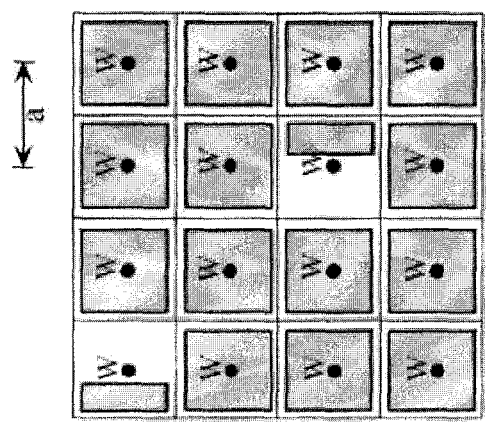
FIGS. 27A and 27B illustrate, as an example, an arrangement in the real space and a corresponding k-space.
Figure 27B:
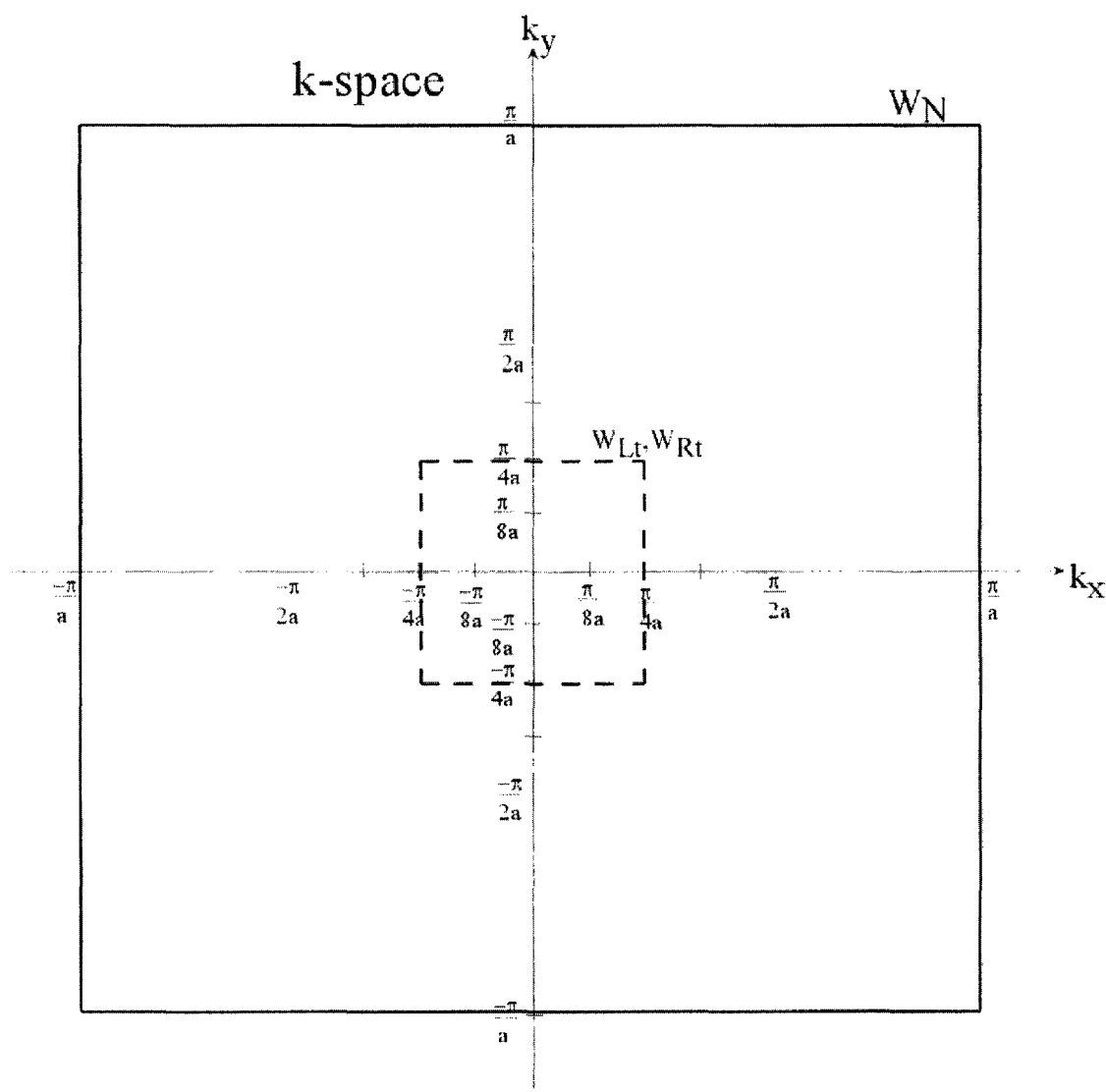
Figure 28B:
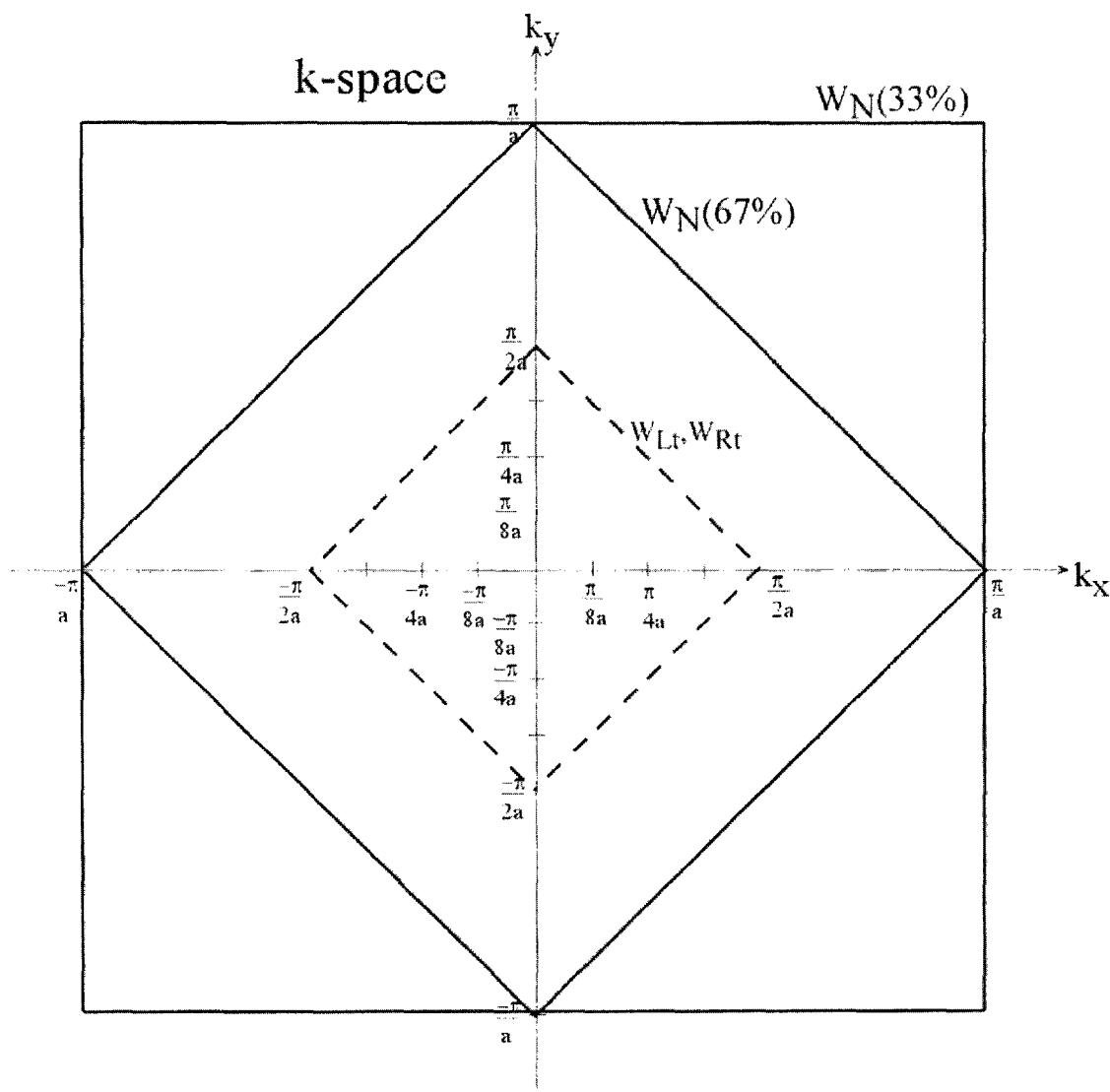
Figure 29A:
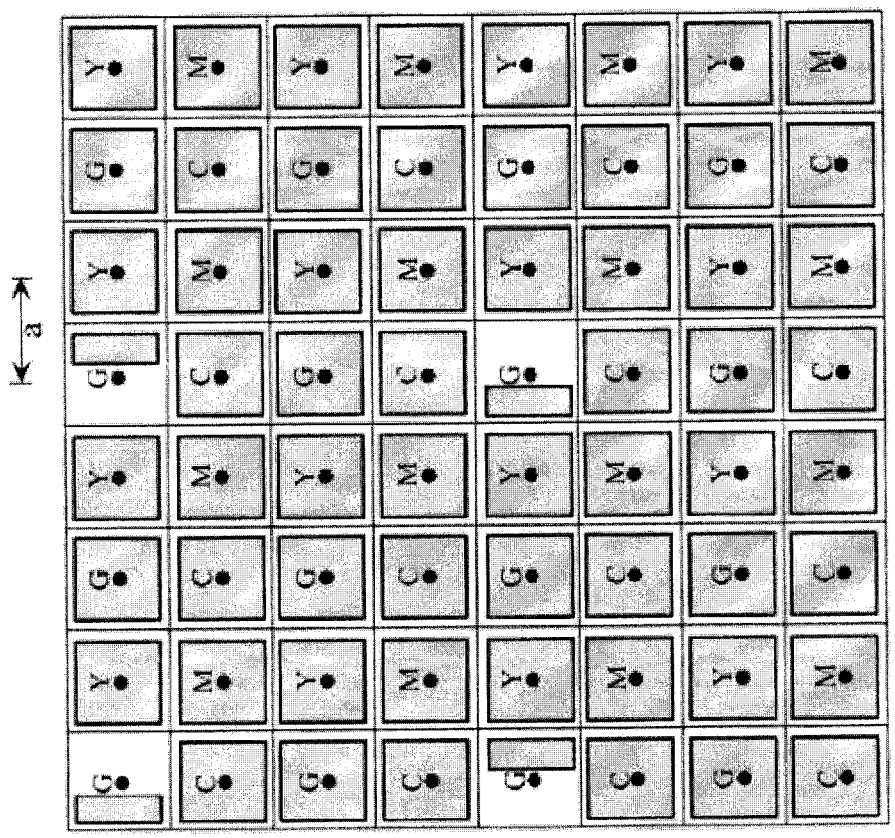
FIGS. 29A and 29B illustrate, as an example, an arrangement in the real space and a corresponding k-space.
Figure 29B:
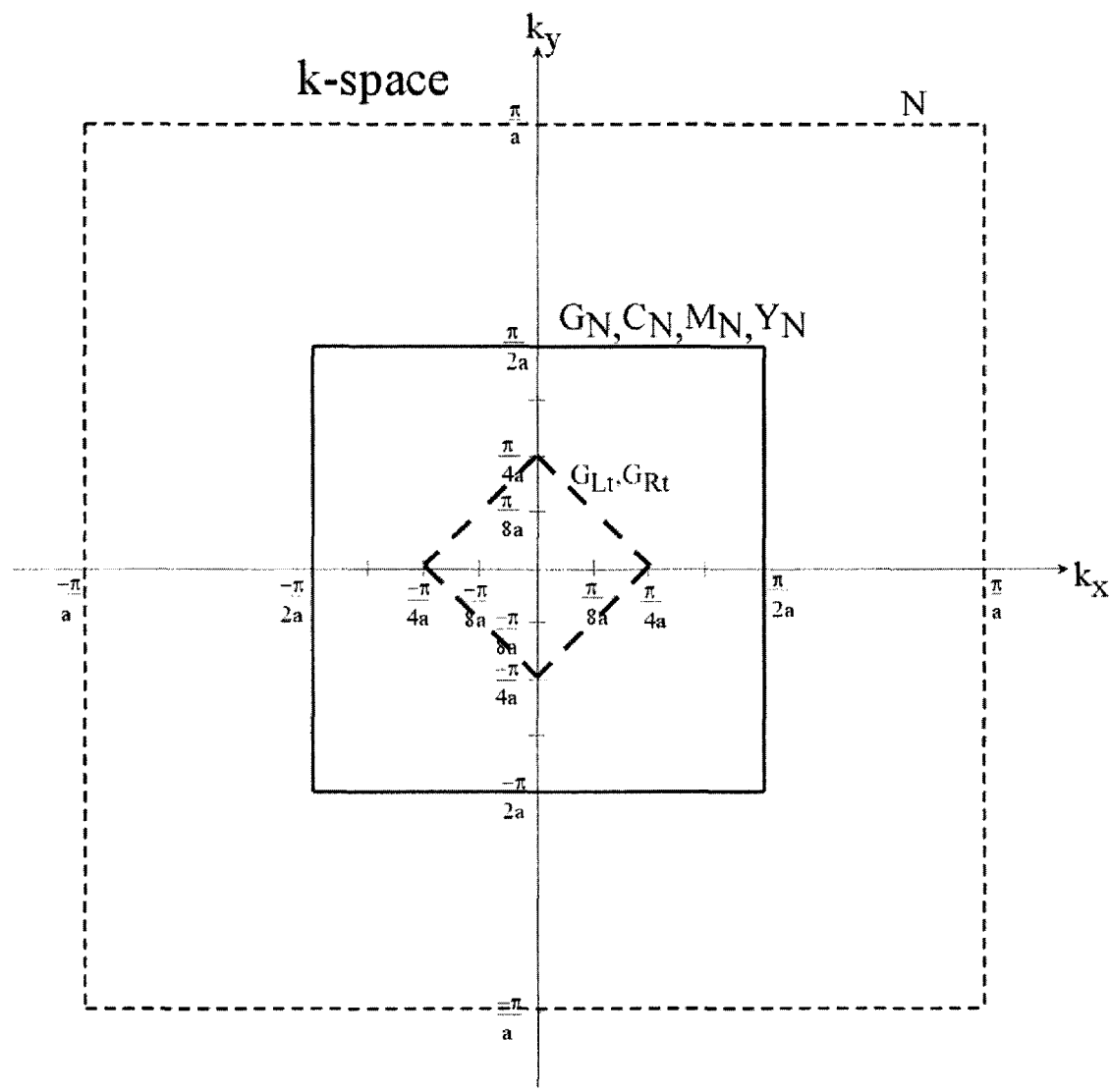
Figure 30A:
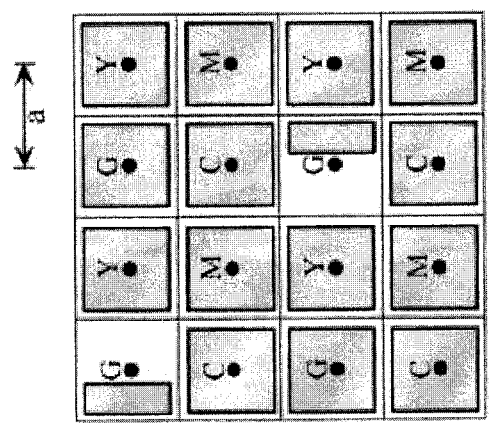
FIGS. 30A and 30B illustrate, as an example, an arrangement in the real space and a corresponding k-space.
Figure 30B:
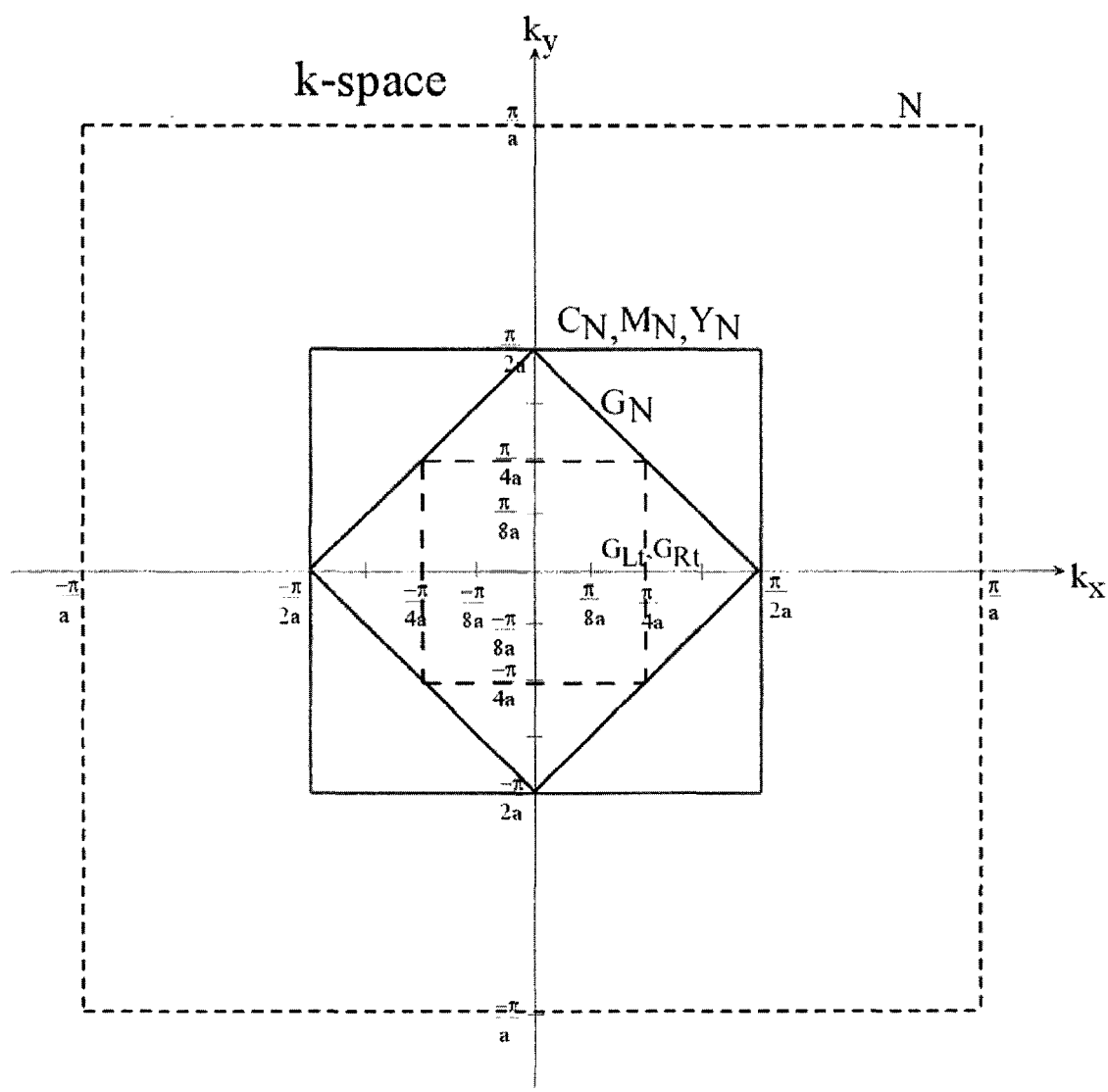
Figure 31A:
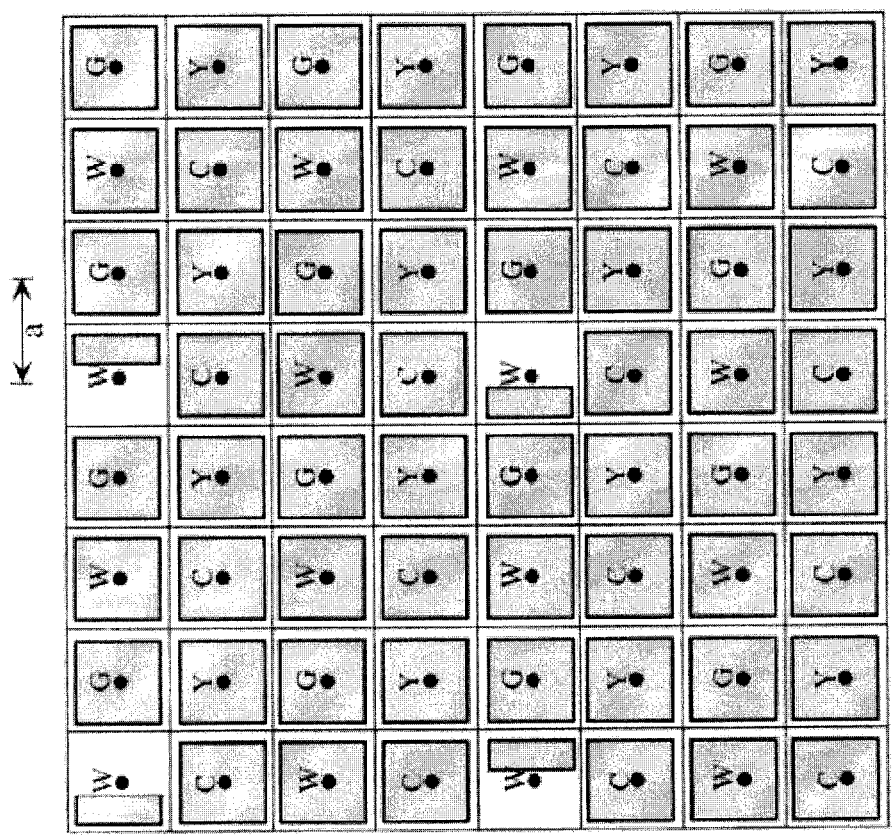
FIGS. 31A and 31B illustrate, as an example, an arrangement in the real space and a corresponding k-space.
Figure 31B:
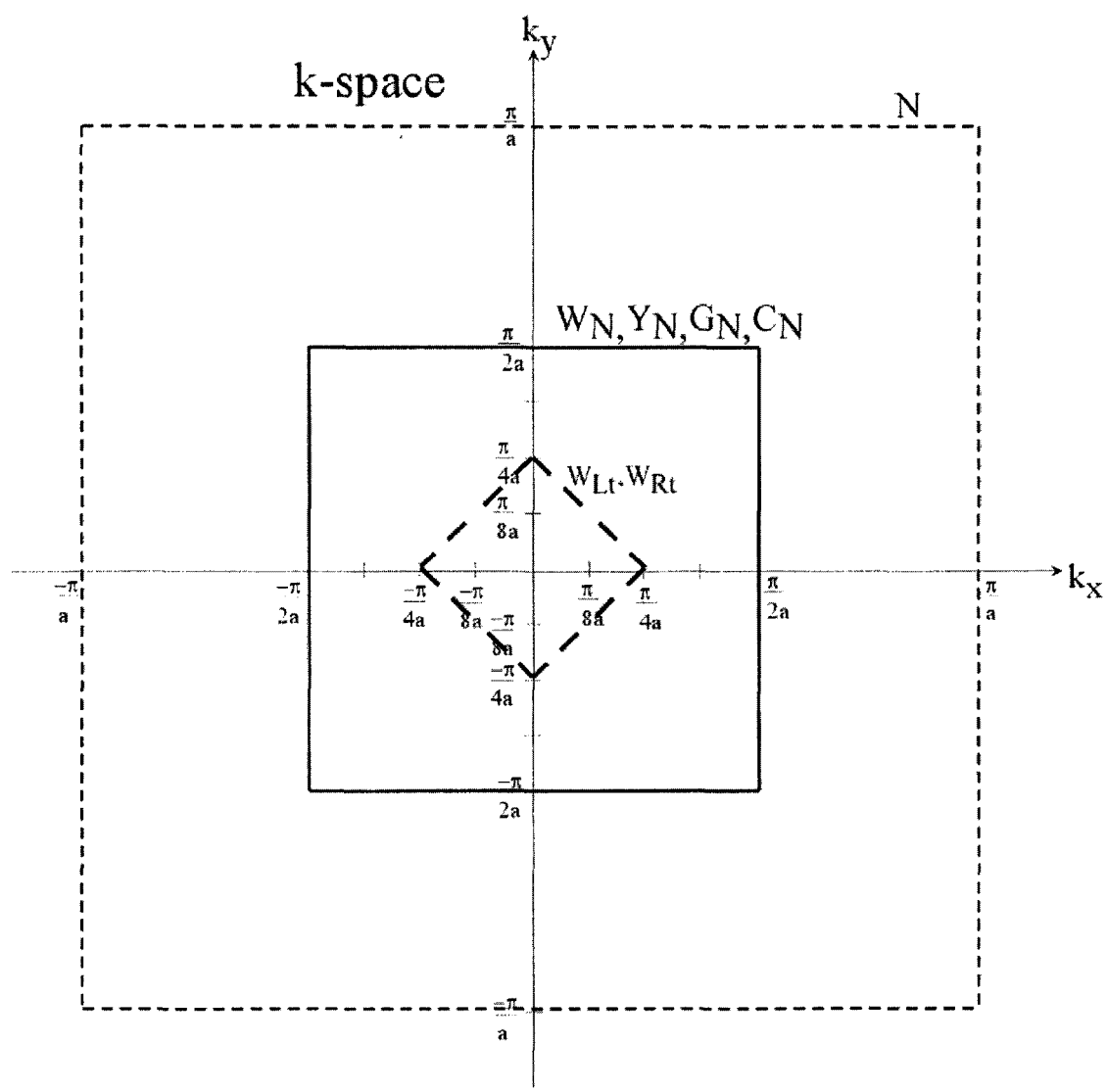
Figure 32A:
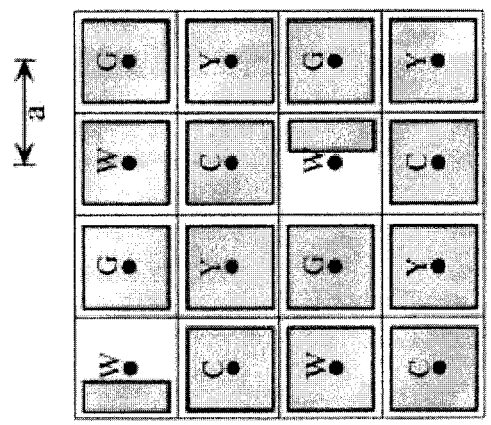
FIGS. 32A and 32B illustrate, as an example, an arrangement in the real space and a corresponding k-space.
Figure 32B:
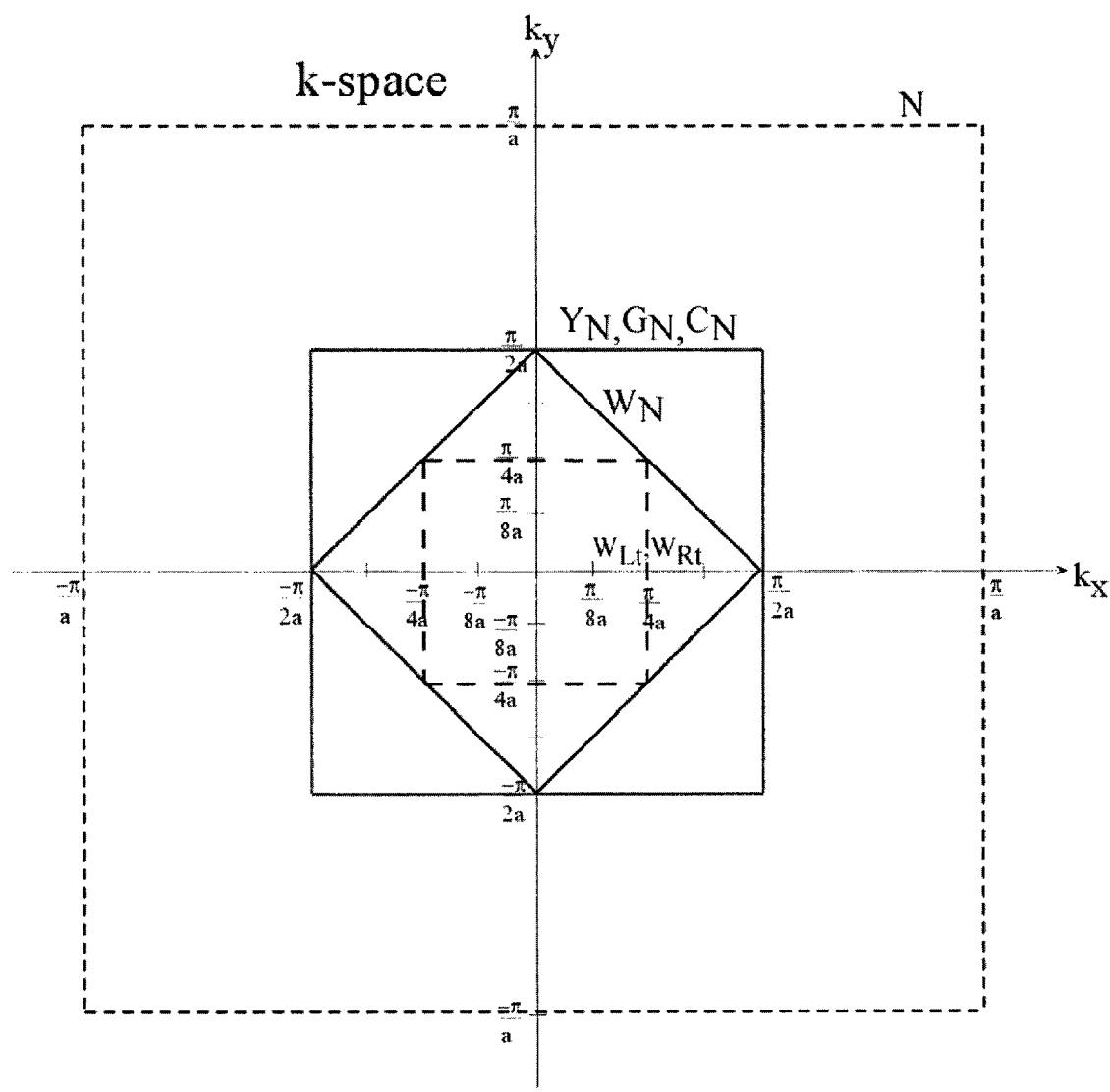

FIGS. 22A and 22B show the real space and the k-space corresponding to the above-described arrangement.

The image sensor 100 relating to the fourth implementation can produce parallax image data that provides luminance information. In other words, the image sensor 100 can output, as image data, monochrome 3D images, which can be also used as distance images used to calculate the distance of a subject. In addition, high-resolution 2D image data is used as basic data and multiplied by the relative ratios of the 3D image data, which is provided as luminance information, on the pixel-by-pixel basis. In this way, high-resolution color parallax image data can be produced.

The exemplary pixel arrangements described in the first to fourth implementations follow both of the rules that parallax pixels should be arranged at a low density and isotropically. The subsequent drawings are related to the other possible color-and-parallax multiplexed pixel arrangements based on these arrangement rules. FIGS. 23A and 23B, FIGS. 24A and 24B and FIGS. 25A and 25B respectively show the real space and the k space corresponding to the pixel arrangements in which the color filters are arranged in accordance with the Bayer arrangement and the parallax pixels are assigned only to the G pixels. These pixel arrangements slightly differ from each other in terms of the density of the parallax pixels. FIGS. 26A and 26B, FIGS. 27A and 27B and FIGS. 28A and 28B show the real space and the k-space for the pixel arrangements for monochrome sensors in which the parallax pixels are arranged following the above-described rules. Judging from the k-spaces corresponding to the respective pixel arrangements, the parallax pixels have an isotropic frequency resolving region, the spacious resolving region of the no-parallax pixels is maintained, and the parallax pixels provide for an appropriate resolution from the perspective of that parallax is generated in blur regions.

Likewise, FIGS. 29A and 29B, 30A and 30B, 31A and 31B and 32A and 32B respectively show the real space and the k-space for exemplary pixel arrangements in a complementary color system. Note that C, M, Y and W respectively represent cyan, magenta, yellow and white.

The above describes how the parallax pixels are arranged in the primary color system, monochrome system, and complementary color system. The most excellent pixel arrangement among the color pixel arrangements is the pixel arrangement relating to the first implementation. This is because the pixel arrangement relating to the first implementation is based on the Bayer arrangement and the no-parallax and parallax pixels realize the RGB ratio of R:G:B=1:2:1, which is equivalent to the resolution ratio approximate to the visual sensitivity characteristics, while the no-parallax pixels keep their capability at substantially the same level as the capability of the normal Bayer arrangement.

The following describes an exemplary pixel arrangement relating to a fifth implementation in which the densities of all of the R, G and B parallax pixels are doubled compared with the pixel arrangement relating to the first implementation. In the second implementation, only the parallax pixels of the R and B components are increased when compared with the pixel arrangement relating to the first implementation. In the fifth implementation, however, the parallax pixels of all of the R, G and B components are increased so that the color distribution ratio among the no-parallax pixels is R(N):G(N):B(N)=1:2:1, the color distribution ratio among the left parallax pixels is R(Lt):G(Lt):B(Lt)=1:2:1, and the color distribution ratio among the right parallax pixels is R(Rt):G(Rt):B(Rt)=1:2:1, which is the same color distribution ratio in the Bayer arrangement, and the distribution ratio between the no-parallax pixels (N), the left parallax pixels (Lt) and the right parallax pixels (Rt) is increased from N:Lt:Rt=14:1:1 to N:Lt:Rt=6:1:1.

Figure 34A:
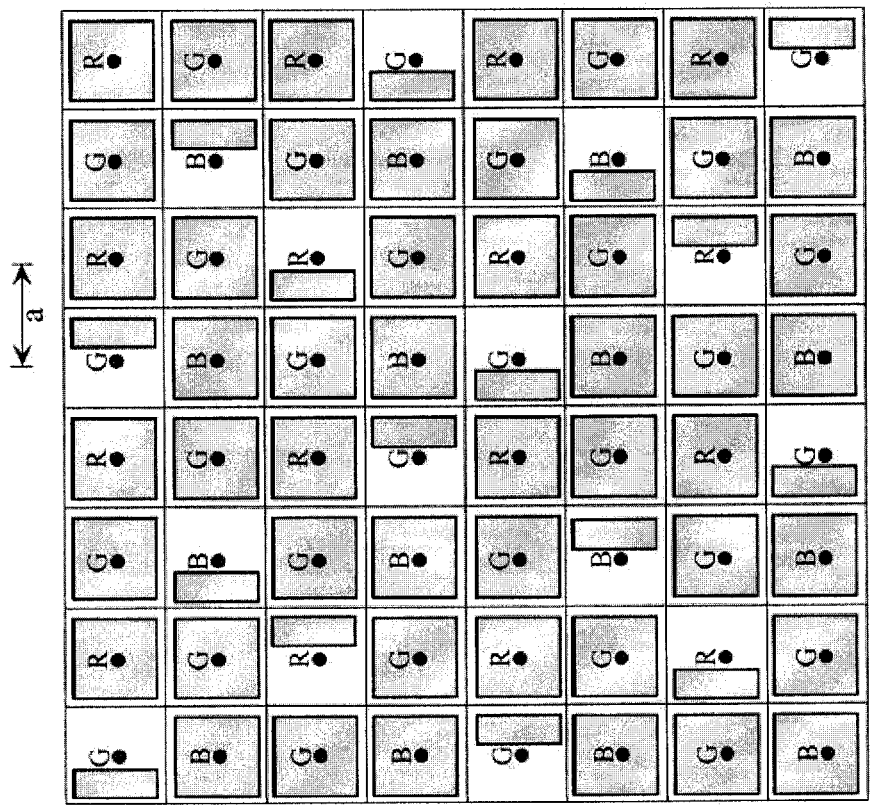
FIGS. 34A and 34B illustrate, as an example, an arrangement in the real space and a corresponding k-space.
Figure 34B:
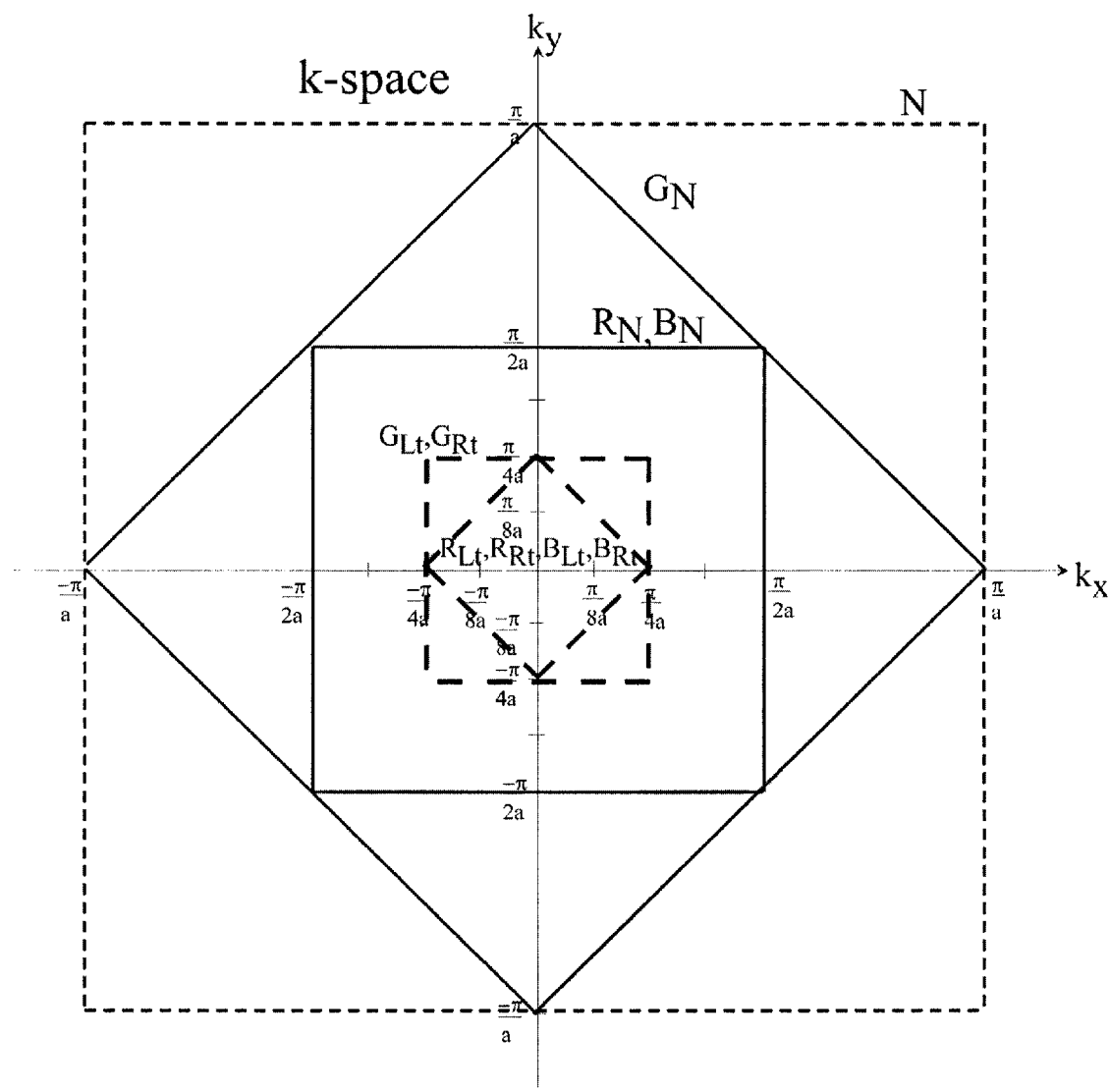

FIG. 34A shows how the pixels are arranged in the fifth implementation. FIG. 34B shows the k-space for the pixel arrangement. However, note that the resolving range of the no-parallax pixels in the k-space in FIG. 34B is assumed not to be smaller than the resolving range of the Bayer arrangement since the parallax pixels are arranged at a low density. FIG. 34B show approximately estimated resolving ranges for the G(Lt) and G(Rt) pixels.

The pixel arrangement is additionally described. In the primitive lattice of 8×8, every row has one left parallax pixel and one right parallax pixel. Furthermore, every column has one left parallax pixel and one right parallax pixel. The parallax pixels are arranged at equal intervals and the different types of parallax pixels are arranged as distant from each other as possible. When the left parallax pixels are connected by straight lines irrespective of their colors, left oblique lines are drawn at approximately 30 degrees from the horizontal line and right oblique lines are also drawn orthogonally to the left oblique lines. The same applies to the right parallax pixels. Accordingly, the low-density parallax pixels are isotropically arranged.

This pixel arrangement is characterized in that the spatial 2D resolution and the spatial 3D resolution are well balanced. In other words, the no-parallax pixels are densely arranged to maintain high 2D image quality while the parallax pixels, which can produce stereoscopic images, are arranged at such a density that every column and row has one or more parallax pixels. Accordingly, the parallax pixel arrangements relating to the first and fifth implementations can be interpreted as being developed so as to be compatible with the monocular pupil-division stereoscopic imaging scheme while still following the color distribution ratio of the Bayer arrangement.

The following describes the image processing to produce 2D image data and a plurality of pieces of parallax image data. As seen from the arrangement of parallax and no-parallax pixels in the repeating pattern 110, image data representing a particular image cannot be obtained simply by arranging the outputs of the image sensor 100 in accordance with its pixel arrangement. In other words, grouping and collecting the outputs from the pixels of the image sensor 100 for each group of pixels with the same characteristic can provide image data representing an image having the characteristic. For example, as has been described with reference to FIG. 5, grouping and collecting the outputs from the parallax pixels according to the types of their openings can provide a plurality of pieces of parallax image data that have parallax therebetween. Here, the image data obtained by grouping and collecting the outputs from the pixels for each group of the pixels having the same characteristic is referred to as plane data.

The image processor 205 receives raw original image data in which the output values of the pixels of the image sensor 100 are arranged in the order of the pixel arrangement of the image sensor 100. The image processor 205 then separates the raw original image data into a plurality of pieces of plane data. The following describes how to produce each plane data taking, as an example, the outputs from the image sensor 100 relating to the first implementation described with reference to FIG. 7

Figure 12:
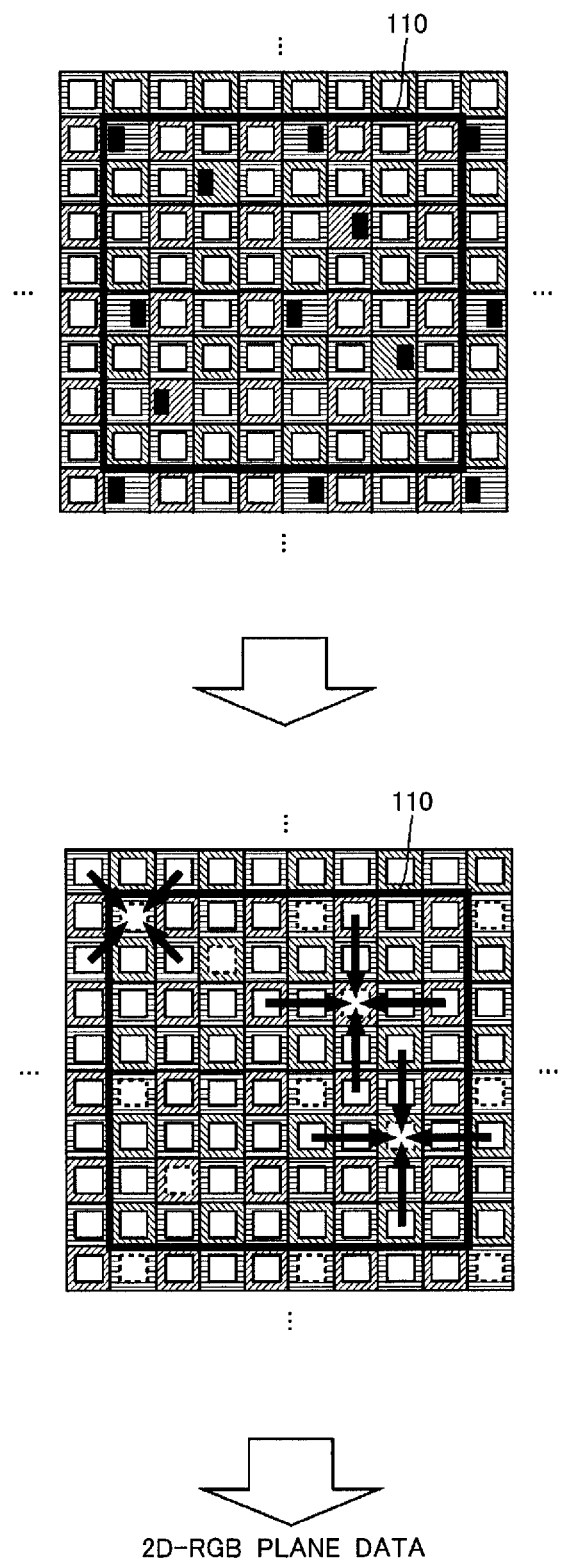
FIG. 12 illustrates, as an example, how to produce RGB plane data, which is 2D image data.

FIG. 12 illustrates, as an example, how to produce 2D-RGB plane data, which is 2D image data. The top drawing shows the outputs from the pixels in the single repeating pattern 110 and its surrounding pixels in the image sensor 100 in accordance with the pixel arrangement of the image sensor 100. Note that, in FIG. 12, the pixels are shown in accordance with the example of FIG. 7 so that the different types of pixels can be understood, but it is actually the output values corresponding to the pixels that are arranged.

To produce the 2D-RGB plane data, the image processor 205 first removes the pixel values of the parallax pixels and creates empty pixel positions. The pixel value for each empty pixel position is calculated by interpolation using the pixel values of the surrounding pixels having the color filters of the same type. For example, the pixel value for an empty pixel position $P_{11}$ is calculated by averaging the pixel values of the obliquely adjacent G-filter pixels $P_{-1-1}$, $P_{2-1}$, $P_{-12}$, $P_{22}$. Furthermore, for example, the pixel value for an empty pixel position $P_{63}$ is calculated by averaging the pixel values of the R-filter pixels $P_{43}$, $P_{61}$, $P_{83}$, $P_{65}$ that are vertically and horizontally adjacent to the empty pixel position $P_{63}$ with one pixel position placed therebetween. Likewise, the pixel value for an empty pixel position $P_{76}$ is calculated by averaging the pixel values of the B-filter pixels $P_{56}$, $P_{74}$, $P_{96}$, $P_{78}$ that are vertically and horizontally adjacent to the empty pixel position $P_{76}$ with one pixel position placed therebetween.

The resulting 2D-RGB plane data obtained by the above-described interpolation is the same as the output from a normal image sensor having the Bayer arrangement and can be subsequently subjected to various types of processing as 2D image data. To be specific, the known Bayer interpolation technique is performed to produce color image data in which each pixel has RGB data. The image processor 205 performs image processing in accordance with predetermined formats, for example, follows the JPEG standard or the like to produce still image data and follows the MPEG standard or the like to produce moving image data.

Figure 13:
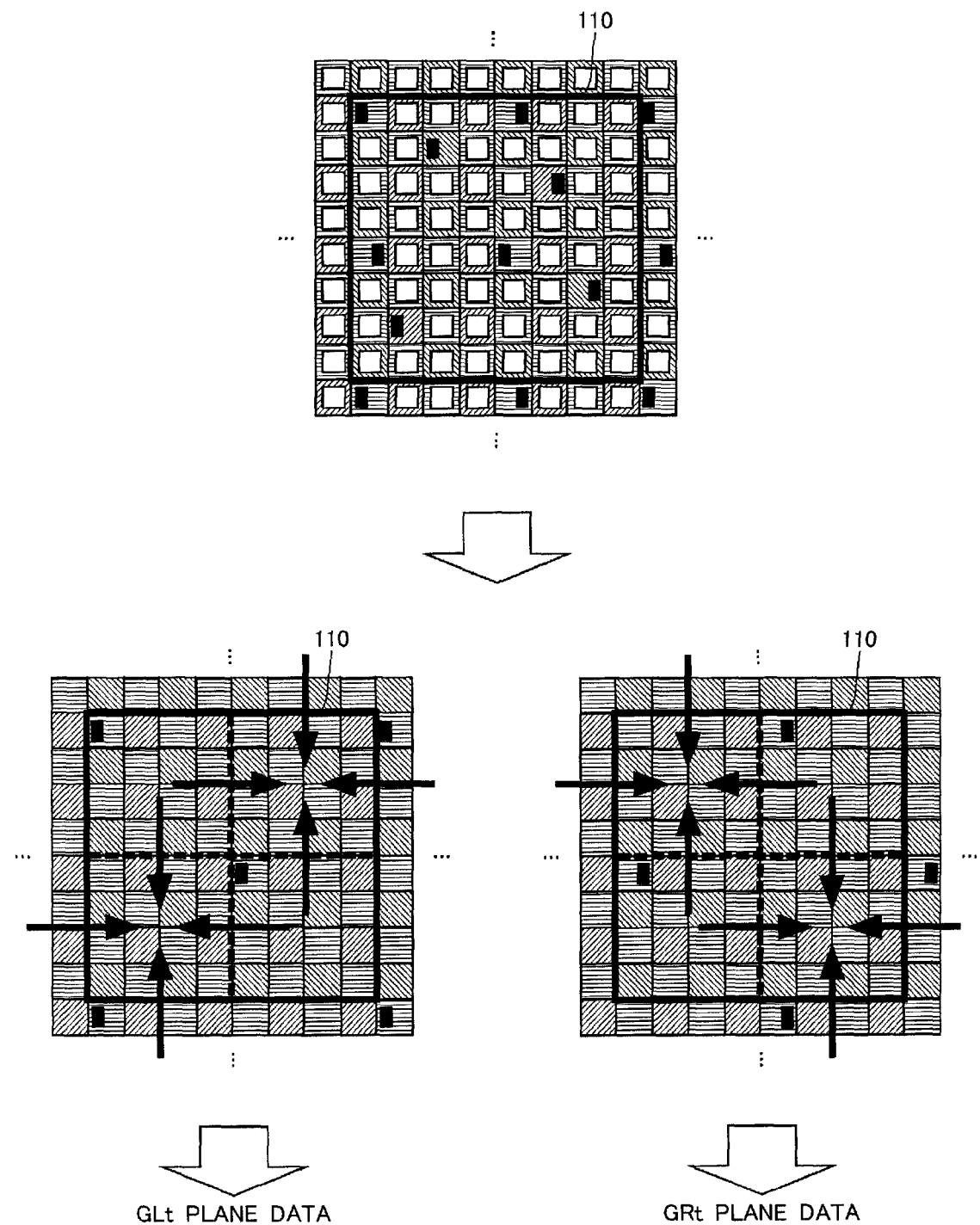
FIG. 13 illustrates, as an example, how to produce two pieces of G plane data, which are parallax image data.

FIG. 13 illustrates, as an example, how to produce two pieces of G plane data, which are parallax image data. In other words, GLt plane data, which is left parallax image data, and GRt plane data, which is right parallax image data, are produced.

To produce the GLt plane data, the image processor 205 removes the pixel values, except for the pixel values of the G(Lt) pixels, from all of the output values of the image sensor 100 and creates empty pixel positions. As a result, two pixel values $P_{11}$ and $P_{55}$ are left in the repeating pattern 110. The repeating pattern 110 is vertically and horizontally divided into four portions. The pixel values of the 16 pixels in the upper left portion are represented by the output value at $P_{11}$, and the pixel values of the 16 pixels in the lower right portion are represented by the output value at $P_{55}$. The pixel value for the 16 pixels in the upper right portion and the pixel value for the 16 pixels in the lower left portion are interpolated by averaging the surrounding or vertically and horizontally adjacent representative values. In other words, the GLt plane data has one value per 16 pixels.

Likewise, to produce the GRt plane data, the image processor 205 removes the pixel values, except for the pixel values of the G(Rt) pixels, from all of the output values of the image sensor 100 and creates empty pixel positions. As a result, two pixel values $P_{51}$ and $P_{15}$ are left in the repeating pattern 110. The repeating pattern 110 is vertically and horizontally divided into four portions. The pixel values of the 16 pixels in the upper right portion are represented by the output value at $P_{51}$, and the pixel values of the 16 pixels in the lower left portion are represented by the output value at $P_{15}$. The pixel value for the 16 pixels in the upper left portion and the pixel value for the 16 pixels in the lower right portion are interpolated by averaging the surrounding or vertically and horizontally adjacent representative values. In other words, the GRt plane data has one value per 16 pixels.

In this manner, the GLt plane data and GRt plane data, which have lower resolution than the 2D-RGB plane data, can be produced.

Figure 14:
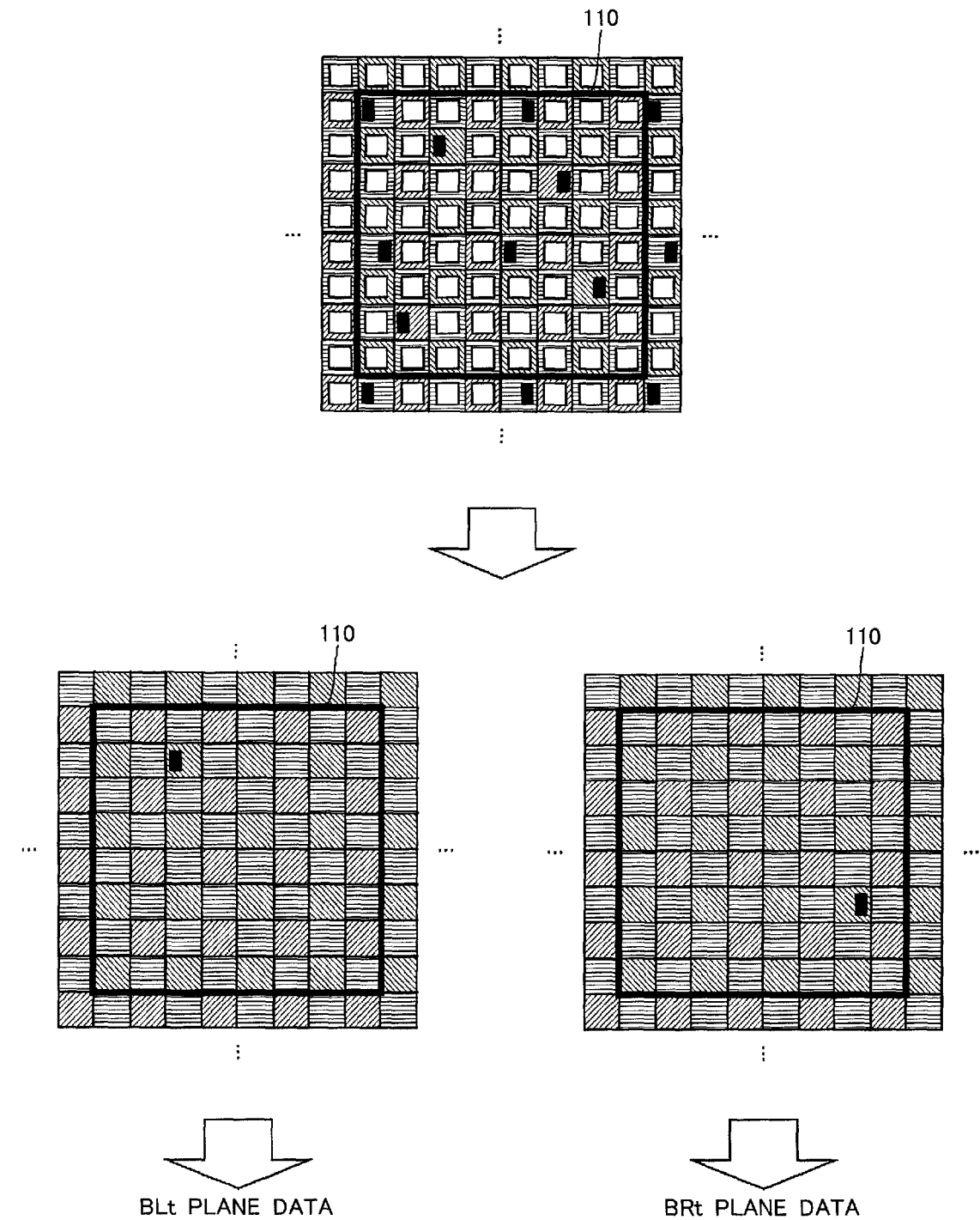
FIG. 14 illustrates, as an example, how to produce two pieces of B plane data, which are parallax image data.

FIG. 14 illustrates, as an example, how to produce two pieces of B plane data, which are parallax image data. In other words, BLt plane data, which is left parallax image data, and BRt plane data, which is right parallax image data, are produced.

To produce the BLt plane data, the image processor 205 removes the pixel values, except for the pixel value of the B(Lt) pixel, from all of the output values of the image sensor 100 and creates empty pixel positions. As a result, a pixel value $P_{32}$ is left in the repeating pattern 110. This pixel value is used as the representative value of the 64 pixels of the repeating pattern 110.

Likewise, to produce the BRt plane data, the image processor 205 removes the pixel values, except for the pixel value of the B(Rt) pixel, from all of the output values of the image sensor 100 and creates empty pixel positions. As a result, a pixel value $P_{76}$ is left in the repeating pattern 110. This pixel value is used as the representative value of the 64 pixels of the repeating pattern 110.

In this manner, the BLt plane data and BRt plane data, which have lower resolution than the 2D-RGB plane data, can be produced. Here, the BLt plane data and BRt plane data have lower resolution than the GLt plane data and GRt plane data.

Figure 15:
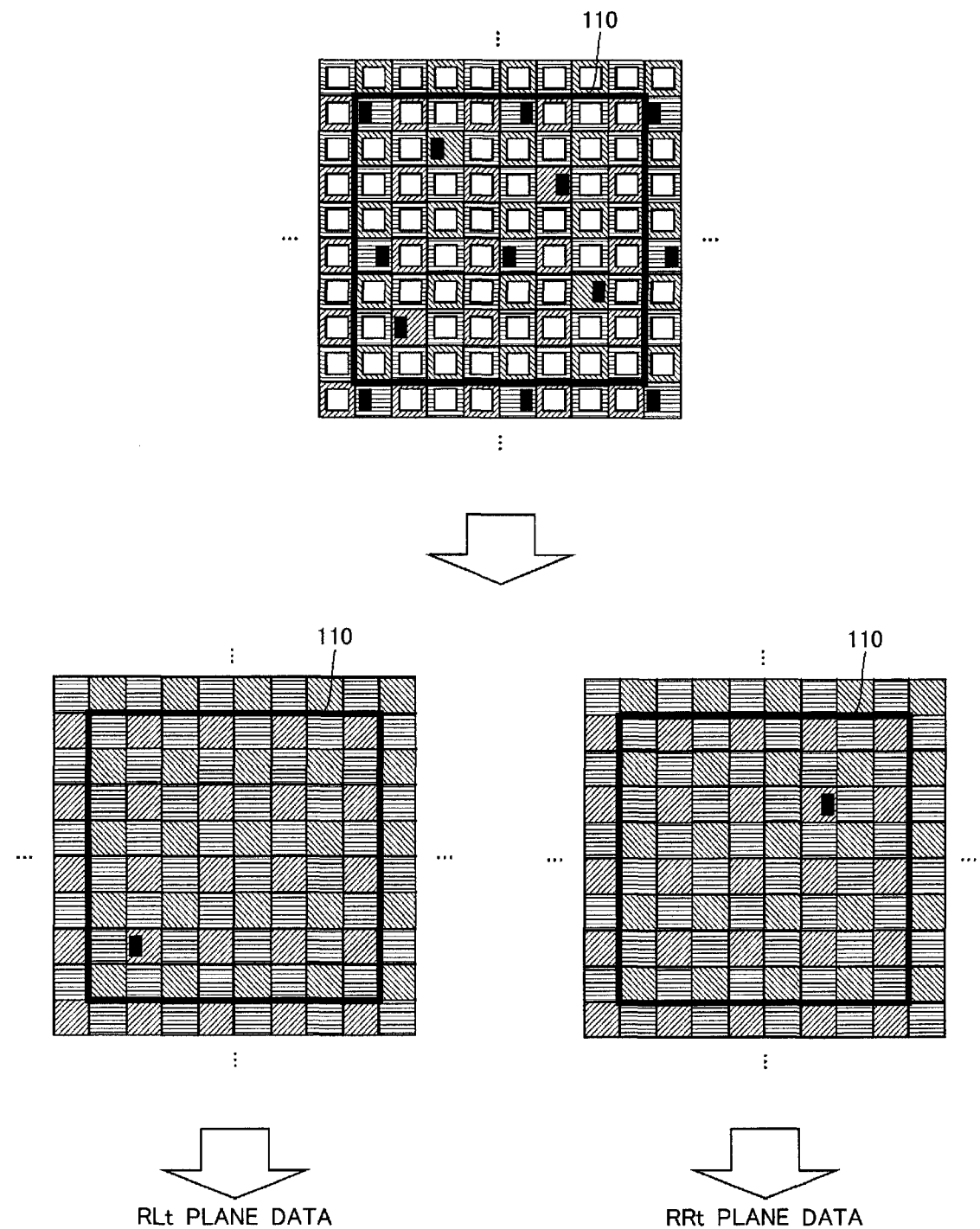
FIG. 15 illustrates, as an example, how to produce two pieces of R plane data, which are parallax image data.

FIG. 15 illustrates, as an example, how to produce two pieces of R plane data, which are parallax image data. In other words, RLt plane data, which is left parallax image data, and RRt plane data, which is right parallax image data, are produced.

To produce the RLt plane data, the image processor 205 removes the pixel values, except for the pixel value of the R(Lt) pixel, from all of the output values of the image sensor 100 and creates empty pixel positions. As a result, a pixel value $P_{27}$ is left in the repeating pattern 110. This pixel value is used as the representative value of the 64 pixels of the repeating pattern 110.

Likewise, to produce the RRt plane data, the image processor 205 removes the pixel values, except for the pixel value of the R(Rt) pixel, from all of the output values of the image sensor 100 and creates empty pixel positions. As a result, a pixel value $P_{63}$ is left in the repeating pattern 110. This pixel value is used as the representative value of the 64 pixels of the repeating pattern 110.

In this manner, the RLt plane data and RRt plane data, which have lower resolution than the 2D-RGB plane data, can be produced. Here, the RLt plane data and RRt plane data have lower resolution than the GLt plane data and GRt plane data and substantially the same resolution as the BLt plane data and BRt plane data.

Figure 16:
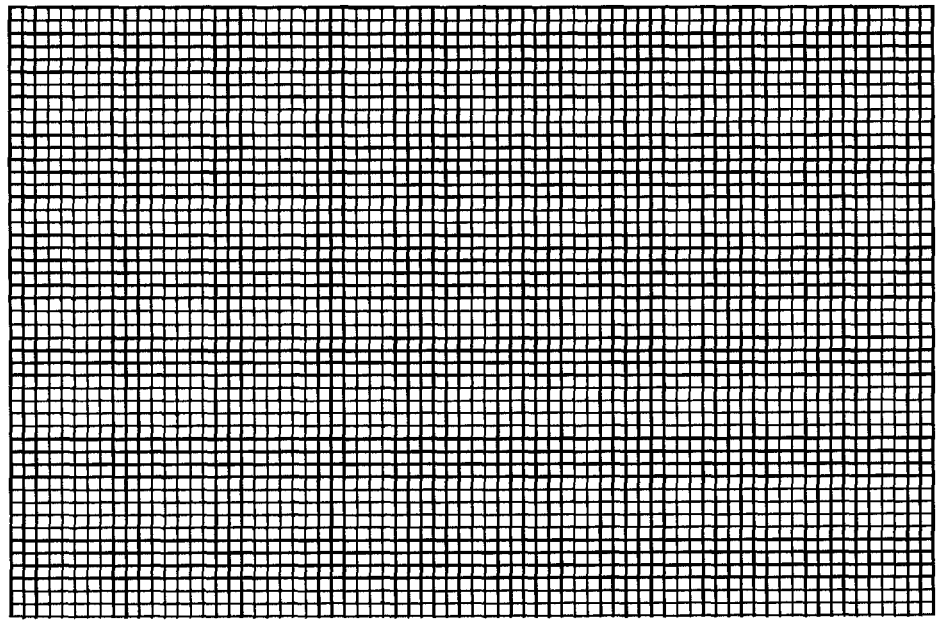
FIG. 16 is a conceptual view to illustrate the relation between the resolutions of the respective planes.
Figure 16:
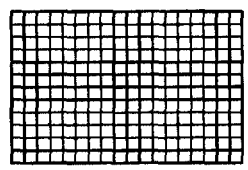
Figure 16:
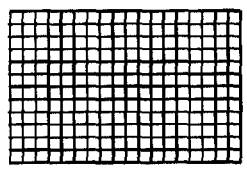
Figure 16:
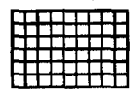
Figure 16:
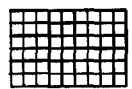
Figure 16:
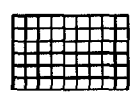
Figure 16:
Figure 17A:
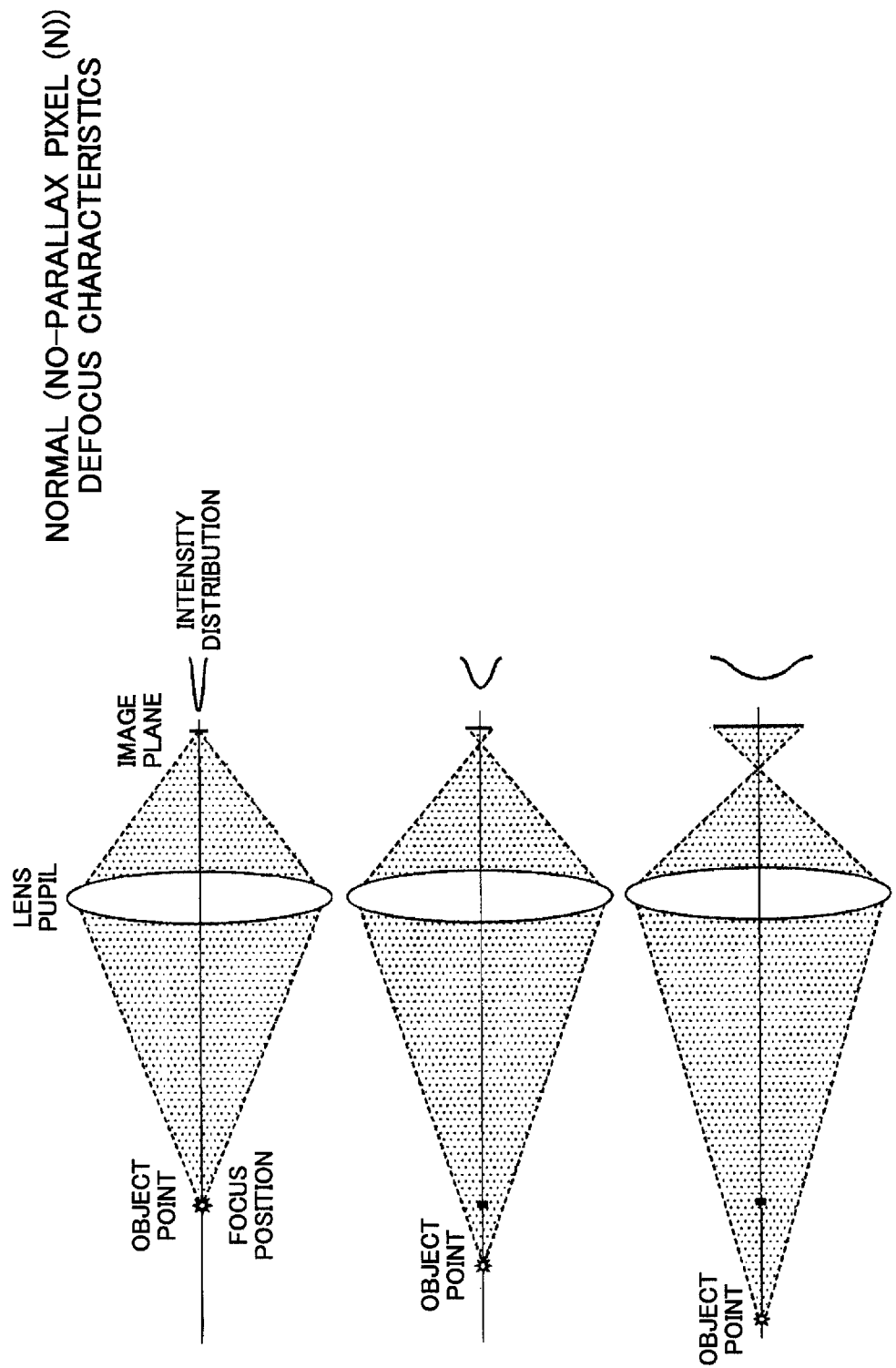
FIGS. 17A and 17B illustrate the concept of defocusing.
Figure 17B:
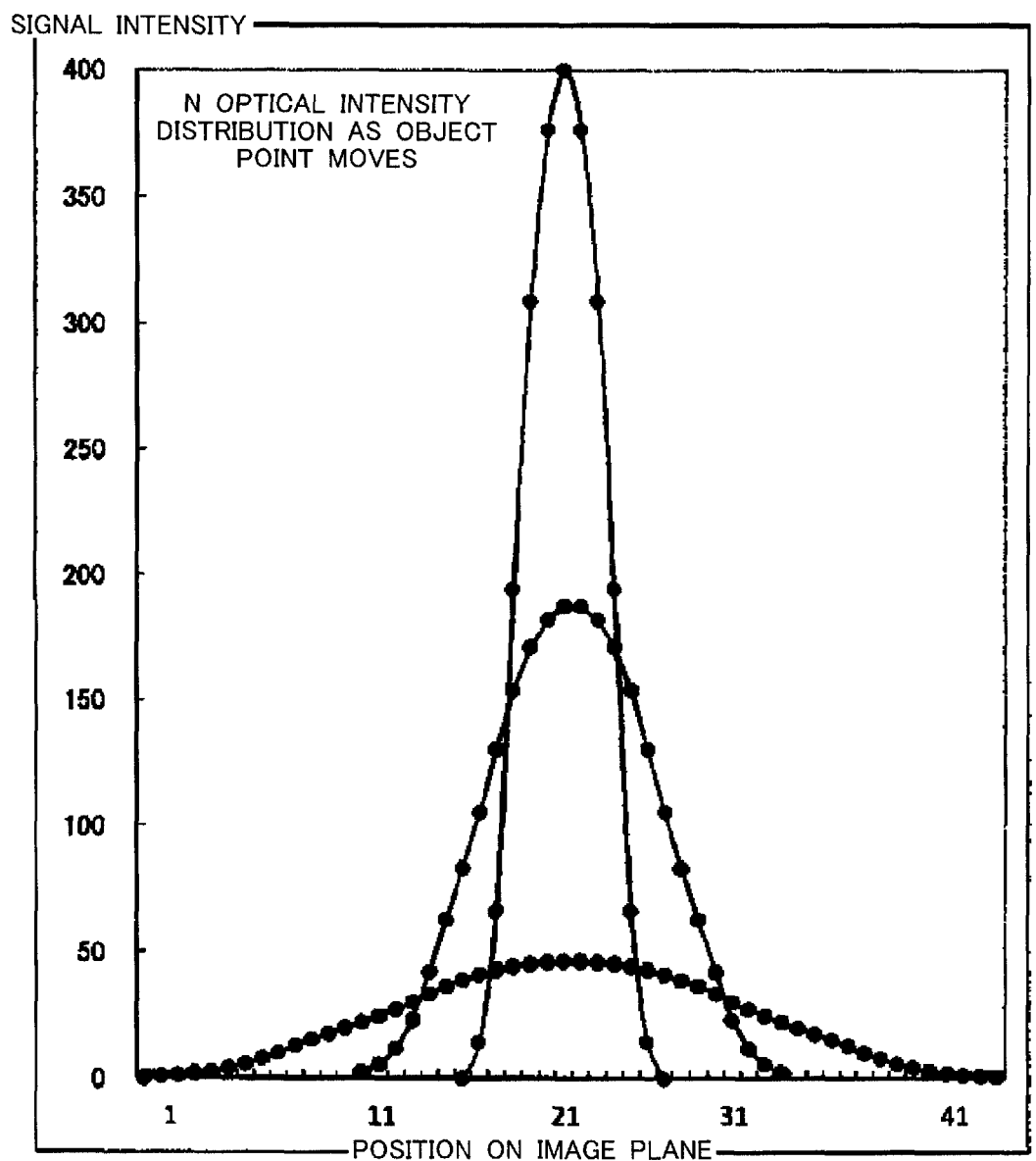
Figure 18A:
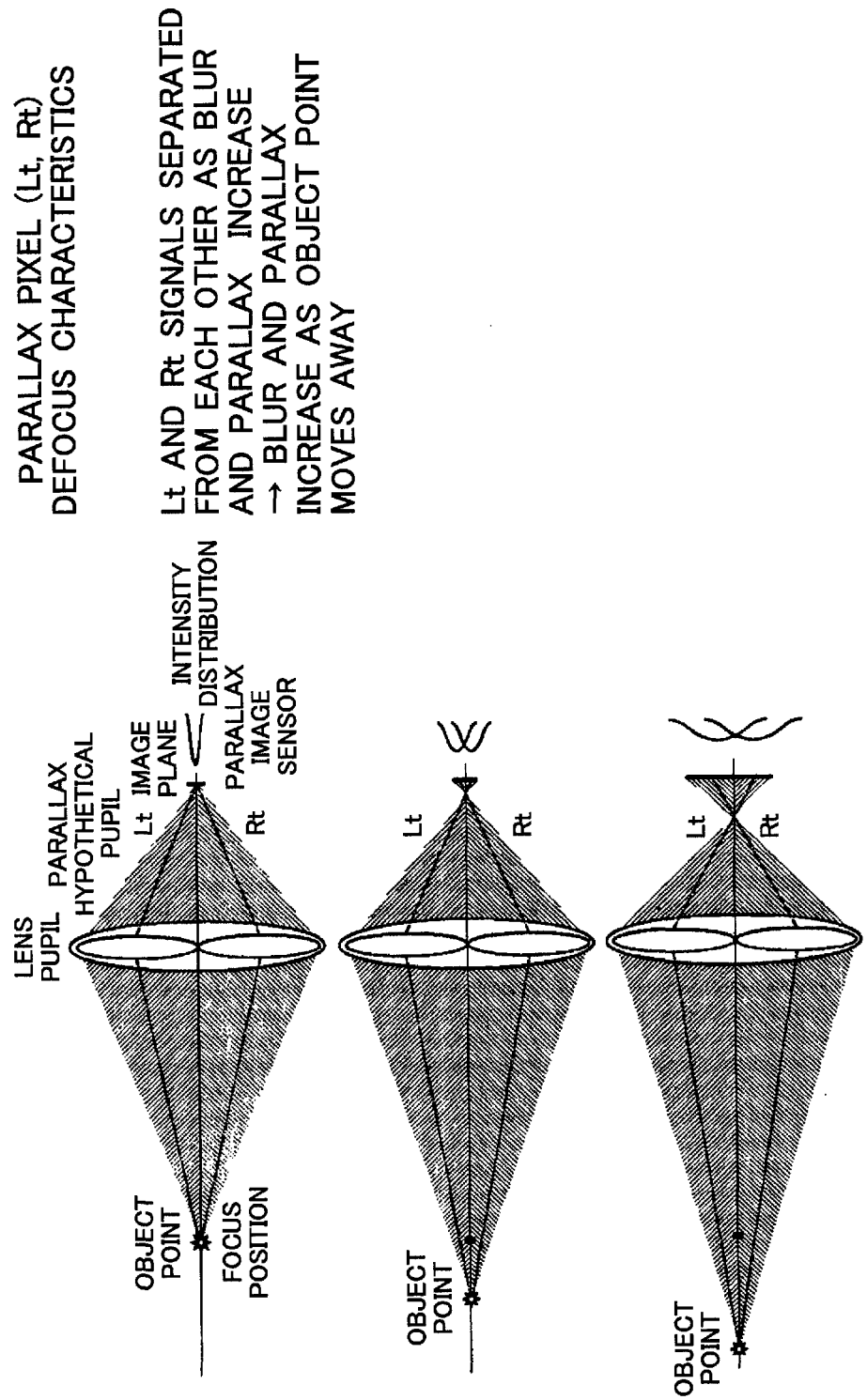
FIGS. 18A and 18B illustrate the concept of defocusing for parallax pixels.
Figure 18B:
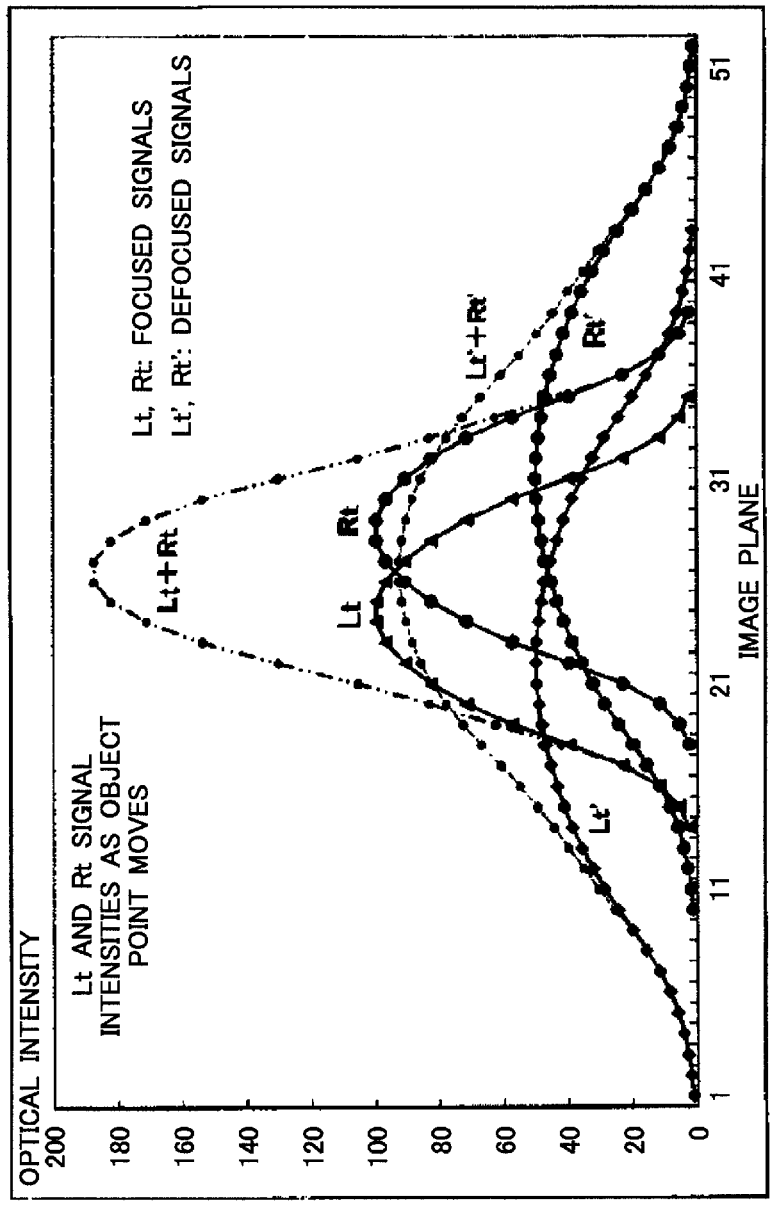

FIG. 16 is a conceptual view illustrating the relation between the resolutions of the respective planes. The 2D-RGB plane data has output values whose number is substantially the same as the number of effective pixels of the image sensor 100 since it has undergone interpolation using, for example, the technique disclosed in US 2010-0201853. The GLt plane data and GRt plane data each have output values whose number is equal to 1/16 (1/4×1/4) of the number of pixels of the 2D-RGB plane data due to the interpolation. The BLt plane data, BRt plane data, RLt plane data and RRt plane data each have output values whose number is equal to 1/64 (=1/8×1/8) of the number of pixels of the 2D-RGB plane data. These pieces of low-resolution plane data undergo the bilinear interpolation technique to be enlarged with variable multiplication ratios and transformed into plane data whose number of pixels is equal to the number of effective pixels of the image sensor. However, these pieces of plane data substantially only have a resolving power equal to the resolution of the original pieces of plane data before the enlargement with variable multiplication ratios. In other words, the plane data resulting from the enlargement with variable multiplication ratios is image data in which changes are gradual. This fact has already been described with reference to the k-space and merely described again from the perspective of the real space.

Considering the differences between the resolutions of the above-described pieces of plane data, the high-resolution 2D image can be first output. While the information of the 2D image is used, parallax image data is used to perform synthesis by performing parallax modulation using the above-described expressions. In this way, a high-resolution 3D image can be output.

Note that, while parallax images corresponding to the two viewpoints can be obtained by using the two different types of parallax pixels as in the first and second implementations, various numbers of types of parallax pixels can be used depending on the desired number of parallax images. Various repeating patterns 110 can be formed depending on the specifications, purposes or the like, irrespective of whether the number of viewpoints increases. In this case, to enable both 2D and 3D images to have a high resolution, it is important that the primitive lattice of the image sensor 100 includes parallax pixels having all of the combinations of the different types of openings and the different types of color filters and that the no-parallax pixels are more than the parallax pixels. Furthermore, it is also important to arrange the parallax pixels isotropically and equally.

To sum up, the nature of the present invention has the following three important advantages. Firstly, when the monocular pupil-division imaging scheme is employed with parallax pixels, the parallax pixels can be arranged at a low density since parallax is only caused in a non-focused portion or blur subject image region and the left and right parallax images are only required to achieve a low spatial resolution. Therefore, since parallax is not caused in a focused subject image including high-frequency components, no-parallax pixels can be densely arranged. Accordingly, the present invention can provide a color-and-parallax multiplexed pixel arrangement that is extremely suitable for the monocular pupil-division imaging scheme.

Secondly, the left and right parallax images are used to produce final high-resolution color parallax images by modulating no-parallax images horizontally. To perform the horizontal parallax modulation most effectively so as to achieve a high resolution, the respective parallax images need to have a high resolution in the horizontal direction. This requirement is satisfied by the color-and-parallax multiplexed pixel arrangement in which the parallax pixels are isotropically arranged.

Thirdly, when the parallax pixels are inserted among the no-parallax pixels, it is necessary to reduce the adverse effects made by the parallax pixels as much as possible and to maintain the spatial resolution achieved by the no-parallax pixels before the insertion of the parallax pixels as much as possible. This requirement is satisfied by the method of arranging and distributing the parallax pixels as equally and isotropically as possible. For the above-described reasons, the present invention provides an image sensor of the monocular pupil-division imaging scheme in which the parallax pixels are effectively arranged at a low density and isotropically.

In the above, the exemplary case is described in which the Bayer arrangement is employed as the color filter arrangement. It goes without saying, however, other color filter arrangements can be used. Furthermore, in the above-described example, the three primary colors of red, green and blue are used for the color filters. However, four or more primary colors including emerald green may be used. In addition, red, green and blue can be replaced with three complementary colors of yellow, magenta and cyan.

Figure 33:
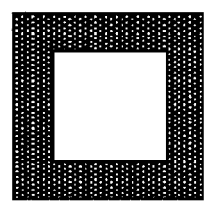
FIG. 33 illustrates a full-open no-parallax pixel and a half-open no-parallax pixel.
Figure 33:
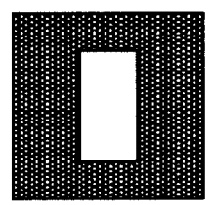

The above has described an example where the no-parallax pixels have full-open masks. However, the no-parallax pixels can be also realized as pixels having half-open masks, which are the same masks as used in the parallax pixels, arranged at the center of the pixels as shown in FIG. 33.

The above-described pixel arrangements in which the no-parallax pixels (N pixels) and the parallax pixels (Lt and Rt pixels) coexist advantageously realize a wide dynamic range since the exposure that causes the signal amounts of the parallax pixels to be saturated is approximately doubled when compared with the normal Bayer arrangement that is constituted only by N pixels. Namely, the feature that the openings to receive light are halved in the parallax pixels can simultaneously produce the two effects that parallax is caused to enable stereoscopic imaging and that the dynamic range is increased to raise the saturation signal amounts. Accordingly, when 2D and 3D images are produced using the pixel arrangements described in the embodiments, high-dynamic-range images can be obtained.

In the above description, one of the parallax Lt pixel and the parallax Rt pixel is assigned to a single pixel. However, it is also possible that both of the parallax Lt and Rt pixels are assigned to a single pixel. For example, the photoelectric converter element constituting a single pixel is divided into the left and right portions, which can be respectively treated as the parallax Lt pixel and the parallax Rt pixel. In a pixel arrangement having such parallax pixels, the parallax Lt and Rt pixels are arranged at a higher density and the spatial resolutions of the parallax Lt and Rt pixels can be raised. Here, when the photoelectric converter elements of the parallax pixels are compared with the photoelectric converter elements of the no-parallax pixels, one parallax pixel has an area that is substantially half of the area occupied by one no-parallax pixel. Namely, square pixels, which are the N pixels, and rectangular pixels, which are the parallax Lt and Rt pixels, are mixed. When combined, one parallax Lt pixel and one parallax Rt pixels occupy a substantially square region.

Figure 35A:
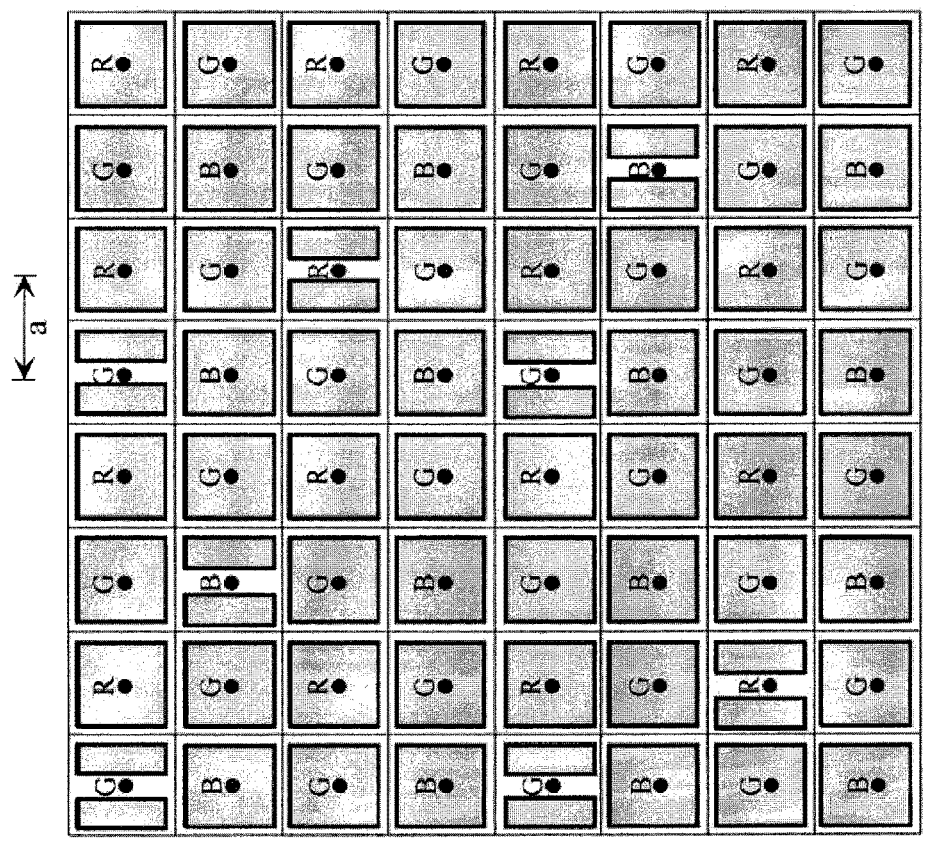
FIGS. 35A and 35B illustrate, as an example, an arrangement in the real space and a corresponding k-space.
Figure 35B:
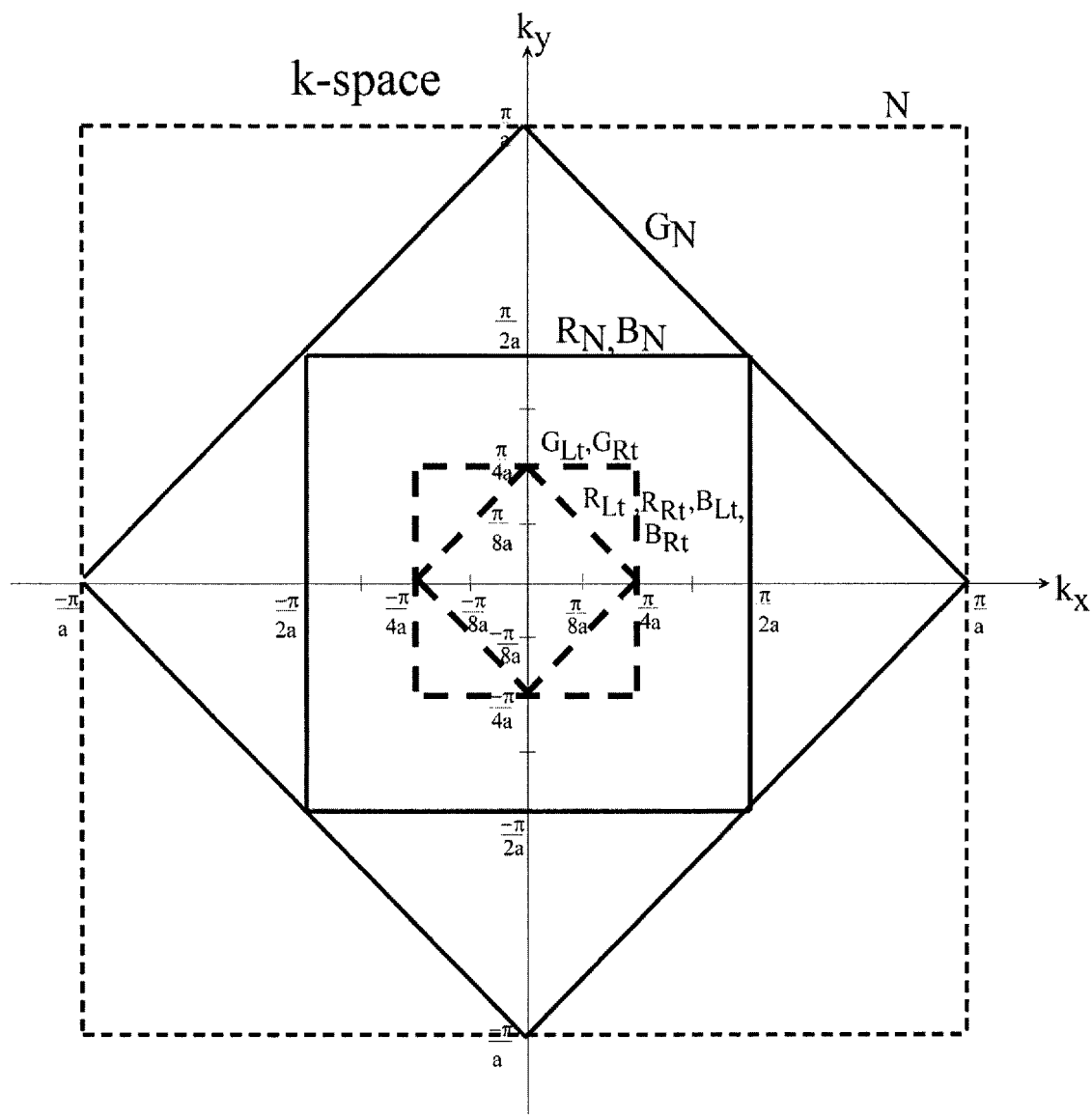

FIGS. 35A and 35B show, as an example, a pixel arrangement in the real space and the corresponding k-space. In the pixel arrangement shown in FIG. 35A, the ratio between the number of no-parallax pixels, the number of parallax Lt pixels and the number of parallax Rt pixels is N:Lt:Rt=14:2:2. When compared with the pixel arrangement shown in FIG. 19A, the densities of the parallax Lt and Rt pixels are increased. As a result, as seen from the k-space in FIG. 35B, the spatial resolutions of the parallax Lt and Rt pixels are improved for all of the R, G and B color components.

Figure 36A:
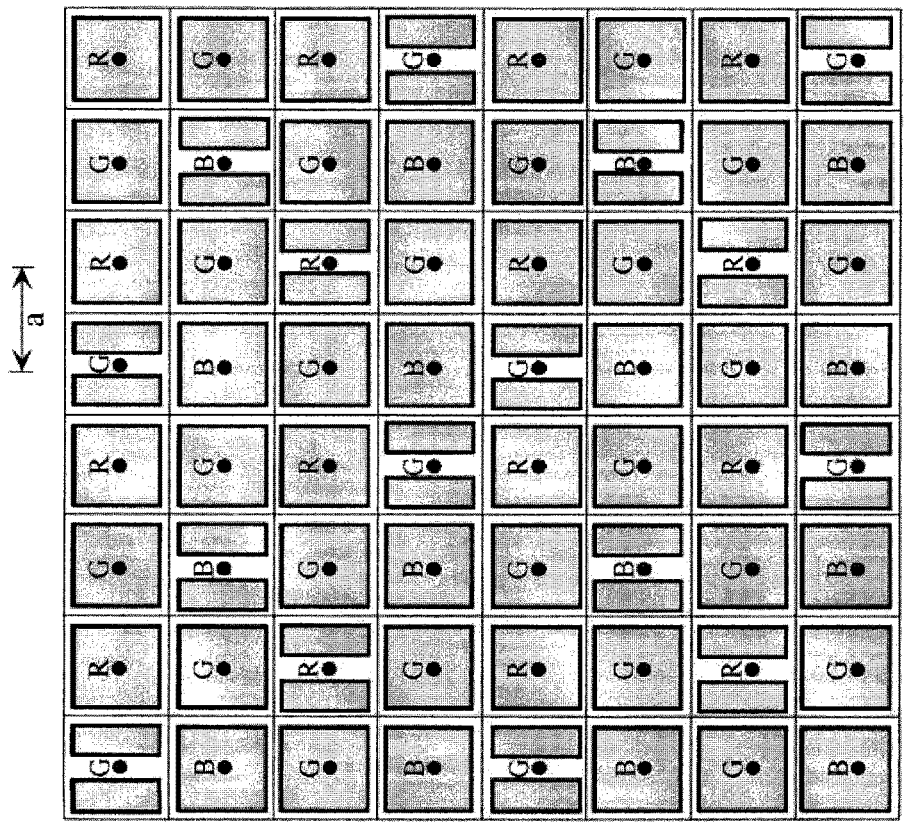
FIGS. 36A and 36B illustrate, as an example, an arrangement in the real space and a corresponding k-space.
Figure 36B:
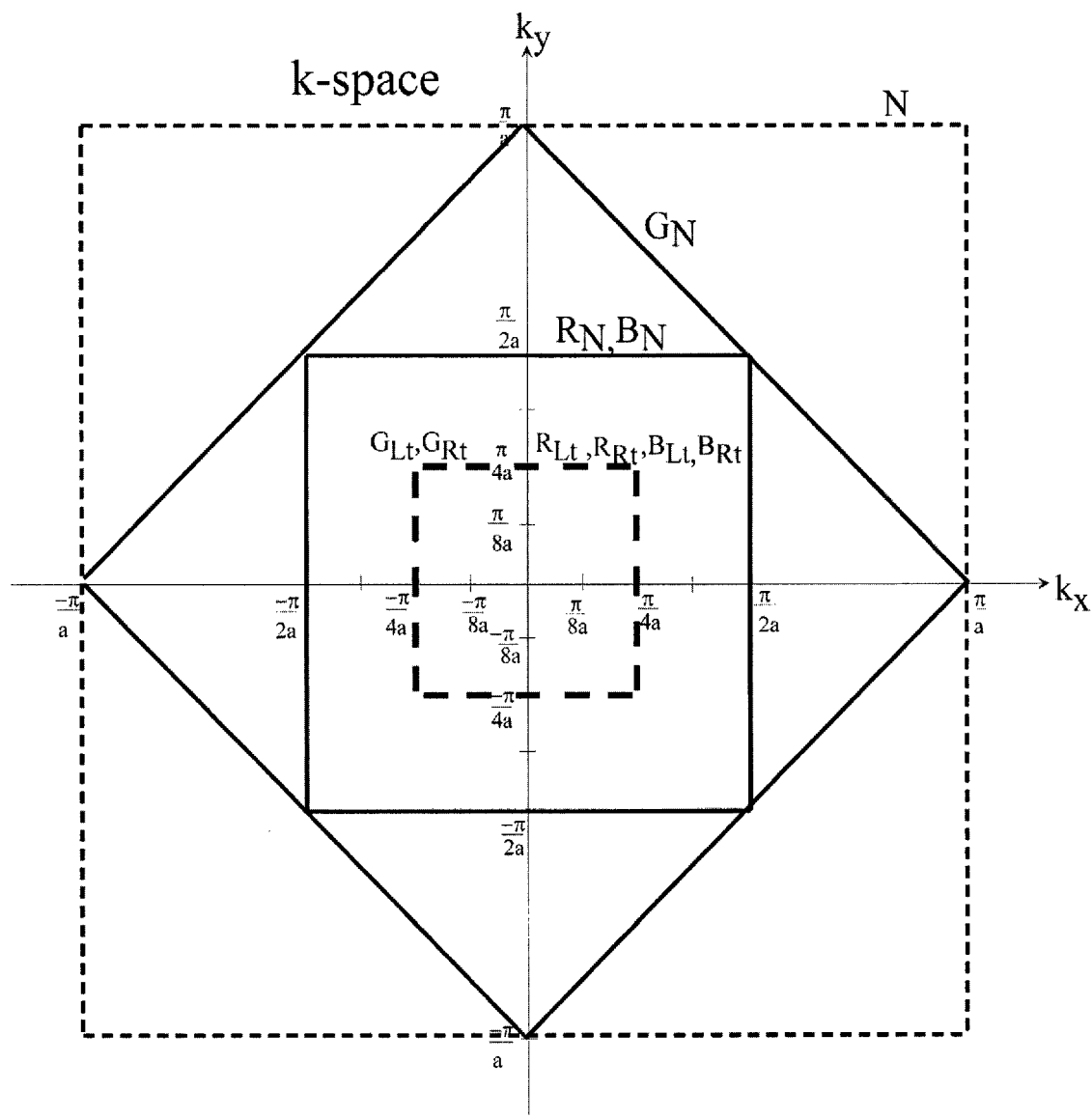

FIGS. 36A and 36B show, as an example, a pixel arrangement in the real space and the corresponding k-space. In the pixel arrangement shown in FIG. 36A, the ratio between the number of no-parallax pixels, the number of parallax Lt pixels and the number of parallax Rt pixels is N:Lt:Rt=6:2:2. When compared with the pixel arrangement shown in FIG. 34A, the densities of the parallax Lt and Rt pixels are increased. As a result, as seen from the k-space in FIG. 36B, the spatial resolutions of the parallax Lt and Rt pixels are improved for all of the R, G and B color components.

Figure 37:
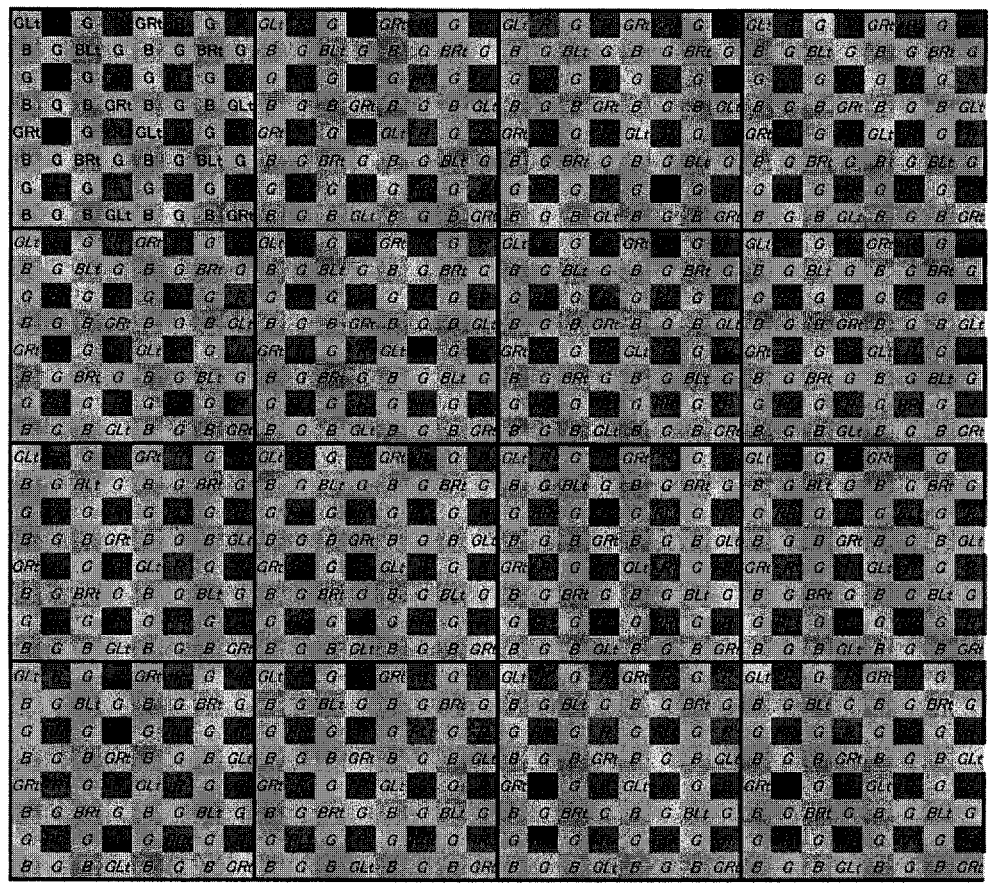
FIG. 37 shows moving image reading.

Regarding some of the above-described pixel arrangements that satisfy special conditions, moving image reading can be performed by adding together a plurality of pixels in the horizontal direction and discarding a plurality of pixels in the vertical direction. FIG. 37 illustrates how to perform moving image reading when the pixel arrangement shown in FIG. 34A is used. In this case, three pixels of the same color that are adjacent to each other in the horizontal direction are added together and three pixels are discarded in the vertical direction. In FIG. 37, for better visual understanding of the pixel addition and discard, four unit cell arrangements, each of which is the same as the pixel arrangement shown in FIG. 34A, are arranged in both of the vertical and horizontal directions. Here, the pixel position is represented as (i,j). For example, the leftmost and uppermost pixel position is represented as (1,1) and the rightmost and lowermost pixel position is represented as (32, 32).

For example, by adding together the pixel value of the GLt pixel at the position of (1,1), the pixel value of the G pixel at the position of (1,3) and the pixel value of the GRt pixel at the position of (1,5), a G pixel value can be obtained. Likewise, by adding together the pixel value of the G pixel at the position of (1,7), the pixel value of the GLt pixel at the position of (1,9) and the pixel value of the G pixel at the position of (1,11), a GLt pixel value can be obtained. The disparity for the GLt pixel resulting from the addition and discard is reduced to ⅓ since the pixel values of one parallax pixel and two N pixels are averaged. Therefore, the disparity may be increased three times during the parallax modulation. In other words, all of the modulation terms may be multiplied three times in the case of the parallax modulation that maintains the differences constant and all of the modulation terms may be raised to the third power in the case of the parallax modulation that maintains the ratios constant.

When the moving image reading is performed as described above and when all pixel reading is performed, the ratio between the number of no-parallax pixels, the number of the parallax Lt pixels and the number of parallax Rt pixels is N:Lt:Rt=6:1:1 in both of the cases. In addition, the pixel arrangement in the case of the moving image reading is exactly the same as the pixel arrangement in the case of the all pixel reading if the roles of the R and B components are switched. Thus, the pixel arrangement in which the ratio between the number of no-parallax pixels, the number of parallax Lt pixels and the number of parallax Rt pixels is N:Lt:Rt=6:1:1 has such excellent characteristics that the moving image reading can be performed while the ratio of N:Lt:Rt=6:1:1 is maintained and the relative positions of the different types of pixels are not changed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An image sensor comprising:
   parallax pixels having photoelectric converter elements each of which is associated with one of a plurality of types of aperture masks that respectively have openings positioned to transmit different partial luminous fluxes of an incident luminous flux from each other; and no-parallax pixels configured to guide the incident luminous flux to photoelectric converter elements without limitation of openings, wherein the parallax pixels are arranged at equal intervals in both of two dimensional directions in such a manner that a parallax pixel associated with an aperture mask of one of the types is sandwiched between a no-parallax pixel and a parallax pixel associated with an aperture mask of a different one of the types, and parallax pixels associated with aperture masks of different ones of the types are arranged as distant as possible.

2. The image sensor as set forth in claim 1, wherein each of the parallax and no-parallax pixels is associated with one of a plurality of types of color filters that transmit different wavelength ranges, and parallax pixels associated with each of the plurality of types of color filters are arranged at equal intervals in both of the two dimensional directions, and, among parallax pixels associated with each of the plurality of types of color filters, parallax pixels associated with different ones of the plurality of types of aperture masks are arranged as distant as possible.

3. The image sensor as set forth in claim 1, wherein parallax pixels associated with each of the plurality of types of aperture masks are arranged so as not to overlap each other in both of a row direction and a column direction of the two dimensional directions.

4. An image-capturing apparatus comprising:

the image sensor as set forth in claim 1; and an image processor configured to produce a plurality of pieces of parallax image data having parallax therebetween and 2D image data without parallax based on the outputs from the image sensor.

5. An image sensor comprising a pixel arrangement in which:

pixels constituted by photoelectric converter elements that photoelectrically convert incident light into electric signals are periodically arranged on a x-y plane;

at least three types of aperture masks are provided in a one-to-one correspondence with the pixels and are respectively associated with a reference direction, a first parallax direction different from the reference direction and a second parallax direction different from the reference direction; and pixels provided with the aperture masks associated with the first parallax direction are isotropically arranged at equal intervals in two directions of an x direction and a y direction, each pixel provided with one of the aperture masks associated with the first parallax direction being sandwiched between one of the pixels provided with one of the aperture masks associated with the reference direction and one of the pixels provided with one of the aperture masks associated with the second parallax direction, and pixels provided with the aperture masks associated with the second parallax direction are isotropically arranged at equal intervals in the two directions of the x direction and the y direction, each pixel provided with one of the aperture masks associated with the first parallax direction being sandwiched between one of the pixels provided with one of the aperture masks associated with the reference direction and one of the pixels provided with one of the aperture masks associated with the first parallax direction.

6. The image sensor as set forth in claim 5, wherein when the pixels are provided with and in a one-to-one correspondence with color filters for two or more types of color components and at least pixels provided with color filters for one of the types of color components include one or more pixels having one or more aperture masks associated with the reference direction, one or more pixels having one or more aperture masks associated with the first parallax direction and one or more pixels having one or more aperture masks associated with the second parallax direction, in the pixels provided with the color filters for the one of the types of color components, the pixels having the aperture masks associated with the first parallax direction are isotropically arranged at equal intervals in the two directions of the x direction and the y direction, and the pixels having the aperture masks associated with the second parallax direction are isotropically arranged at equal intervals in the two directions of the x direction and the y direction.

7. The image sensor as set forth in claim 6, wherein each of (i) the pixels having the aperture masks associated with the reference direction, (ii) the pixels having the aperture masks associated with the first parallax direction and (iii) the pixels having the aperture masks associated with the second parallax direction are provided for each of the two or more types of color components.

8. The image sensor as set forth in claim 5, wherein in the pixels periodically arranged forming a primitive lattice, the pixels having the aperture masks associated with the first parallax direction are positioned in different rows and in different columns from each other.

9. The image sensor as set forth in claim 5, wherein when pixel values of all of the pixels of the pixel arrangement are read and when pixel values of the pixels in the pixel arrangement are read in such a manner that pixel values of a plurality of pixels are added together in the x direction and a plurality of pixels in the y direction are discarded, a density ratio between the pixels having the aperture masks associated with the reference direction, the pixels having the aperture masks associated with the first parallax direction, and the pixels having the aperture masks associated with the second parallax direction remains the same.

10. The image sensor as set forth in claim 9, wherein the density ratio between the pixels having the aperture masks associated with the reference direction, the pixels having the aperture masks associated with the first parallax direction, and the pixels having the aperture masks associated with the second parallax direction is 6:1:1.

* * * * *